(12) United States Patent
Yamamoto

(10) Patent No.: US 9,514,106 B2
(45) Date of Patent: Dec. 6, 2016

(54) EMBEDDED DEVICE, CONTROL METHOD THEREFOR, PROGRAM FOR IMPLEMENTING THE CONTROL METHOD, AND STORAGE MEDIUM STORING THE PROGRAM

(71) Applicant: CANON KABUSHIKI KAISHA, Tokyo (JP)

(72) Inventor: Masahito Yamamoto, Suginami-ku (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/308,133

(22) Filed: Jun. 18, 2014

(65) Prior Publication Data

US 2014/0304591 A1    Oct. 9, 2014

Related U.S. Application Data

(63) Continuation of application No. 11/227,903, filed on Sep. 15, 2005, now abandoned.

(30) Foreign Application Priority Data

Sep. 15, 2004    (JP) .................................. 2004-268483

(51) Int. Cl.
  *G06F 9/44*      (2006.01)
  *G06F 17/22*     (2006.01)
  *G06F 17/30*     (2006.01)

(52) U.S. Cl.
  CPC ..... *G06F 17/2247* (2013.01); *G06F 17/30861* (2013.01)

(58) Field of Classification Search
  CPC .................................................. G06F 17/2247
  (Continued)

(56) References Cited

U.S. PATENT DOCUMENTS 6,437,875 B1 * 8/2002 Unno ........................... 358/1.16
6,758,541 B2 * 7/2004 Hashimoto ....................... 347/5
(Continued)

FOREIGN PATENT DOCUMENTS

EP    1030276 A2    8/2000
JP    10136142 A    5/1998
(Continued)

OTHER PUBLICATIONS

David Flanagan, "JavaScript: The Definitive Guide", 2001, O'Reilly Medica Inc., 4th Edition, Chapter 17. Cited in pending parent U.S. Appl. No. 11/227,903.
(Continued)

*Primary Examiner* — Wei Zhen
*Assistant Examiner* — Lanny Ung
(74) *Attorney, Agent, or Firm* — Rossi, Kimms & McDowell LLP

(57) ABSTRACT

An embedded device incorporating a Web browser, which enables a server to provide a dynamic content adapted and linked to a function specific to the embedded device and a status of the same, as an easily and flexibly expandable service in response to access from the embedded browser, and enables securing privacy and security of information on a client. In an image processing apparatus (110) implementing the embedded device, a Web browser module (211) loads Web content data containing at least document data which is described in a markup language and has a script or information for reference to a script embedded therein, and performs presentation based on the loaded Web content data. A controller unit (111) controls information and operation of the image processing apparatus. A script interpreter (805) incorporated in the Web browser module interprets the document data contained in the loaded Web content data and processes the script or the information for reference to a script embedded in the document data. A control API module (218) provides an interface via which the script interpreter gains access, based on the processing of the script, to a DOM managed in the Web browser module. Further, the control API module provides an interface via which the script interpreter gains access, based on the processing of the script, to the information and operation of the embedded device, controlled by the controller unit.

16 Claims, 47 Drawing Sheets

(58) Field of Classification Search
USPC .......................................................... 717/115
See application file for complete search history.

(56) References Cited

U.S. PATENT DOCUMENTS

| | | | |
|---|---|---|---|
| 2001/0029521 A1* | 10/2001 | Matsuda | G06F 17/30893 709/201 |
| 2002/0018230 A1* | 2/2002 | Iwadate | 358/1.14 |
| 2002/0025173 A1* | 2/2002 | Isobe et al. | 399/12 |
| 2002/0103902 A1* | 8/2002 | Nagel et al. | 709/225 |
| 2003/0088642 A1* | 5/2003 | Price | G06F 9/547 709/218 |
| 2003/0120597 A1 | 6/2003 | Drummond et al. | |
| 2004/0057076 A1 | 3/2004 | Hirose et al. | |
| 2004/0148379 A1* | 7/2004 | Ogura | 709/223 |
| 2005/0024671 A1* | 2/2005 | Abe | G06F 3/1204 358/1.13 |
| 2005/0076281 A1 | 4/2005 | Kojima | |

FOREIGN PATENT DOCUMENTS

| | | |
|---|---|---|
| JP | 11-134125 A | 5/1999 |
| JP | 11-187061 A | 7/1999 |
| JP | 11-212751 A | 8/1999 |
| JP | 11-268385 A | 10/1999 |
| JP | 11-327834 A | 11/1999 |
| JP | 2000-194531 A | 7/2000 |
| JP | 2001-175622 A | 6/2001 |
| JP | 2001-216212 A | 8/2001 |
| JP | 2002-196915 A | 7/2002 |
| JP | 2002-297489 A | 10/2002 |
| JP | 2003-296255 A | 10/2003 |
| JP | 2004-112636 A | 4/2004 |
| JP | 2004-246880 A | 9/2004 |
| WO | 2004-031984 A1 | 4/2004 |

OTHER PUBLICATIONS

IBM, "Guidlines: Generalization in the Business Object Model", 2000, Cited in pending parent U.S. Appl. No. 11/227,903. http://venus.imp.mx/hilario/personal/RUP2001.03.00.01/process/modguide/md_bgen.htm.

Ernesto Damiani et al., Design and Implementation of an Access Control Processor XML Documents, 2000. Cited in pending parent U.S. Appl. No. 11/227,903.

Suzuki, Junichi "Java Script for Beginners Fundamental of Grammar and Function Object" Magazine; 1996, No. vol. 8, No. 11. Cited in pending parent U.S. Appl. No. 11/227,903.

Office Action issued in Japanese Patent Application 2008-210193, dated Jun. 10, 2011. Cited in pending parent U.S. Appl. No. 11/227,903.

Office Action issued in Japanese Patent Application 2009-113540, dated Mar. 22, 2011. Cited in pending parent U.S. Appl. No. 11/227,903.

Office Action issued in Japanese Patent Application 2008-325385, dated Jun. 1, 2011. Cited in pending parent U.S. Appl. No. 11/227,903.

Definition of "Apparatus", Internet link: http://dictionary.reference.com/browse/apparatus. Cited in pending parent U.S. Appl. No. 11/227,903.

Definition of "CGI Program", May 2000, Internet link: http://web.archive.org/web/20000531190912/http://www.htmlhelp.com/faq/cgifaq.1.html. Cited in pending parent U.S. Appl. No. 11/227,903.

Extended search report, dated Jul. 17, 2008, issued in Japanese application No. 2004-268483. Cited in pending parent U.S. Appl. No. 11/227,903.

Relevant Portion of European Search Report of European Application No. 05019986.8-2201, dated Jul. 14, 2006. Cited in pending parent U.S. Appl. No. 11/227,903.

Hong-Taek Ju et al "An Embedded Web Server Architecture for XML-Based Network Management"; 2002 IEEE/IFIP Network Operations and Management Symposium; Apr. 15, 2002; pp. 5-18; IEEE; New York, NY, US. Cited in pending parent U.S. Appl. No. 11/227,903.

Chung-Hwan Lim et al; "Access Control of XML Documents Considering Update Operations"; Proceedings of the ACM Workshop on WML Security 2003; Oct. 31, 2003; pp. 49-59; ACM; New York, NY, US. Cited in pending parent U.S. Appl. No. 11/227,903.

* cited by examiner

FIG. 12

| USER NAME | PRIMARY GROUP | NAME | PASSWORD | E-MAIL ADDRESS | EXTENSION | ... |
|---|---|---|---|---|---|---|
| system | system | SYSTEM | ******** | | | |
| guest | guest | GUEST | | | | |
| kanazawa | rd | AYAKO KANAZAWA | ******** | kanazawa@do.ma.in | 1230 | |
| homma | rd | TAKASHI HONMA | ******** | homma@do.ma.in | 1231 | |
| yam | rd | TARO YAMADA | ******** | yam@do.ma.in | 1232 | |
| ucchi | rd | ... | ******** | ucchi@do.ma.in | 1234 | |
| hikichi | rd | ... | ******** | hikichi@do.ma.in | 1235 | |
| foo | sales | ... | ******** | foo@do.ma.in | 2200 | |
| bar | sales | | ******** | sales@do.ma.in | 2201 | |
| ... | | | | | | |

FIG. 13

| GROUP NAME | MEMBER LIST |
|---|---|
| system | system |
| guest | guest |
| admin | ucchi |
| user | kanazawa,homma,yam,ucchi,hikichi,foo,bar |
| rd | kanazawa,homma,yam,ucchi,hikichi |
| sales | foo,bar |
| manager | kanazawa,homma,foo |
| operator | ucchi,hikichi,bar |
| ... | |

FIG. 19

```
1   <HTML>
2   <HEAD>
3     <TITLE>Customer Relationship</TITLE>
4   </HEAD>
5   <BODY>
6     <H1>
7       Welcome, <SCRIPT>document.write(device.getCurrentUser().name);
8     </H1>
9     <P>Thank you for your constant use of<SCRIPT>document.write(device.model);
10    </P>
11    <H2>News</H2>
12    <SCRIPT>
13      if (device.reader.model == "S500") {
14        if (device.reader.feeder.model == "DF03") {
15          document.writeln('<P><IMG SRC="document-insert-unit-b2.jpg" ALT="" ALIGN="left">',
16          '<IMG SRC="arrowRed.gif" ALT="">',
17          'This month, we are providing a document feeder unit trade-in service for a limited period.
    Your Original Feeder Unit can be traded in for the latest model.',
18          'Why don't you take advantage of this opportunity to trade yours in for the newest model?',
19          'For more detailed information <A HREF="http://canon.com/offer/', device.reader.model, '/feeder.html',
20          '">', device.reader.model,
21          'see news about</A>Original Feeder Unit trade-in campaign, please.</P>');
22        }
23      }
24      if (device.printer.model == "P9900") {
25        if (!device.printer.finisher) {
26          document.writeln('<P><IMG SRC="arrowRed.gif" ALT="">',
27          'Why don't you add a convenient Discharge Unit to your printer?',
28          'The price is now discounted.',
29          'For more detailed information<A HREF="http://canon.com/special-sale/', device.printer.model, '/finisher-pf30.html',
30          '">', device.printer.model, 'Please see news about </A>Discharge Unit discount sale campaign.</P>');
31        }
32      }
33    </SCRIPT>
```

FIG. 20

```
34  <SCRIPT>
35    var latests = new Array();
36    latests["operationPanel"] = { version:"1050", label:"operating unit" };
37    latests["printer"] = { version:"1011", label:"printer" };
38    latests["reader"] = { version:"1213", label:"reader" };
39    latests["network"] = { version:"1008", label:"network unit" };
40    latests["communication"] = { version:"1099", label:"communication unit" };
41    latests["usb"] = { version:"1101", label:"USB unit" };
42    for (var unit in latests) {
43      if (device[unit] && (device[unit].version < latests[unit].version)) {
44        var uri = 'mailto:support@canon.jp?' +
45          'subject=Request upgrade%20' + device.model + '%20%23' + device.serial + '&' +
46          'body=Unit%20model%3a%20' + device[unit].model +
47          '%20%28' + 'Current%20version%3a%20' + device[unit].version + '%29';
48        document.writeln('<P><IMG SRC="arrowRed.gif" ALT="">',
49          latests[unit].label, 'It is possible to update the firmware of < > to the latest version.¥n',
50          'The version currently in use is', device[unit].version, ¥n',
51          'The latest version is', latests[unit].version, ¥n',
52          'Order from the support center by e-mail, if you desire<A HREF="', uri, '"> ¥n',
53
54          'A customer engineer will be dispatched.</P>¥n');
55      }
56    }
57  </SCRIPT>
58  <SCRIPT>
59    var toner = device.printer.getToner();
60    if (toner < 10) {
61      var uri = 'http://canon.jp/order/' + device.printer.model + '/toner.html';
62      document.writeln('<P><IMG SRC="arrowRed.gif" ALT=""> N.B.:¥n',
63        'Toner in the printer will run out soon. (remaining amount of toner: ', toner, '%) ¥n',
64        'Please, order from<A HREF="' , uri, '">', device.printer.model,
65        'genuine toner online ordering page.</A> ¥n',
66        '</P>');
67    }
68  </SCRIPT>
69  <DIV ALIGN="center">
70    <SCRIPT>
71      document.writeln('<A HREF="manual-', device.model, '.html">Latest Manual</A>');
72    </SCRIPT>
73    <A HREF="admin.html">Device Management</A>
74    <A HREF="report.html">Apparatus Report</A>
75  </DIV>
76  </BODY>
77  </HTML>
```

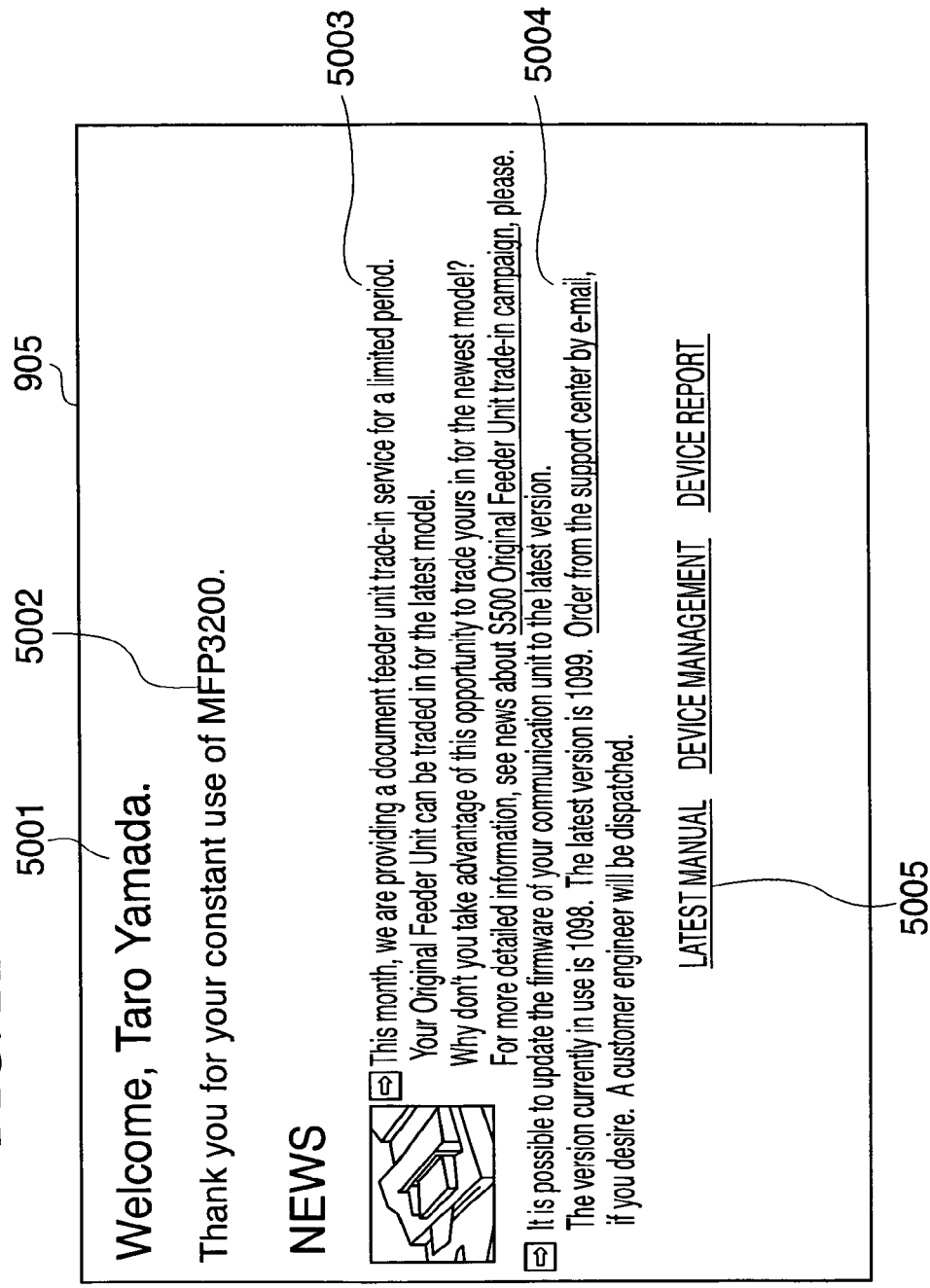

FIG. 22

Welcome, Taro Yamada.

Thank you for your constant use of MFP3200.

NEWS

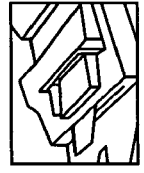

- This month, we are providing a document feeder unit trade-in service for a limited period. Your Original Feeder Unit can be traded in for the latest model. Why don't you take advantage of this opportunity to trade yours in for the newest model? For more detailed information, see news about S500 Original Feeder Unit trade-in campaign, please.

- It is possible to update the firmware of your communication unit to the latest version. The version currently in use is 1098. The latest version is 1099. Order from the support center by e-mail, if you desire. A customer engineer will be dispatched.

- N.B.: Toner in the printer will run out soon. (toner remaining amount: 8%) Please, order from P8500 genuine toner online ordering page. ——5101

LATEST MANUAL    DEVICE MANAGEMENT    DEVICE REPORT

FIG. 24

```
1  <HTML>
2  <HEAD>
3    <TITLE>MFP3200 Manual</TITLE>
4  </HEAD>
5  <BODY>
6    <H1>MFP3200 manual</H1>
7    <P>
8      <A HREF="http://canon.jp/doc/MFP3200/knowhow.html"><IMG SRC="arrowRed.gif" ALT=""
9      BORDER="0">For ease of usage</A><BR>
10     <A HREF="http://canon.jp/doc/MFP3200/case.html"><IMG SRC="arrowRed.gif" ALT=""
11     BORDER="0">Usage Examples Collection</A>
12   </P>
13   <H2>Unit-Specific Details</H2>
14   <TABLE CELLPADDING="0" CELLSPACING="0" ALIGN="right">
15     <TR>
16       <TD ROWSPAN="3">
17         <SCRIPT>
18           if (device.printer.finisher) {
19             document.write('<A HREF="http://canon.jp/manual/', device.printer.finisher.model, '.html">',
20               '<IMG SRC="finisher-', device.printer.finisher.model,
21               '" ALT="finisher" BORDER="0"></A>');
22           }
23           else {
24             document.write('<A HREF="http://canon.jp/order/finisher.html">',
25               '<IMG SRC="no-finisher.jpg" ALT="Order finisher now!" BORDER="0"></A>');
26           }
27         </SCRIPT>
28       </TD>
29       <TD>
30         <SCRIPT>
31           if (device.reader.feeder) {
32             document.write('<A HREF="http://canon.jp/manual/', device.reader.feeder.model, '.html">',
33               '<IMG SRC="feeder-', device.reader.feeder.model, '" ALT="feeder" BORDER="0"></A>');
34           }
35           else {
36             document.write('<A HREF="http://canon.jp/order/feeder.html">',
37               '<IMG SRC="no-feeder.jpg" ALT="Order feeder now!" BORDER="0"></A>');
38           }
39         </SCRIPT>
40       </TD>
```

FIG. 25

```
41    <TD ROWSPAN="3">
42      <SCRIPT>
43        if (device.printer.paperSupply) {
44          document.write('<A HREF="http://canon.jp/manual/',
45            device.printer.paperSupply.model, '.html">',
46            '<IMG SRC="paper-supply-', device.printer.paperSupply.model,
47            '" ALT="paper supply" BORDER="0"></A>');
48        }
49        else {
50          document.write('<A HREF="http://canon.jp/order/paper-supply.html">',
51            '<IMG SRC="no-paper-supply.jpg" ALT="Order paper supply now!" BORDER="0"></A>');
52        }
53      </SCRIPT>
54    </TD>
55  </TR>
56  <TR>
57    <TD>
58      <SCRIPT>
59        document.write('<A HREF="http://canon.jp/manual/', device.reader.model, '.html">',
60          '<IMG SRC="scanner-', device.reader.model, '" ALT="scanner" BORDER="0"></A>');
61      </SCRIPT>
62    </TD>
63  </TR>
64  <TR>
65    <TD>
66      <SCRIPT>
67        document.write('<A HREF="http://canon.jp/manual/', device.printer.model, '.html">',
68          '<IMG SRC="printer-', device.printer.model, '" ALT="printer" BORDER="0"></A>');
69      </SCRIPT>
70    </TD>
71  </TR>
72  </TABLE>
73  <P>Touch a unit image, and a manual for the unit will be opened.
74     (If the unit is not mounted, an ordering page will be opened.)
75  </P>
```

*FIG. 26*

```
76   <UL>
77     <SCRIPT>
78       document.write('<LI><A HREF="http://canon.jp/manual/', device.reader.model, '.html">',
79           'Image Reader', device.reader.model, '</A></LI>');
80     </SCRIPT>
81     <UL>
82       <SCRIPT>
83         if (device.reader.feeder) {
84           document.write('<LI><A HREF="http://canon.jp/manual/', device.reader.feeder.model, '.html">',
85               'Original Feeder Unit', device.reader.feeder.model, '</A></LI>');
86         }
87       </SCRIPT>
88     </UL>
89     <SCRIPT>
90       document.write('<LI><A HREF="http://canon.jp/manual/', device.printer.model, '.html">',
91           'Printer', device.printer.model, '</A></LI>');
92     </SCRIPT>
93     <UL>
94       <SCRIPT>
95         if (device.printer.paperSupply) {
96           document.write('<LI><A HREF="http://canon.jp/manual/',
97               device.printer.paperSupply.model, '.html">',
98               'Sheet Feeder Unit', device.printer.paperSupply.model, '</A></LI>');
99         }
100      </SCRIPT>
101      <SCRIPT>
102        if (device.printer.finisher) {
103          document.write('<LI><A HREF="http://canon.jp/manual/',
104              device.printer.finisher.model, '.html">',
105              'Discharge Unit', device.printer.finisher.model,'</A></LI>');
106        }
107      </SCRIPT>
108    </UL>
109  </UL>
110  <DIV ALIGN="center">
111    <A HREF="main.html">News</A>
112    <A HREF="admin.html">Device Management</A>
113    <A HREF="report.html">Device Report</A>
114  </DIV>
115 </BODY>
116 </HTML>
```

*FIG. 28*

```
1   <HTML>
2   <HEAD>
3     <TITLE>Administration</TITLE>
4     <SCRIPT>
5     function diag (unit) {
6        var diagResult = unit.diag();
7        var diagDiv = document.getElementById("diagDiv");
8        var oldP = diagDiv.getElementsByTagName("P").item(0);
9        var p = document.createElement("P");
10       if (diagResult == 0) {
11          var t = document.createTextNode('Diagnosis: Normal');
12          p.appendChild(t);
13       }
14       else {
15          var uri = 'http://canon.jp/support/trouble/diag-code' +
16             diagResult + '.html';
17          var t = document.createTextNode('Diagnosis: Abnormality is detected' +
18             'Error code is #'+diagResult+'. For more detailed information );
19          p.appendChild(t);
20          var a = document.createElement("A");
21          var attr = a.setAttribute("HREF", uri);
22          t = document.createTextNode(uri);
23          a.appendChild(t);
24          p.appendChild(a);
25          t = document.createTextNode('see¥n');
26          p.appendChild(t);
27       }
28       diagDiv.replaceChild(p, oldP);
29     }
30     </SCRIPT>
31     <SCRIPT>
32     function showPrinterStatus() {
33        var statusDiv = document.getElementById("statusDiv");
34        var p = statusDiv.getElementsByTagName("P").item(0);
35        if (device.printer.isOnline) {
36           p.firstChild.data = 'Online¥n';
37        }
38        else {
39           p.firstChild.data = 'Online¥n';
40        }
41     }
42     </SCRIPT>
43     <SCRIPT>
44     function errorHandler(event) {
45        var statusDiv = document.getElementById("statusDiv");
46        var p = statusDiv.getElementsByTagName("P").item(0);
47        p.firstChild.data = event.unit + ':' + event.message;
48     }
49     device.onerror = errorHandler;
50     </SCRIPT>
51   </HEAD>
```

*FIG. 29*

```
52  <BODY onLoad='setInterval(showPrinterStatus, 10000);'>
53  <H1>Device Management</H1>
54  <H2>Unit Diagnosis</H2>
55  <DIV ID="diagDiv">
56  <P>
57  </P>
58  <SCRIPT>
59    if (device.printer.diag) {
60      document.writeln('<INPUT TYPE="button" VALUE="Printer" onClick="diag(device.printer);">');
61    }
62    if (device.printer.finisher.diag) {
63      document.writeln('<INPUT TYPE="button" VALUE="Discharge Unit"',
64        ' onClick="diag(device.printer.finisher);">');
65    }
66    if (device.printer.paperSupply.diag) {
67      document.writeln('<INPUT TYPE="button" VALUE="Sheet Feeder Unit"',
68        ' onClick="diag(device.printer.paperSuppply);">');
69    }
70    if (device.reader.diag) {
71      document.writeln('<INPUT TYPE="button" VALUE="Reader" onClick="diag(device.reader);">');
72    }
73    if (device.reader.feeder.diag) {
74      document.writeln('<INPUT TYPE="button" VALUE="Original Feeder Unit"',
75        ' onClick="diag(device.reader.feeder);">');
76    }
77  </SCRIPT>
78  </DIV>
79  <H2>Printer Status</H2>
80  <DIV ID="statusDiv">
81  <P>Status is being acquired...
82  </P>
83  </DIV>
84  <DIV ALIGN="center">
85    <A HREF="main.html">News</A>
86    <SCRIPT>
87      document.writeln('<A HREF="manual-', device.model, '.html">Latest Manual</A>');
88    </SCRIPT>
89    <A HREF="report.html">Device Report</A>
90  </DIV>
91  </BODY>
92  </HTML>
```

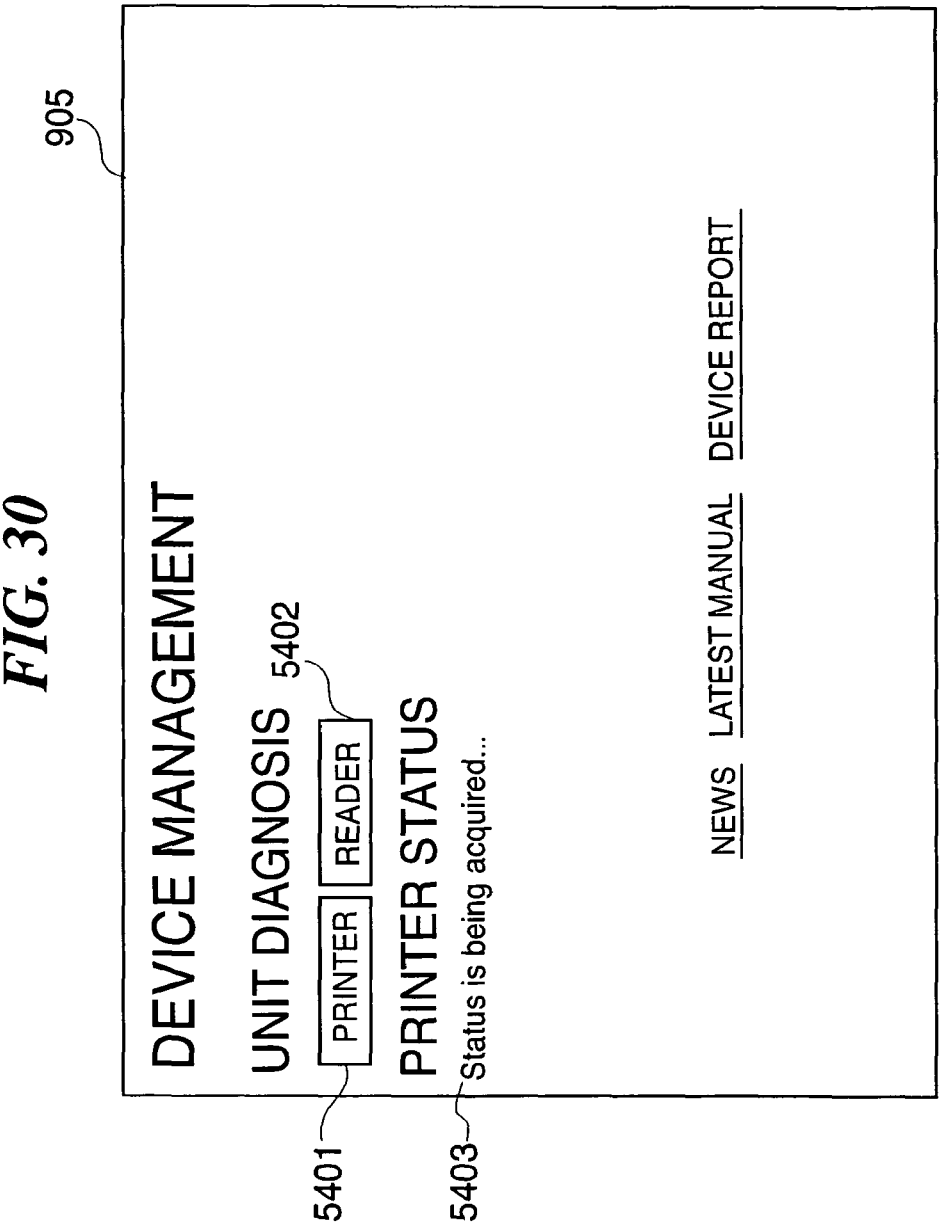

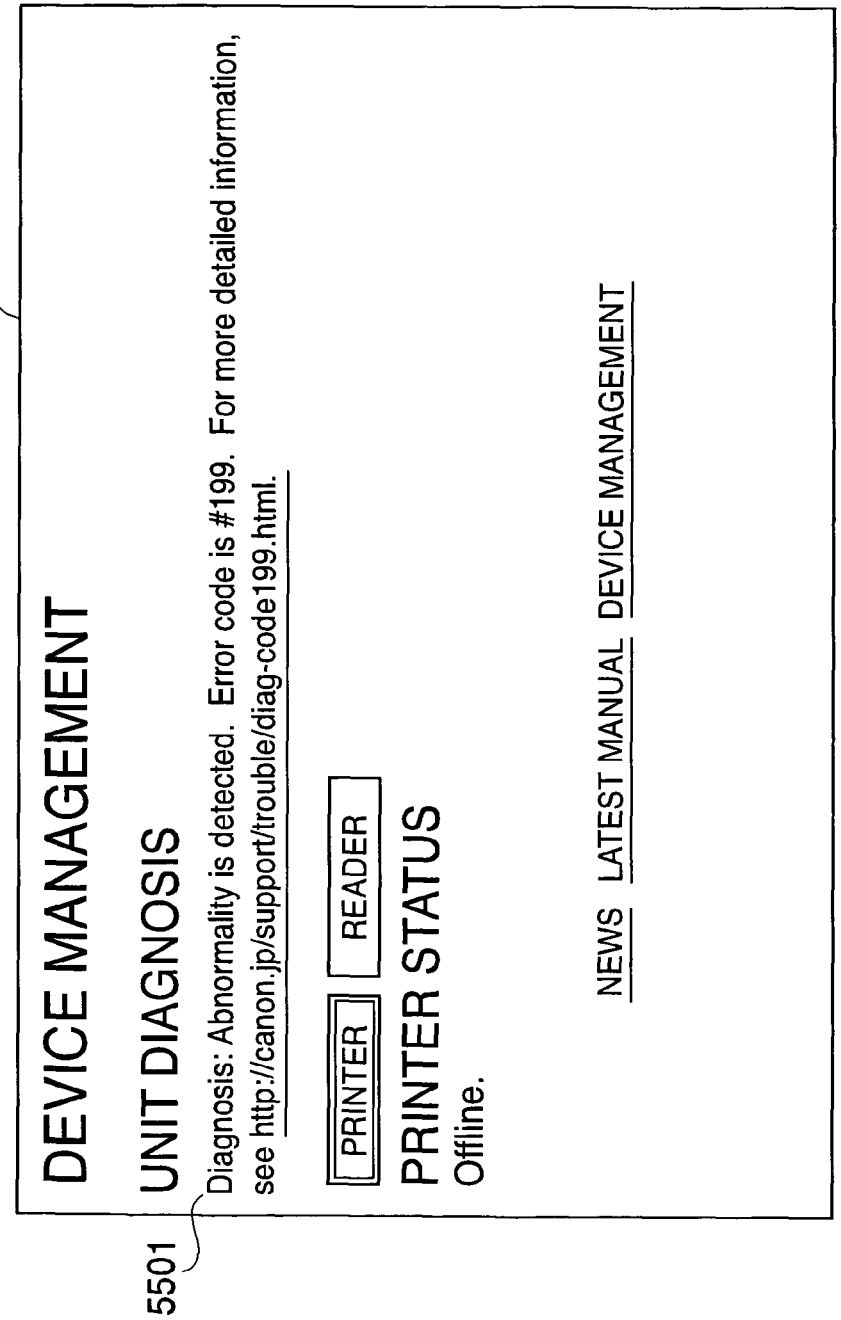

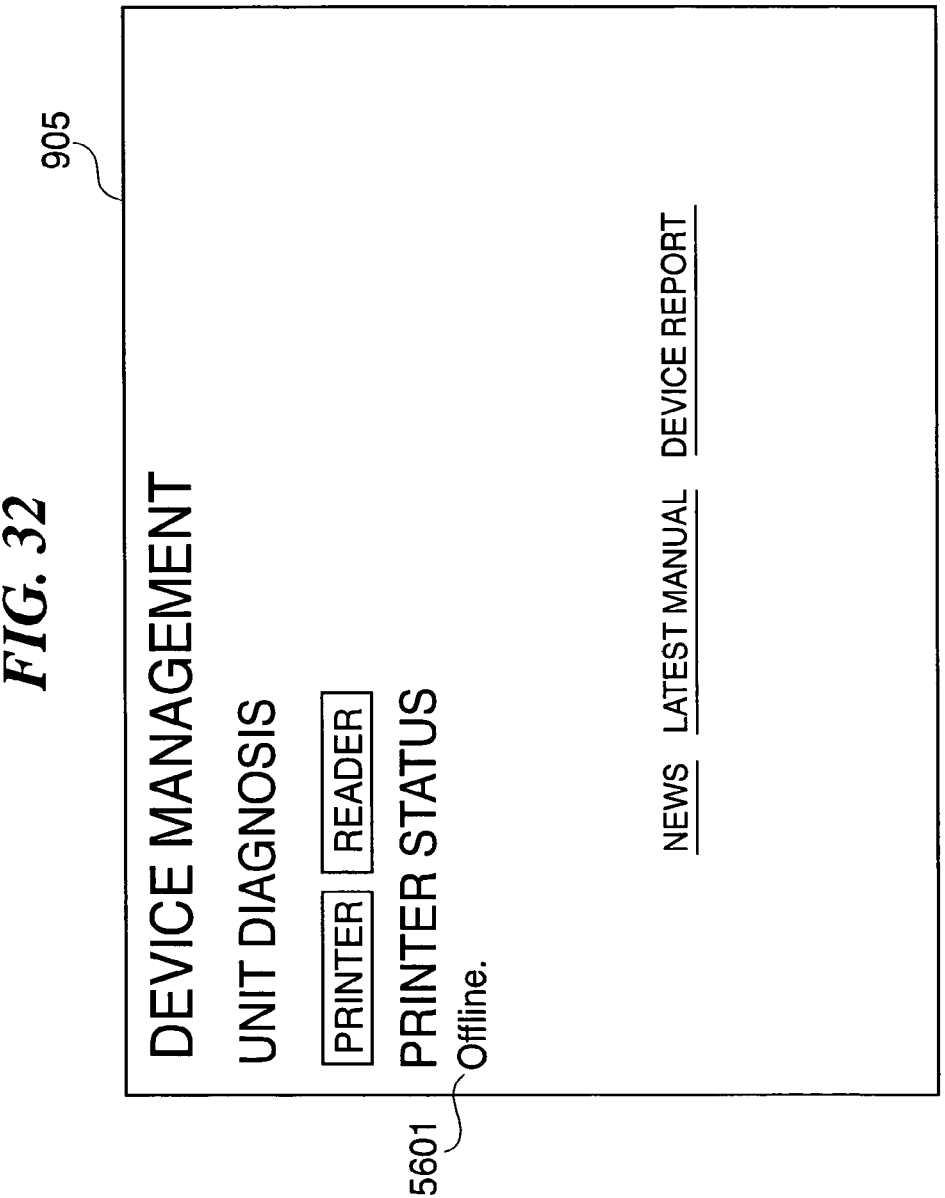

FIG. 33

```
1  <HTML>
2  <HEAD>
3    <TITLE>Device Report</TITLE>
4    <SCRIPT>
5    function createCounterReport() {
6       document.reportForm.counter.value = device.printer.getTotalCounter();
7    }
8    function reportLog(message) {
9       document.reportForm.log.value += message + '\n';
10   }
11   function createLogReport() {
12      document.reportForm.log.value = "";
13      var log = device.getElementsByTagName("log").item(0);
14      var records = log.getElementsByTagName("record");
15      for (var i = 0; i < records.length; i++) {
16         var record = records.item(i);
17         if (record.getAttribute("facility") == "system" &&
18            record.getAttribute("level") == "notice") {
19            reportLog(record.getAttribute("date") + ': ' + record.firstChild.data);
20         }
21      }
22   }
23   </SCRIPT>
24 </HEAD>
```

*FIG. 34*

```
25  <BODY onLoad="createCounterReport(); createLogReport();">
26  <H1>Device Report</H1>
27  <FORM NAME="reportForm" ACTION="submitReport">
28    <TABLE CELLPADDING="5">
29      <TR>
30        <TD>counter<BR>
31          <INPUT TYPE="text" NAME="counter">
32        </TD>
33      </TR>
34      <TR>
35        <TD>Log<BR>
36          <TEXTAREA NAME="log" ROWS="8" COLS="70"></TEXTAREA>
37        </TD>
38      </TR>
39      <TR>
40        <TD>
41          <INPUT TYPE="button" NAME="updateButton" VALUE="Update"
42            onClick="createCounterReport(); createLogReport();">
43          <INPUT TYPE="submit" NAME="submitButton" VALUE="Send">
44        </TD>
45      </TR>
46    </TABLE>
47    <SCRIPT>
48      document.writeln('<INPUT TYPE="hidden" NAME="model" VALUE="',
49        device.model, '">');
50      document.writeln('<INPUT TYPE="hidden" NAME="serial" VALUE="',
51        device.serial, '">');
52    </SCRIPT>
53  </FORM>
54  <DIV ALIGN="center">
55    <A HREF="main.html">News</A>
56    <SCRIPT>
57      document.writeln('<A HREF="manual-', device.model, '.html">Latest Manual</A>');
58    </SCRIPT>
59    <A HREF="admin.html">Device Management</A>
60  </DIV>
61  </BODY>
62  </HTML>
```

FIG. 38

| RESOURCE INFORMATION | | | |
|---|---|---|---|
| INSTANCE | TECHNICAL RESEARCH REPORT 0110 | | |
| CLASS | DOCUMENT | HIERARCHICAL REPRESENTATION | |

OWNER INFORMATION

OWNER: yam      GROUP: rd

ACCESS RIGHT SETTING

| | READ | WRITE | EXECUTE |
|---|---|---|---|
| PERMISSION TO OWNER | PERMITTED ▼ | PERMITTED ▼ | PERMITTED ▼ |
| PERMISSION TO GROUP | PERMITTED ▼ | NOT PERMITTED ▼ | NOT PERMITTED ▼ |
| PERMISSION TO OTHER PERSONS | NOT PERMITTED ▼ | NOT PERMITTED ▼ | NOT PERMITTED ▼ |

[ CANCEL ]    [ OK ]

FIG. 39

| RESOURCE INFORMATION | | | |
|---|---|---|---|
| INSTANCE | NAMELESS INSTANCE | | |
| CLASS | COLOR COPYING | HIERARCHICAL REPRESENTATION | |

OWNER INFORMATION
OWNER: system     GROUP: sales

ACCESS RIGHT SETTING

| | READ | WRITE | EXECUTE |
|---|---|---|---|
| PERMISSION TO OWNER | PERMITTED ▼ | PERMITTED ▼ | PERMITTED ▼ |
| PERMISSION TO GROUP | PERMITTED ▼ | NOT PERMITTED ▼ | PERMITTED ▼ |
| PERMISSION TO OTHER PERSONS | NOT PERMITTED ▼ | NOT PERMITTED ▼ | NOT PERMITTED ▼ |

CANCEL     OK

FIG. 43

| RESOURCE INFORMATION | | | |
|---|---|---|---|
| APPARATUS ◆ PRINTER UNIT ◆ DISCHARGE UNIT ← AUTO DISCHARGE STAGE: DISCHARGE UNIT | | | |

OWNER INFORMATION

OWNER: system        GROUP: user

ACCESS RIGHT SETTING

| | READ | WRITE | EXECUTE |
|---|---|---|---|
| PERMISSION TO OWNER | PERMITTED ▼ | PERMITTED ▼ | PERMITTED ▼ |
| PERMISSION TO GROUP | PERMITTED ▼ | NOT PERMITTED ▼ | NOT PERMITTED ▼ |
| PERMISSION TO OTHER PERSONS | NOT PERMITTED ▼ | NOT PERMITTED ▼ | NOT PERMITTED ▼ |

CANCEL        OK

EMBEDDED DEVICE, CONTROL METHOD THEREFOR, PROGRAM FOR IMPLEMENTING THE CONTROL METHOD, AND STORAGE MEDIUM STORING THE PROGRAM

BACKGROUND OF THE INVENTION

Field of the Invention

The present invention relates to an embedded device provided with a Web browser, a control method therefor, a program for implementing the control method, and a storage medium storing the program.

Description of the Related Art

As is well known, the Internet has been developed by Web servers that supply HTML (Hypertext Markup Language) document data using HTTP (Hypertext Transfer Protocol) and Web browsers as clients that acquire the HTML document data using HTTP and display the acquired data.

The most basic function of a Web server is to provide a file transfer service for sending a file in response to a file acquisition request transmitted by a client using HTTP. In this case, basically, the Web server merely reads out a static file stored therein, and sends the same, but it can also have a function of dynamically generating and sending data in response to a HTTP request (a GET request or a POST request) in addition to the basic function.

Processing performed by the Web server to dynamically generate a HTTP response as described above is referred to as server-side processing. The server-side processing can also be realized by being delegated from the Web server to external software implemented according to the CGI (Common Gateway Interface) specification, the Java (registered trademark) Servlet specification, or the like. The external software to which the processing is delegated from the Web server according to the Interface specification is implemented as an execution type program executed by a server machine, a program described in an instruction language for the Java or another virtual machine, or a text format script executed by an interpreter. Examples of the text format scripts executed by an interpreter (script execution environment) include a shell script, JavaScript, PHP (Personal HomePage or PHP: Hypertext Processor), and so forth. To provide a script for linkage to a Web server for execution of the server-side processing is referred to as server-side scripting.

A HTML document can express a form for requiring user input, using a form element (FORM) in HTML. When a form element-based form is displayed on a Web browser and a user inputs data into the form and instructs submission thereof, the data input to the form is sent as a HTTP request (a GET request or a POST request) to a Web server. Accordingly, by configuring a HTML document to be sent from the Web server to a client such that the HTML document includes a form that can receive a user instruction for server-side processing, it is possible to provide a kind of user interface for enabling the user to interact with the server-side processing via a Web browser (the form can also be configured such that a client-side file input to the form is uploaded to the server). The server-side processing enables not only dynamic generation of a HTTP response, but also execution of processing for providing some service as a side effect.

Thus, the user is allowed to use business logic, back-end services, and the like that exist on the server side via a Web browser. Consequently, a model for a distributed system is widely used in which HTML is used as a kind of user interface description language and a client-side Web browser is given charge of only user interface processing for services for which the major part of processing is executed on a server side (the small-sized client in such a model is referred to as a thin client).

Client-side processing is also well known in which computation is performed on a Web browser side. In the client-side processing, software for carrying out some processing is sent from a Web server to a client in response to a request from the Web browser, and the software is executed on a processing system incorporated in the Web browser. In this case, dynamic document generation and interaction with the user are achieved by the client-side processing executed on the Web browser, and hence communication with the server is not absolutely necessary. An object format program described in the instruction language for the Java virtual machine and implemented according to an interface specification based on a Java Applet operates on the Java virtual machine incorporated as a plug-in in the Web browser. Further, conventionally, many Web browsers have a JavaScript interpreter incorporated therein as a text based scripting language. The client-side JavaScript is a combination of a DOM (Document Object Model) defined by the Web browser and a script function of the JavaScript interpreter. An approach by a scripting language, such as JavaScript, is more advantageous than an approach by a Java Applet or the like, because the scripting language is text based, and therefore it has a higher affinity for a markup language, such as HTML, and hence a provider of a HTML document content can easily provide an "executable content". Further, a client-side JavaScript interpreter is configured to be linked to a DOM as a data structure enabling a Web browser to internally handle a document, so that the document displayed on the Web browser can be operated so as to easily provide a user with dynamic information and user interface.

The core part of the JavaScript language was standardized as ECMAScript by ECMA (European Computer Manufacturers Association). See e.g. "JavaScript The Definitive Guide, Third Edition", David Flanagan, O'Reilly, 1998, for details of client-side processing and JavaScript.

The DOM is an object model for handling the structure of a document described in a markup language, such as HTML. Each Web browser, such as Netscape Navigator (registered trademark) or Internet Explorer (registered trademark), has conventionally provided a specific DOM to be implemented for client-side processing using JavaScript or the like. The DOM specification was standardized by the W3C (World Wide Web Consortium) such that an interface compliant with standard specifications is available for implementation by each Web browser.

Further, a Web browser for a general-purpose desktop computer captures objects and the like based on plug-ins, dynamic link libraries, and native machine codes and dynamically couple them to the execution form of the Web browser so as to expand the function of the Web browser itself.

For example, Japanese Laid-Open Patent Publication (Kokai) No. H11-187061 discloses apparatus control by server-side processing (CGI).

Further, Japanese Laid-Open Patent Publications (Kokai) Nos. H11-134125, H11-212751, H11-327834, and 2000-194531 each disclose a Web pullprint facility incorporated or embedded in a digital multi-function machine. The embedded pullprint facility includes a data-acquiring mechanism based on HTTP similar to one provided in a Web browser, and a rendering mechanism, such as HTML and prints out a content acquired from a URL (Uniform Resource Locator) designated by the user.

Further, a system is known in which various embedded devices, which incorporate an operating system or software, comprised of firmware provided with the Java virtual machine can acquire and dynamically load a program described in an object format (bytecode) of the Java virtual machine from a server, and execute the same.

However, a Web browser incorporated in the firmware of such an embedded device is required to be used in a different way from a Web browser for general-purpose desktop computers. This is because calculation resources (a CPU, a memory, an external storage, the size and resolution of a display, a keyboard, a pointing device, etc.) of an embedded device are generally inferior in function and performance to a general-purpose desktop computer. Further, the general-purpose desktop computer is placed on a desk to cope with various kinds of jobs so that the user can sit on a chair and operate the computer with composure, whereas a multi-function machine, such as a digital copying machine, is to be placed in a corner of an office and shared by a plurality of staff members, for example, i.e. used in a particular situation and a particular mode of use. Therefore, to use a Web browser incorporated in an embedded device to perform general net-surfing or browsing is not impossible, but cannot be said to be an optimal use of the Web browser.

Therefore, when the Web browser incorporated in the embedded device is used, it is required to browse a content linked and optimally adapted to the intrinsic function of the embedded device.

Examples of application of the embedded browser include sales of consumables, reference to manuals, diagnosis of an apparatus, and usage of other services. For example, if the remaining amount of toner in a multi-function machine is small when a Web browser incorporated in the machine displays a portal page provided by a distributor of the machine, it is effective to provide fine services intimately related to specific use of the machine in a customer environment e.g. by dynamically displaying a guide recommending online purchase of toner. Further, when the Web browser incorporated in the machine displays a page where the latest version of a manual of the apparatus, a collection of exemplary cases of usage, a know-how collection, etc. are disclosed, it is also effective to provide fine services e.g. by selectively displaying information related to the machine or a group of options actually incorporated in the machine. In many cases, for maintenance or repair of the machine, it is required to refer to or change a variety of parameters managed as internal data by firmware incorporated in the machine, or to call a plurality of diagnosis codes, setup codes, or the like built in the firmware in appropriate order and combination. Moreover, appropriate processing to be executed for maintenance or repair of the machine can differ depending on the mounting conditions of optional units or the version of the firmware. The appropriate processing may be changed with an increase in stored know-how. For the above described reasons, it is difficult for an end user or a customer engineer at a maintenance or repair site to grasp everything and perform optimal processing, or it requires a great cost. Therefore, if for the management processing of the machine, access is made from the Web browser incorporated therein in a customer environment to a page disclosing machine or apparatus management information provided by a service company, it enables the end user or the customer engineer to view an optimal operation manual dynamically reflecting the current status of the machine. Further, if a user interface page carefully prepared by the service company in accordance with most recent know-how is displayed according to the kind of the machine and the status of the same, to allow the end user or the customer engineer to give an execution instruction for referring to or changing parameters within the machine or to select a combination of a diagnosis code and a setup code, it is very convenient to the end user or the customer engineer.

As is apparent from the above described examples, it is desired to dynamically provide a content optimized for access from the embedded browser and linked to the function and status of the machine in a manner flexibly expandable by a server. However, in the case where the user does not desire, from the viewpoint of protection of privacy, that information of the machine is sent to a server (content provider), the server-side processing performed using a CGI program or the like is not suitable, and hence it is necessary to achieve the provision of such a content by the client-side processing.

Further, consideration must be given to ensure that a content acquired from outside via a network can be fully linked to the function and status of an apparatus and at the same time security of the embedded device is not threatened.

Furthermore, in most cases, the browser incorporated in the embedded device is implemented as firmware on a real-time OS, which makes it difficult to achieve expansion of the function of the browser itself, as is distinct from a browser for general-purpose desktop computers, by capturing objects or the like based on plug-ins, dynamic link libraries, or native machine codes and dynamically coupling the objects or the like to the execution form of the browser. Therefore, it is desirable that the function of the browser itself is fixed before shipment of the system, and provision of a dynamic content linked to the function and status of the apparatus is flexibly and expandably performed by the server.

In Japanese Laid-Open Patent Publication (Kokai) No. H11-187061 referred to above, however, only apparatus control by the server-side processing (CGI) is disclosed, but no description is given of apparatus control by the client-side processing on the embedded browser.

Further, as described hereinabove, the approach by the Java virtual machine or the like is inferior to the approach by a scripting language, such as JavaScript, in respect of affinity for a text based markup language, such as HTML, and accessibility from a program to the DOM, of a source document incorporating (or associated with) the program, and hence is not easy to use by a content provider that provides a distributed system utilizing the browser incorporated in the embedded device.

SUMMARY OF THE INVENTION

It is an object of the present invention to provide an embedded device incorporating a Web browser, a control method therefor, which enable a server to provide a dynamic content adapted and linked to a function specific to the embedded device and a status of the same, as an easily and flexibly expandable service in response to access from the embedded browser, and enable securing privacy and security of information on a client, as well as a program for implementing the control method, and a storage medium storing the program.

To attain the above object, in a first aspect of the present invention, there is provided an embedded device comprising a browser unit adapted to load content data containing at least document data which is described in a markup language and has a script or information for reference to a script embedded therein, and to perform presentation based on the loaded content data, a control unit adapted to control information and operation of the embedded device, a script processing unit incorporated in the browser unit, adapted to interpret the document data contained in the loaded content data and to process the script or the information for reference to a script embedded in the document data, and a first interface unit adapted to provide an interface via which the script processing unit gains access, based on the processing of the script, to the information and operation of the embedded device, controlled by the control unit.

With the arrangement of the embedded device according to the first aspect of the present invention, the script processing means interprets the document data contained in the loaded Web content and processes the script embedded in the document data or the script referred to based on the reference information; the first interface means enables accessing the internal data structure of the document data managed in the browser means, based on the processing of the script; and the second interface means enables the script processing means to access the information and operation of the embedded device, controlled by the control means, based on the processing of the script. Further, a dynamic content adapted and linked to the function specific to the embedded device and the status of the same are generated via the first and second interface means, and then a presentation is performed based on the generated content. Therefore, preparation of only a single content on the server side makes it possible to selectively present proper information according to the configuration of the embedded device and the status of the same. Further, the dynamic content is basically generated by client-side processing, so that privacy and security of client-side information can be secured.

Preferably, the embedded device is further comprised of a second interface unit adapted to provide an interface via which the script processing unit gains access, based on the processing of the script, to an internal data structure of the document data, managed in the browser unit, and the script processing unit inserts partial document data generated based on a result obtained by gaining access, via the first interface unit, to the information and operation of the embedded device, controlled by the control unit, into the document data at a position therein determined according to a result obtained by gaining access, via the second interface unit, to the internal data structure of the document data.

Preferably, the second interface unit constructs a document object model for access by the script processing unit to the internal data structure of the document data, the document object model being constructed by associating objects to be processed by the script processing unit with respective elements of the document data, associating an attribute of each of the objects with an attribute of a corresponding one of the elements of the document data, associating an operation on each of the objects with an operation on a corresponding one of the elements of the document data, associating a relationship between the objects with a relationship between the elements of the document data, and associating events generated for objects associated with the document data or respective ones of the elements of the document data, with events generated for the document data or the corresponding elements of the document data.

More preferably, the script processing unit gains access, via the first interface unit, to the information and operation of the embedded device, controlled by the control unit, in response to an event generated for the document data or an element of the document data.

Preferably, the first interface unit constructs a device object model for access by the script processing unit to the information and operation of the embedded device, controlled by the control unit, the device object model being constructed by associating objects to be processed by the script processing unit with respective resources constituting the embedded device, associating an attribute of each of the objects with an attribute of a corresponding one of the resources, associating an operation on each of the objects with an operation on a corresponding one of the resources, and associating a relationship between the objects associated with the respective resources, with a relationship between the resources.

More preferably, in the device object model, an abstract-concrete relationship is inherited, a concrete class being provided with at least a part of at least one of an attribute of an associated abstract class and an operation thereon, and each object belonging to each class being provided with at least a part of at least one of an attribute of the class and an operation thereon.

More preferably, in the device object model, a parent-child aggregation relationship is represented, and a whole object being provided with an operation or an attribute for searching zero or more partial objects associated with the whole object.

More preferably, the device object model is constructed by further associating events and exceptions generated for objects associated with the embedded device or respective ones of the resources of the embedded device, with events and exceptions generated for the embedded device or corresponding ones of the resources of the embedded device.

Preferably, in the case a user gives an instruction for externally outputting from the embedded device a result obtained by the script processing unit gaining access, via the first interface unit, to the information and operation of the embedded device, controlled by the control unit, the browser unit inhibits the result from being externally outputted in response to the instruction.

Preferably, in the case a user gives an instruction for outputting from the embedded device a result obtained by the script processing unit gaining access, via the first interface unit, to the information and operation of the embedded device, controlled by the control unit, the browser unit requests the user to confirm whether to permit the result to be externally outputted in response to the instruction, in advance or whenever the instruction is given.

More preferably, an access right is held for each of the objects constituting the device object model, and in the case the script processing unit attempts access to an object which the script processing unit is not authorized to access, an attribute of the object, or an operation on the object, the first interface unit inhibits the access.

Further preferably, the embedded device further comprises a setting unit adapted to set an access right to each of the objects constituting the device object model.

Further preferably, each of the objects constituting the device object model inherits an access right held for a class to which the object belongs.

Further preferably, an access right to each of the objects constituting the device object model is set to an access right held for an object including the object and being in an aggregation relationship therewith.

To attain the above object, in a second aspect of the present invention, there is provided an embedded device comprising a browser unit adapted to load content data containing at least document data described in a markup language, and to perform presentation based on the loaded content data, a control unit adapted to control information and operation of the embedded device, and an interface unit adapted to provide an interface via which the browser unit accesses the information and operation of the embedded device, controlled by the control unit, wherein the browser unit identifies a user currently utilizing the embedded device, based on a result obtained by gaining access, via the interface unit, to the information and operation of the embedded device, controlled by the control unit, and displays a content of a document according to the user.

To attain the above object, in a third aspect of the present invention, there is provided an embedded device comprising a browser unit adapted to load content data containing at least document data described in a markup language, and to perform presentation based on the loaded content data, a control unit adapted to control information and operation of the embedded device, and an interface unit adapted to provide an interface via which the browser unit accesses the information and operation of the embedded device, controlled by the control unit, wherein the browser unit determines information specific to the embedded device or a status of the embedded device based on a result obtained by gaining access, via the interface unit, to the information and operation of the embedded device, controlled by the control unit, and displays a content of a document according to the determination.

With the arrangement of the embedded device according to the third aspect of the present invention, the type of the embedded device, the type of each option unit mounted in the embedded device, the version of each of the embedded device and the option units, or the status of each of the embedded device and the option units is discriminated based on a result obtained by access to the information and operation of the embedded device, controlled by the control means via the interface means, and the content of a document is displayed based on the result of the discrimination, so that the content can be used, for example, to provide an electronic manual or the like optimized for the status of the very embedded device whose browser means is currently performing browsing.

Preferably, the information specific to the embedded device contains at least one of a type of the embedded device, a type of at least one option unit mounted in the embedded device, and versions of the embedded device and the option unit.

Preferably, the document contains at least one of a manual for at least one of the embedded device and at least one option unit mounted in the embedded device, a suggestion to a user, and information for referring to the manual or the suggestion.

To attain the above object, in a fourth aspect of the present invention, there is provided an embedded device comprising a browser unit adapted to load content data containing at least document data described in a markup language, and to perform presentation based on the loaded content data, a control unit adapted to control information and operation of the embedded device, and an interface unit adapted to provide an interface via which the browser unit accesses the information and operation of the embedded device, controlled by the control unit, wherein the browser unit determines whether or not an internal program is stored in the embedded device, based on a result obtained by gaining access, via the interface unit, to the information and operation of the embedded device, controlled by the control unit, and when an internal program is stored in the embedded device, displays a document containing a user input element for giving an instruction for starting the internal program.

To attain the above object, in a fifth aspect of the present invention, there is provided an embedded device comprising a control unit adapted to control information and operation of the embedded device, a script processing unit adapted to process a script, and an interface unit adapted to provide an interface via which the script processing unit gains access, based on the processing of the script, to the information and operation of the embedded device, controlled by the control unit, wherein the interface unit constructs a device object model for access by the script processing unit to the information and operation of the embedded device, controlled by the control unit, the device object model being constructed by associating objects to be processed by the script processing unit with respective resources constituting the embedded device, associating an attribute of each of the objects with an attribute of a corresponding one of the resources, associating an operation on each of the objects with an operation on a corresponding one of the resources, and associating a relationship between the objects associated with the respective resources, with a relationship between the resources.

Preferably, in the device object model, an abstract-concrete relationship is inherited, a concrete class being provided with at least a part of at least one of an attribute of an associated abstract class and an operation thereon, and each object belonging to each class being provided with at least a part of at least one of an attribute of the class and an operation thereon.

Preferably, in the device object model, a parent-child aggregation relationship is represented, and a whole object being provided with an operation or an attribute for searching zero or more partial objects associated with the whole object.

Preferably, the device object model is constructed by further associating events and exceptions generated for objects associated with the embedded device or respective ones of the resources of the embedded device, with events and exceptions generated for the embedded device or corresponding ones of the resources of the embedded device.

To attain the above object, in a sixth aspect of the present invention, there is provided a method of controlling an embedded device, comprising a browser step of loading content data containing at least document data which is described in a markup language and has a script or information for reference to a script embedded therein, and performing presentation based on the loaded content data, a control step of controlling information and operation of the embedded device, a script processing step of interpreting the document data contained in the loaded content data and processing the script or the information for reference to a script embedded in the document data, the script processing step being incorporated in the browser step, and an interface step of providing an interface via which access to the information and operation of the embedded device, controlled in the control step, is gained based on the processing of the script, in the script processing step.

To attain the above object, in a seventh aspect of the present invention, there is provided a method of controlling an embedded device, comprising a browser step of loading content data containing at least document data described in a markup language, and performing presentation based on the loaded content data, a control step of controlling information and operation of the embedded device, and an interface step of providing an interface via which access to the information and operation of the embedded device, controlled in the control step, is gained in the browser step, wherein the browser step comprises identifying a user currently using the embedded device, based on a result obtained by gaining access, in the interface step, to the information and operation of the embedded device, controlled in the control step, and displays a content of a document according to the user.

To attain the above object, in an eighth aspect of the present invention, there is provided a method of controlling an embedded device, comprising a browser step of loading content data containing at least document data described in a markup language, and performing presentation based on the loaded content data, a control step of controlling information and operation of the embedded device, and an interface step of providing an interface via which access to the information and operation of the embedded device, controlled in the control step, is gained in the browser step, wherein the browser step determines information specific to the embedded device or status of the embedded device based on a result obtained by gaining access, in the interface step, to the information and operation of the embedded device, controlled in the control step, and displays a content of a document according to the determination.

To attain the above object, in a ninth aspect of the present invention, there is provided a method of controlling an embedded device, comprising a browser step of loading content data containing at least document data described in a markup language, and performing presentation based on the loaded content data, a control step of controlling information and operation of the embedded device, and an interface step of providing an interface via which access to the information and operation of the embedded device, controlled in the control step, is gained in the browser step, wherein the browser step determines whether or not an internal program is stored in the embedded device, based on a result obtained by gaining access, in the interface step, to the information and operation of the embedded device, controlled in the control step, and when an internal program is stored in the embedded device, displays a document containing a user input element for giving an instruction for starting the internal program.

To attain the above object, in a tenth aspect of the present invention, there is provided a method of controlling an embedded device, comprising a control step of controlling information and operation of the embedded device, a script processing step of processing a script, and an interface step of providing an interface via which access to the information and operation of the embedded device, controlled in the control step, is gained based on the processing of the script in the script processing step, the interface step comprises constructing a device object model for access in the script processing step to the information and operation of the embedded device, controlled in the control step, the device object model being constructed by associating objects to be processed in the script processing step with respective resources constituting the embedded device, associating an attribute of each of the objects with an attribute of a corresponding one of the resources, associating an operation on each of the objects with an operation on a corresponding one of the resources, and associating relationships between the objects associated with the respective resources, with relationships between the resources.

To attain the above object, in an eleventh aspect of the present invention, there is provided a program for causing a computer to execute a method of controlling an embedded device, the method comprising a browser step of loading content data containing at least document data which is described in a markup language and has a script or information for reference to a script embedded therein, and performing presentation based on the loaded content data, a control step of controlling information and operation of the embedded device, a script processing step of interpreting the document data contained in the loaded content data and processing the script or the information for reference to a script embedded in the document data, the script processing step being incorporated in the browser step, and an interface step of providing an interface via which access to the information and operation of the embedded device, controlled in the control step, is gained based on the processing of the script, in the script processing step.

To attain the above object, in a twelfth aspect of the present invention, there is provided a computer-readable storage medium storing the program according to claim 29.

BRIEF DESCRIPTION OF THE DRAWINGS

FIG. 12 is a diagram showing, by way of example, the structure of data for managing a user account of each user utilizing the image processing apparatus in FIG. 1;

FIG. 13 is a diagram showing, by way of example, the structure of data for managing user groups that use the image processing apparatus in FIG. 1;

FIG. 19 is a view showing, by way of example, a document acquired from a server by the Web browser;

FIG. 20 is a continued part of the document in FIG. 19;

FIG. 21 is a view showing, by way of example, a dynamically adapted document displayed on the Web browser;

FIG. 22 is a view showing, by way of example, another dynamically adapted document displayed on the Web browser;

FIG. 24 is a view showing, by way of example, a document acquired from a server by a Web browser of an image processing apparatus to which is applied an embedded device according to a second embodiment of the present invention;

FIG. 25 is a continued part of the document in FIG. 24;

FIG. 26 is a continued part of the document in FIG. 25;

FIG. 28 is a view showing, by way of example, a document acquired from a server by a Web browser of an image processing apparatus to which is applied an embedded device according to a third embodiment of the present invention;

FIG. 29 is a continued part of the document in FIG. 28;

FIG. 30 is a view showing, by way of example, a dynamically adapted device management document displayed on the Web browser;

FIG. 31 is a view showing an example of the device management document dynamically modified again after completion of display immediately after document acquisition and displayed on the Web browser;

FIG. 32 is a view showing another example of the device management document dynamically modified again after completion of display immediately after document acquisition and displayed on the Web browser;

FIG. 33 is a view showing, by way of example, a document acquired from a server by a Web browser of an image processing apparatus to which is applied an embedded device according to a fourth embodiment of the present invention;

FIG. 34 is a continued part of the document in FIG. 33;

FIG. 38 is a view showing, by way of example, a user interface for referring to and setting an access right to a document resource instance as an example of a resource;

FIG. 39 is a view showing, by way of example, a user interface for referring to and setting an access right to a color copying function resource instance as another example of the resource;

FIG. 43 is a view showing, by way of example, a user interface displaying the aggregation relationship between resources for referring to and setting an access right to a printer unit resource class;

DETAILED DESCRIPTION OF THE PREFERRED EMBODIMENTS

The present invention will now be described in detail with reference to the drawings showing preferred embodiments thereof.

Figure 1:
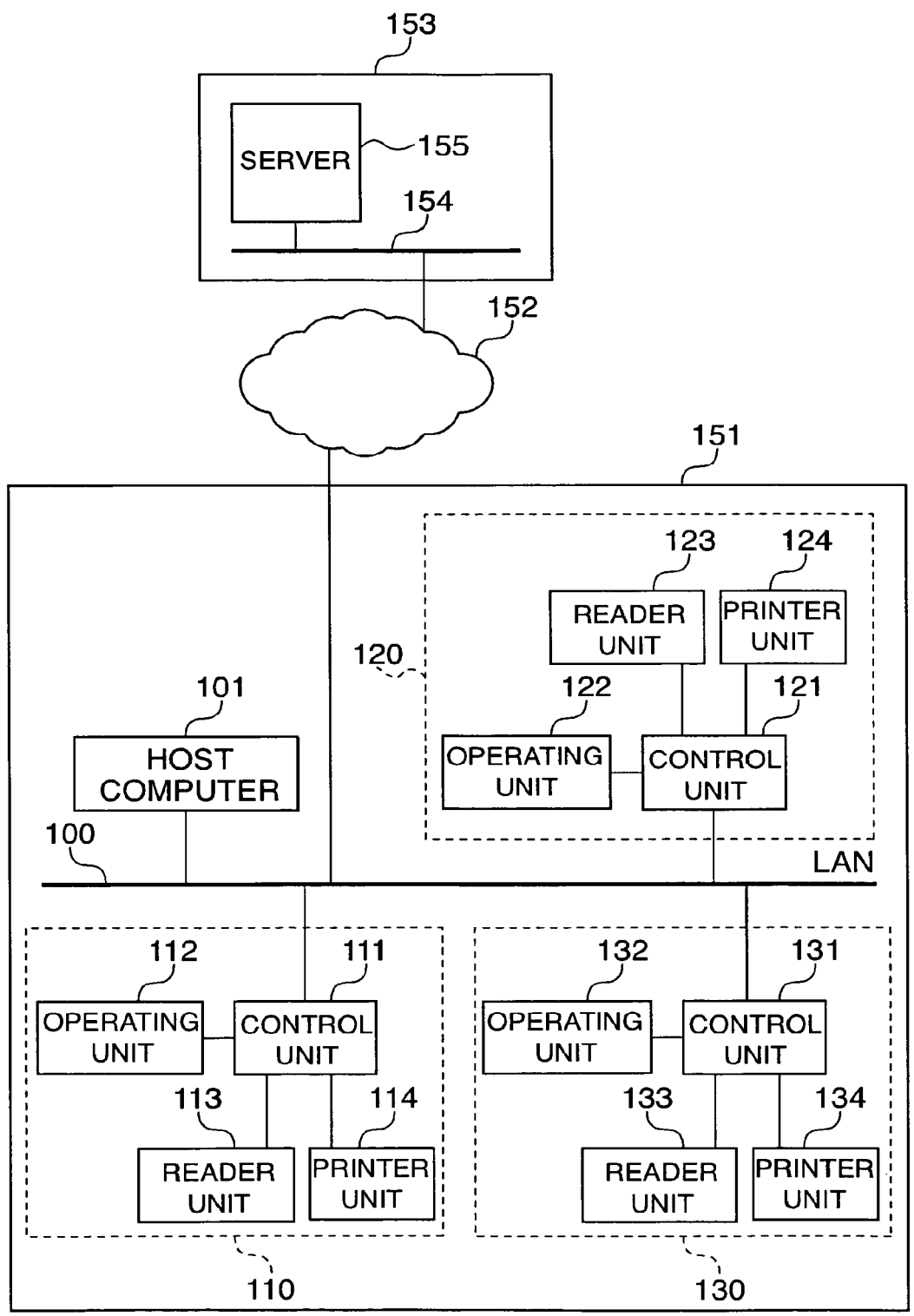
FIG. 1 is a block diagram showing the whole arrangement of an image processing system including image processing apparatuses to which is applied an embedded device according to a first embodiment of the present invention.

FIG. 1 is a block diagram showing the whole arrangement of an image processing system including image processing apparatuses to which is applied an embedded device according to a first embodiment of the present invention.

The image processing system is comprised of an application service provider (ASP) site 153, a wide area network 152, and a user site 151.

The wide area network 152 is the Internet, for example. Alternatively, the wide area network 152 may be a virtual private network (VPN) or a dedicated private network.

The ASP site 153 provides predetermined services for the user site 151 via the wide area network 152. Examples of the services provided by the ASP site 153 include provision, preparation, retrieval, storage, authentication, and distribution, printing, publication, management, translation, and consignment of information. Further, the ASP site 153 provides services for completing formalities in government offices, services for executing electronic commercial transactions, and so forth.

The ASP site 153 includes a local area network (LAN) 154, and a server 155.

The LAN 154 is a network within the ASP site 153, via which are interconnected network devices within the ASP site 153. Further, the LAN 154 is connected to the wide area network 152 via a router, not shown, or the like.

On the server 155, a software process group for implementing services provided by the ASP operates. The software process group is comprised of the following software modules: a HTTP server which transmits a content e.g. in HTML format in response to a HTTP request (request based on HTTP) from a client, a group of Web applications implemented as a CGI program, a Servlet, and so forth, and executed by the HTTP server in response to a HTTP request to perform predetermined processing and a dynamically varying HTTP response, and a group of business logics, such as an electronic commercial transaction program, and a back-end database management system, for use in execution of the predetermined processing by the CGI program and the Servlet.

The user site 151 is comprised of a host computer 101, a plurality of network apparatuses, such as the image processing apparatuses 110, 120, and 130, and a LAN 100 via which are interconnected the plurality of network apparatuses. The LAN 100 of the user site 151 is connected to the wide area network 152 via a router, not shown, or the like. The router also functions as a so-called firewall. More specifically, the router performs packet filtering and the like so as to protect the user site 151 from attacks from external networks. Further, the router can perform network address conversion and network port conversion for address management and the like. Communications between the user site 151 and the external networks are restricted by these functions of the router. In short, only communications using some specific protocols are allowed in many cases. For example, an outbound HTTP connection is a generally permitted communication, which is one of the reasons why provision of application services based on a general Web-based technique is effective.

Every one of the image processing apparatuses 110, 120, and 130 corresponds to the embedded device of the present embodiment. However, since the image processing apparatuses 110, 120, and 130 are the same in construction, the image processing apparatus 110 alone will be referred to as the embedded device of the present embodiment for convenience of description.

The image processing apparatus 110 is a MFP (Multi Function Peripheral) capable of inputting and outputting and transmitting and receiving images and performing various kinds of image processing. The image processing apparatus 110 is comprised of a reader unit 113 as an image input device, a printer unit 114 as an image output device, a controller unit 111, and an operating unit 112 as a user interface.

The reader unit 113, the printer unit 114, and the operating unit 112 are each connected to the controller unit 111 to be controlled by commands from the controller unit 111. The controller unit 111 is connected to network transmission means, such as the LAN 100.

The other image processing apparatuses 120 and 130 having the same apparatus configuration as the image processing apparatus 110 are also connected to the LAN 100. The image processing apparatus 120 is comprised of a reader unit 123, a printer unit 124, and an operating unit 122. The reader unit 123, the printer unit 124, and the operating unit 122 are connected to a controller unit 121 and controlled by the same. Similarly, the image processing apparatus 130 is comprised of a reader unit 133, a printer unit 134, and an operating unit 132, which are connected to a controller unit 131 and controlled by the same.

A host computer 101 is connected to the network transmission means, such as the LAN 100. The host computer 101 is provided with a Web browser, as will be described in detail hereinafter, and displays the status of each of the image processing apparatuses 110, 120, and 130 based on a HTML file received therefrom. Further, the host computer 101 receives services from the server 155 through HTTP connection.

Figure 2:
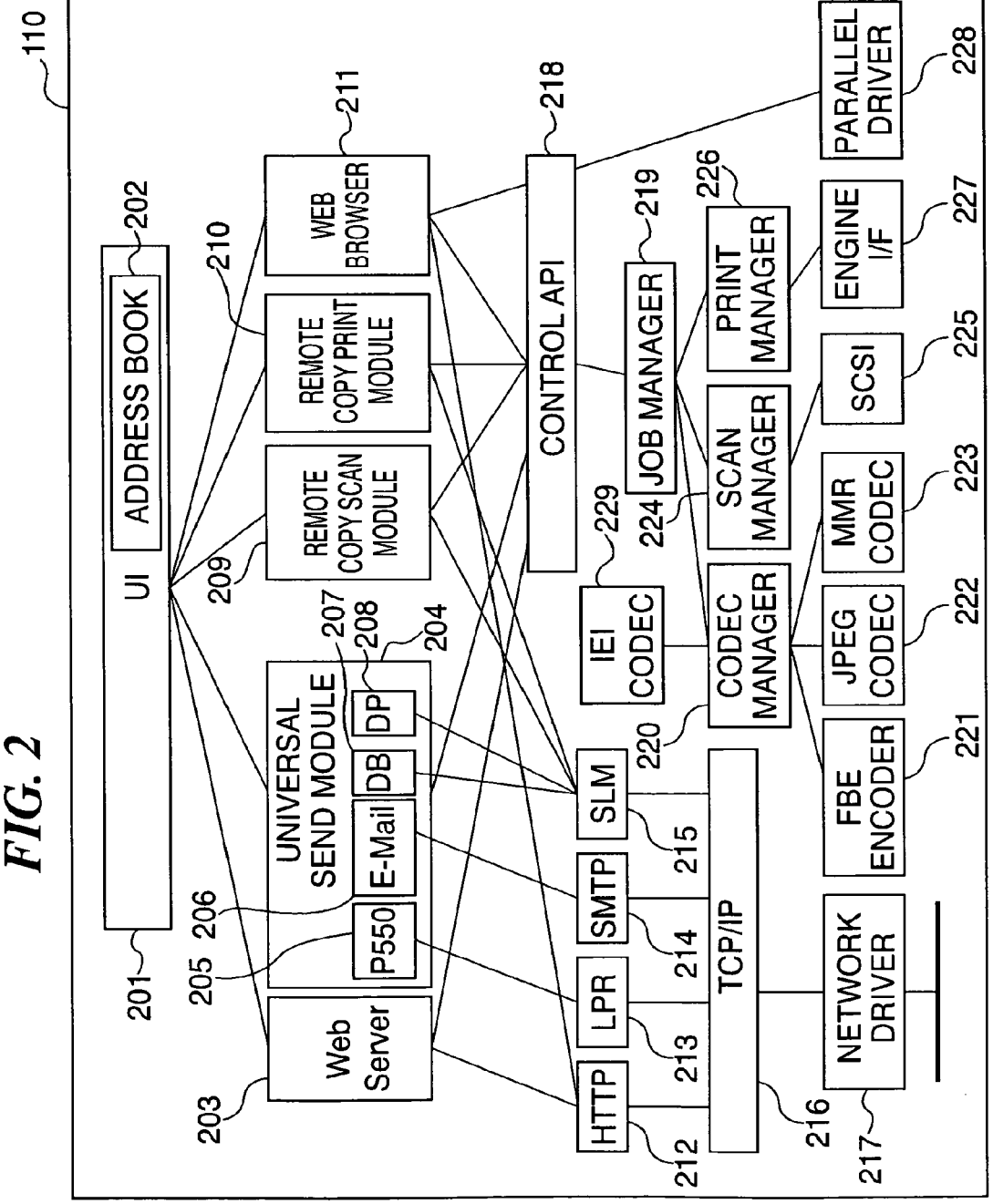
FIG. 2 is a block diagram showing the software configuration of the image processing apparatus in FIG. 1.

FIG. 2 is a block diagram showing the software configuration of the image processing apparatus 110. The other image processing apparatuses 120 and 130 are the same in software configuration as the image processing apparatus 110.

A user interface (hereinafter abbreviated as "UI") module 201 mediates between the apparatus and the user's operation for various operations and configuration or setting of the image processing apparatus 110. This module 201 transfers input information to various modules, described hereinafter, in response to user's operations so as to make requests for processing or for data settings.

An address-book module 202 manages data delivery destinations, communication destinations, and so forth. Data can be added to, deleted from, or acquired from data managed by the address-book module 202, by an operation via the UI module 201. Further, the address-book module 202 supplies data delivery/communication destination information to modules, referred to hereinbelow.

A Web server module 203 provides information described e.g. in HTML, in response to a request from a Web client (e.g. from the host computer 101), using HTTP.

A universal send module 204 controls data distribution. The module 204 distributes data designated by the user via the UI module 201 to a similarly designated communication (output) destination. Further, when the user instructs data for distribution to be generated using the scanner function of the image processing apparatus 110, the universal send module 204 causes a control API module 218, referred to hereinafter, to operate the image processing apparatus 110 to generate the data.

A P550 module 205 is executed in the universal send module 204 when a printer is designated as an output destination. An E-mail module 206 is executed in the universal send module 204 when an E-mail address is designated as a communication destination. A database (DB) module 207 is executed in the universal send module 204 when a database is designated as an output destination. A DP module 208 is executed in the universal send module 204 when an image processing apparatus similar to the image processing apparatus 110 is designated as an output destination.

A remote copy scan module 209 reads image information using the scanner function of the image processing apparatus 110 and outputs the read image information to another image processing apparatus connected to the image processing apparatus 110 via the network or the like, to thereby perform the copy function realized singly by the image processing apparatus 110, using the other image processing apparatus.

A remote copy print module 210 prints out image information acquired by another image processing apparatus connected to the image processing apparatus 110 via the network or the like, using the printer function of the image processing apparatus 110 to thereby perform the copy function realized singly by the image processing apparatus 110, using the other image processing apparatus.

A Web browser module 211 is for reading information from various kinds of Web sites (homepages) on the Internet or an intranet and displays the information. The configuration of the Web browser will be described in detail hereinafter.

A HTTP module 212 is used by the image processing apparatus 110 in performing HTTP communication. The HTTP module 212 provides communication functions for the Web server module 203 and the Web browser module 211 using a TCP/IP (Transmission Control Protocol/Internet Protocol) communication module 216, referred to hereinafter. The module 212 is compatible with various protocols, including HTTP, used on the Web, and also provides communication functions, particularly using security protocols.

A LPR module 213 provides a communication function for the printer module 205 within the universal send module 204, using the TCP/IP communication module 216.

An SMTP (Simple Mail Transfer Protocol) module 214 provides a communication function for the E-mail module 206 within the universal send module 204, using the TCP/IP communication module 216.

A SLM (Salutation Manager) module 215 provides a communication function for the database module 207 and the DP module 208 within the universal send module 204, the remote copy scan module 209, and the remote copy print module 210, using the TCP/IP communication module 216.

The TCP/IP communication module 216 provides a network communication function for each of the above described modules using a network driver 217, described below.

The network driver 217 controls system parts physically connected to the network.

The control API module 218 provides interface with downstream modules including a job manager module 219, described below, for the universal send module 204 and other upstream modules. The control API module 218 thus serves to reduce dependence between the upstream modules and the downstream modules, thereby enhancing versatility of each of the modules.

The job manager module 219 interprets various kinds of processing designated by the above described modules via the control API module 218, and gives instructions to modules 220, 224, and 226, referred to hereinafter. Further, the job manager module 219 performs centralized control of processing carried out by hardware of the image processing apparatus 110.

The CODEC manager module 220 controls various types of data compression and expansion during processing designated by the job manager module 219.

An encoder module 221 compresses data scanned in scan processing carried out by the job manager module 219 or the scan manager 224, described hereinafter, using a predetermined encoding method.

A JPEG (Joint Photographic Expert Group) codec module 222 is used to JPEG-compress data scanned in scan processing carried out by the job manager module 219 or the scan manager 224 or to expand JPEG-compressed print data in print processing carried out by the print manager module 226.

A MMR (Modified Modified READ) codec module 223 is used to MMR-compress data scanned in scan processing carried out by the job manager module 219 or the scan manager 224 or to expand MMR-compressed print data in print processing carried out by the print manager module 226.

An IEI CODEC module 229 is used to decode information embedded in data scanned in scan processing carried out by the job manager module 219 or the scan manager 224, or to embed information in print image data in print processing carried out by the print manager module 226. Information is embedded in image data using an encoding technique, such as bar code and digital watermarking. The IEI CODEC module 229 also supports character recognition in which characters in an image of image data are recognized by image area separation and an OCR (Optical Character Reader) technique and converted into text data, as a kind of decoding technique. Further, conversion of text data into image data and overlaying of the image data obtained by the conversion and original image data, which are performed using a raster image processor, is supported as a kind of encoding technique (information embedding technique).

The scan manager module 224 controls scan processing designated by the job manager module 219.

A SCSI (Small Computer System Interface) driver 225 provides communication interface between the scan manager module 224 and the reader unit 113 internally connected to the image processing apparatus 110.

The print manager module 226 controls print processing designated by the job manager module 219.

An engine interface module 227 provides interface between the print manager module 226 and the printer unit 114.

A parallel port driver 228 provides interface when a data print function, such as a reference print function of the Web server module 203 or a Web pullprint function of the Web browser module 211, outputs data to an output device, not shown, via a parallel port.

Figure 3:
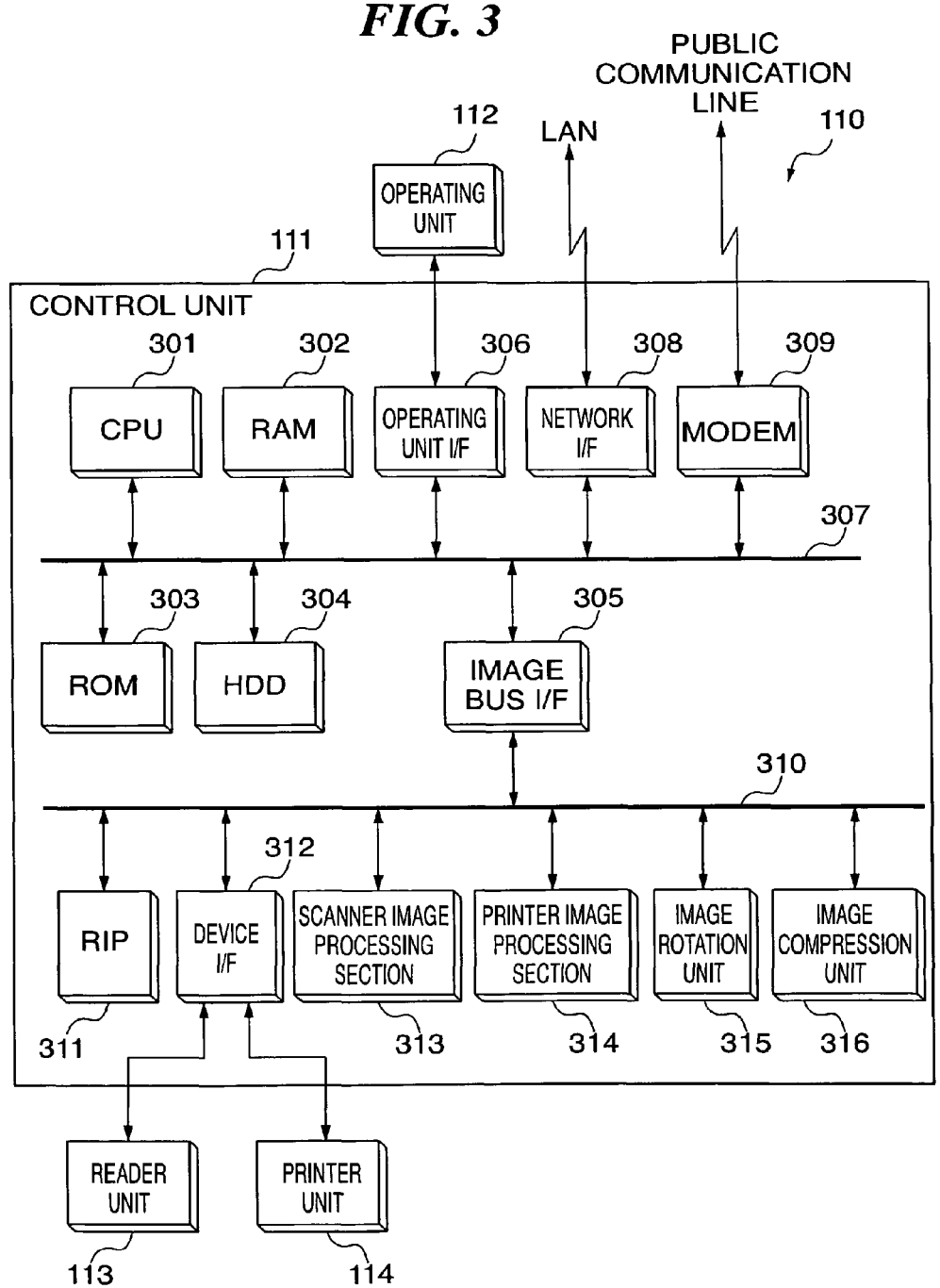
FIG. 3 is a block diagram showing the hardware configuration of the image processing apparatus in FIG. 1.

FIG. 3 is a block diagram showing details of the hardware configuration of the image processing apparatus 110.

The controller unit 111 is connected to the reader unit 113 as an image input device and the printer unit 114 as an image output device as well as to the LAN and the public communication line (WAN) so as to input and output image information and device information.

A CPU 301 is a controller that controls the overall operation of the image processing apparatus 110.

A RAM 302 is a system work memory used for the CPU 301 to operate. The RAM 302 also functions as an image memory for temporarily storing image data.

A ROM 303 is a boot ROM, and stores a boot program for the system.

A HDD 304 is a hard disk drive, and stores system software and image data.

An operating unit I/F 306 provides interface with the operating unit (UI) 112, and outputs to the operating unit 112 image data to be displayed on a display, not shown, of the same. The operating unit I/F 306 also plays the role of transferring data input by the user via the operating unit 112 to the CPU 301.

A network I/F 308 provides interface with the LAN 100, and inputs/outputs information via the LAN 100.

A modem 309 provides interface with the public communication line, and inputs/outputs information via the public communication line.

The above described devices 301 to 306, 308, and 309 are arranged on a system bus 307.

An image bus I/F 305 is a bus bridge that connects between the system bus 307 and an image bus 310 for high-speed transmission of image data, and at the same time converts the data structure of the image data.

The image bus 310 is implemented by a PCI (Peripheral Component Interconnect) bus or an IEEE 1394 bus.

On the image bus 310, there are arranged devices 311 to 316 described below.

A raster image processor (RIP) 311 expands a PDL (Page Description Language) code received from the network into a bitmap image. The RIP 311 not only processes the PDL code, but also carries out processing for direct printing in which PDF (Portable Document Format) data or application data specific to each application is expanded into a bitmap image.

A device I/F unit 312 connects between the controller unit 111 and the reader unit 113 as an input device and the printer unit 114 as an output device to perform synchronous-to-asynchronous or asynchronous-to-synchronous conversion of image data.

A scanner image processing section 313 corrects, processes, and edits input image data.

A printer image processing section 314 performs correction, resolution conversion, etc. of image data to be printed out.

An image rotation unit 315 rotates image data.

An image compression unit 316 compresses or expands multi-valued image data using a JPEG format, and binary image data using a JBIG (Joint Bi-level Image experts Group), MMR or MH (Modified Huffman) format.

Figure 4:
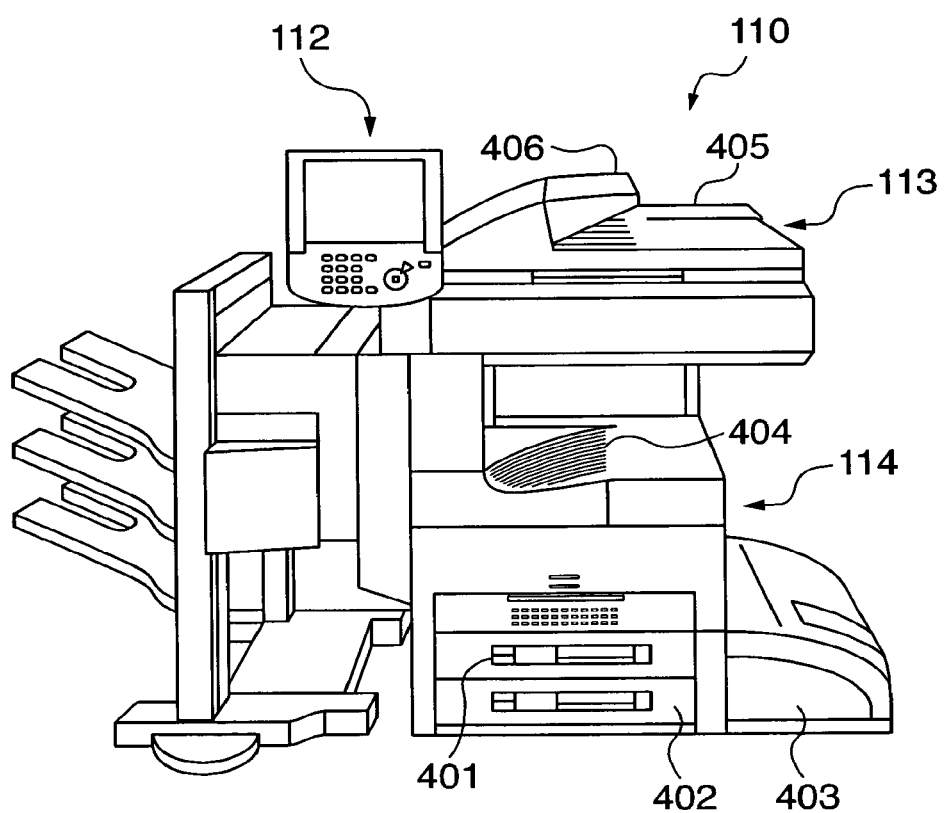
FIG. 4 is a perspective view showing the appearance of the image processing apparatus in FIG. 1.

FIG. 4 is a view showing the appearance of the image processing apparatus 110.

The reader unit 113 as an image input device illuminates an image on a sheet as an original and scans the image by a CCD line sensor, not shown, to thereby generate raster image data.

When the user sets original sheets on a tray 406 of an original feeder 405 and operates the operating unit 112 to instruct the image processing apparatus 110 to read an original image, the CPU 301 in FIG. 3 gives the instruction to the reader unit 113. In response to this instruction, a feeder 405 feeds the original sheets one by one, and the reader unit 113 sequentially reads original images.

The printer unit 114 as an image output device prints out raster image data on a sheet. Examples of the printing method include the electrophotographic printing method using a photosensitive drum or a photosensitive belt, and the inkjet printing method in which an image is directly printed on a sheet by jetting ink onto the sheet from an array of small nozzles, and any suitable printing method may be employed. A printing operation is carried out in response to an instruction from the CPU 308.

The printer unit 114 is provided with a plurality of sheet feed stages such that a desired sheet size or a desired sheet orientation can be selected and sheet cassettes 401, 402, and 403 associated with the respective sheet feed stages. A discharge tray 404 receives printed sheets.

Figure 5:
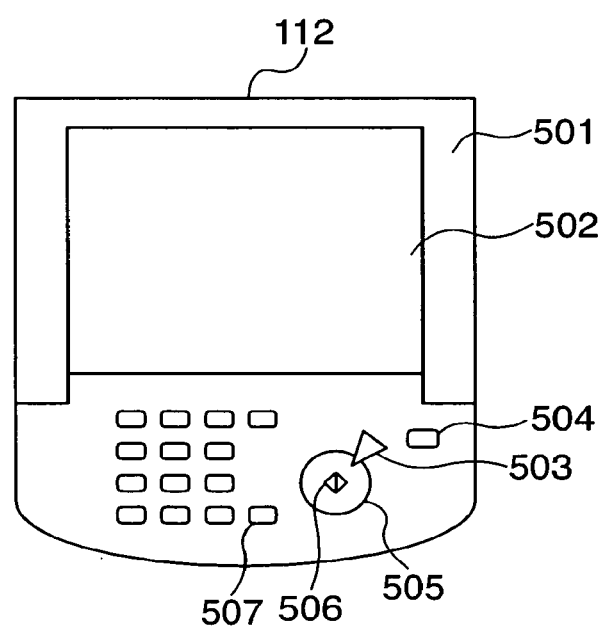
FIG. 5 is a view showing details of the appearance of an operating unit appearing in FIG. 4.

FIG. 5 is a view showing details of the appearance of the operating unit 112.

A LCD display unit 501 is provided with a LCD 502 having a touch panel sheet affixed thereon, and displays a system operating screen and keys realized by software (hereinafter referred to as "software keys"). When a software key displayed on the LCD 502 is pressed, the LCD display unit 501 transmits position information indicative of the pressed position to the CPU 301.

A start key 505 is used e.g. for starting an operation of reading an original image. In the center of the start key 505, there is provided an LED indicator 506 formed by two LEDs which emit a green light and a red light, to indicate whether or not the function of the start key 505 is available.

A stop key 503 is operated to stop a current operation of the system.

An ID key 507 is used to enter a user ID.

A reset key 504 is used to initialize settings configured by inputs via the operating unit 112.

Figure 6:
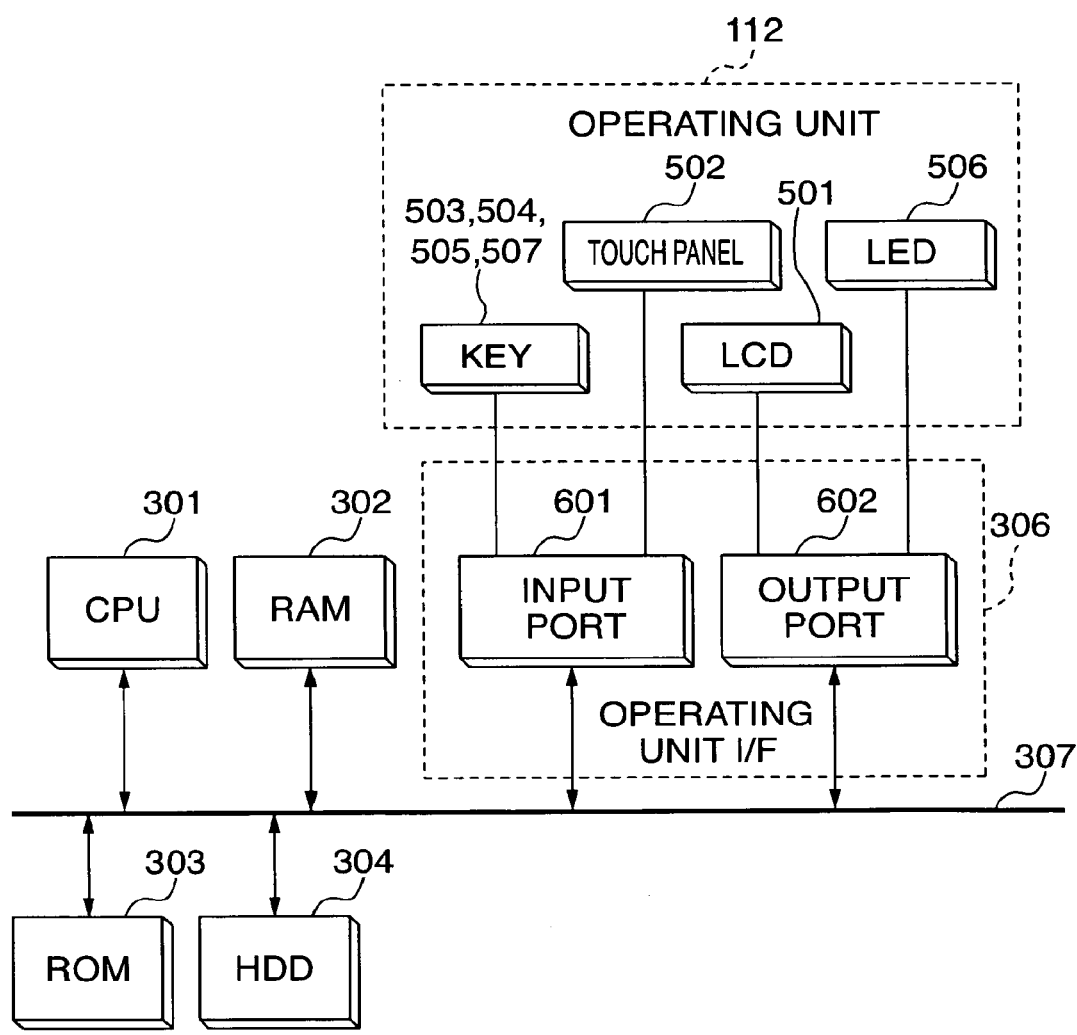
FIG. 6 is a block diagram showing details of the functional configuration of the operating unit in FIG. 5.

FIG. 6 is a block diagram showing details of the functional configuration of the operating unit 112.

As described hereinabove, the operating unit 112 is connected to the system bus 307 via the operating unit I/F 306, and the CPU 301, the RAM 302, the ROM 303, and the HDD 304 are connected to the system bus 307. The CPU 301 performs centralized control of access to the various devices connected to the system bus 307, based on control programs stored in the ROM 303 and the HDD 304. Further, the CPU 301 reads input information from the reader unit 113 connected thereto via the device I/F 312, and outputs an image signal as output information to the printer unit 114 connected to the CPU 301 via the device I/F 312. The RAM 302 is the main memory of the CPU 301, and functions as a work area or the like for the CPU 301.

A user input from the touch panel 502 or the key 503, 504, 505 or 507 realized by hardware is transmitted to the CPU 301 via an input port 601. The CPU 301 generates display screen data based on user inputs and control programs, and outputs the generated display screen data to the LCD display unit 501 via an output port 602 that is used to control a screen output device. Further, the CPU 301 controls the LED indicator 506 as required.

Figure 7:
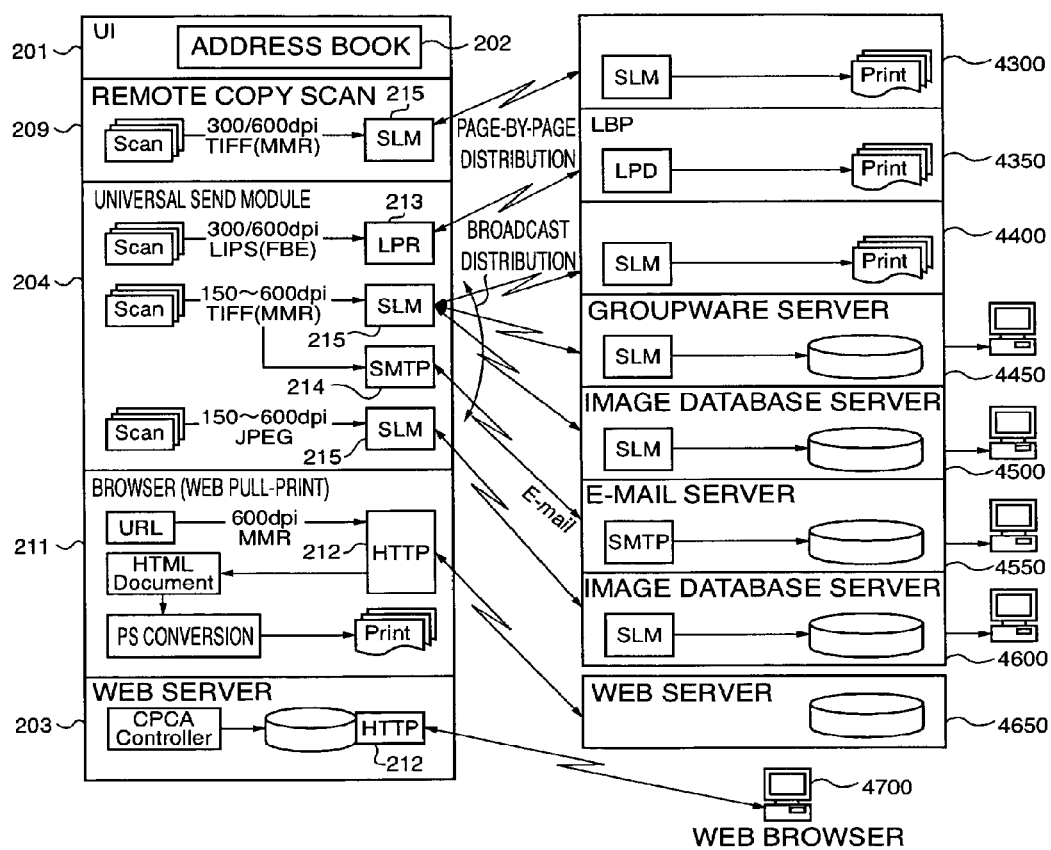
FIG. 7 is a block diagram showing, by way of example, a network configuration, which is useful in explaining the operation of applications incorporated in the image processing apparatus in FIG. 1.

FIG. 7 is a block diagram of an example of network configuration, which is useful in explaining the operation of an application embedded in the image processing apparatus 110.

In FIG. 7, reference numeral 4300 designates a multi-function machine on a receiver side (printing side) in remote copying. Reference numeral 4350 designates a printer apparatus, such as a laser beam printer (LBP), for receiving and printing image data distributed from the universal send module 204 by broadcast distribution. Reference numeral 4400 designates a device on a receiver side (printing side) in remote printing. Reference numeral 4450 designates a groupware server for receiving and storing image data distributed by broadcast distribution. Reference numerals 4500 and 4600 designate image database servers for receiving and storing binary image data distributed by broadcast distribution. Reference numeral 4550 designates a mail server for receiving and storing an e-mail distributed by broadcast distribution. Reference numeral 4650 designates a Web server having an information content. Reference numeral 4700 designates a Web browser for accessing a Web server or the like.

The UI module 201 was described in detailed hereinabove, and hence a description will now be given of the address-book module 202.

The address-book module 202 is stored in a nonvolatile memory, such as a battery-backed up memory or a hard disk, within the image processing apparatus 110, and the features of apparatuses connected to the network are written in the address-book module 202. More specifically, the address-book module 202 contains pieces of information listed as follows:

(1) the formal name and alias name of each apparatus
(2) the network address of each apparatus
(3) network protocols compatible with each apparatus
(4) document formats compatible with each apparatus
(5) compression types compatible with each apparatus
(6) image resolutions compatible with each apparatus
(7) information on sizes of feedable sheets and sheet feed stages for printer apparatuses
(8) the names of folders which can store documents, for server apparatuses Each of applications described below is capable of discriminating the features of a distribution destination based on information written in the address-book module 202. The address-book module 202 is editable, and pieces of information stored e.g. in servers within the network are downloaded and used by the address-book module 202. Alternatively, the pieces of information stored in the servers can be directly referred to.

A remote copy application executed by the remote copy scan module 209 converts binary image data read by a scanner into a MMR-compressed and TIFF (Tagged Image File Format) formatted file, based on information on a resolution compatible with an apparatus designated as a distribution destination, which can be recognized from the address-book module 202, followed by transmitting the file e.g. to the multi-function machine 4300 on the network via the SLM module 215.

Differently from the remote copy application, a broadcast distribution application executed by the universal send module 204 is capable of transmitting image data given by one-time image scanning to a plurality of distribution destinations. Further, the distribution destinations are not limited to printer apparatuses, but the image data can be directly distributed e.g. to servers. In the following, a description will be given on a destination-by-destination basis.

When it is determined from the address-book module 202 that a network printer protocol used by destination apparatuses is LPD (Line Printer Daemon) and the apparatuses are capable of processing the known print description language (PDL), an image is read according to an image resolution of the apparatus similarly recognizable from the address book 202, compressed by the encoder module 221, converted into PDL data, and then transmitted by the LPR module 213 to each destination apparatus, such as the printer apparatus 4350.

When the destination apparatuses can perform communication through a SLM and are servers, the address of each server and the designated folder in the server are recognized from the address-book module 202, and then, as in the remote copy application, binary image data read by the scanner can be MMR-compressed and converted into a TIFF file, and then be stored in the designated folder in the server, such as the server 4550 or 4500, on the network via the SLM module 215. Further, when it is determined that destination servers are capable of processing a JPEG-compressed multivalued image, image data read by the scanner can be JPEG-compressed and converted into a JFIF (JPEG File Interchange Format) file, and then be stored in a specific folder in each server, such as the server 4600, on the network via the SLM module 215.

When a destination apparatus is an E-mail server, mail addresses written in the address-book module 202 are recognized, binary image data read by the scanner is MMR-compressed and converted into a TIFF file, and then transmitted to the E-mail server, such as the E-mail server 4550, on the network via the SMTP module 214. Thereafter, data distribution is performed by the E-mail server 4550.

A Web-pullprint application executed by the Web browser module 211 prints Web site information e.g. of the Web server 4650.

A Web server application executed by the Web server module 203 supplies information described e.g. in HTML to the Web browser 4700, etc. via the HTTP module 212. The Web server application not only generates static information, such as a HTML document, but also dynamically generates a document reflecting apparatus management information and provides e.g. the Web browser 4700 with the document. The management information is acquired via the universal send module 204, the remote copy scan module 209, the remote copy print module 210, and the control API module 218, and sent to the Web clients via the HTTP module 212, the TCP/IP communication module 216, and the network driver 217. Further, the Web server module 203 also provides the reference print function for the Web clients. In reference printing, a Web client transmits URL information to the Web server module 203, as a content of a HTTP POST request (or by embedding the information in a portion of a path defined in a HTTP GET request). The Web server module 203 receives the URL information and acquires data from a site indicated by the received URL information, using HTTP. Then, the Web server module 203 passes the acquired data to the control API module 218 without processing the same, whereby printing of the data is performed. When data described in various PDLs and the like and printable by a printer are stored in sites allowing data acquisition using HTTP, a client has only to designate a URL associated with each of the sites for a Web server to achieve desired printing (i.e. simply by sending data references in place of data entities). The printer can be equipped with a direct print function for directly printing PDF data or application data, so that it is possible to efficiently print various kinds of data stored in the Web servers on the network in a scattered manner.

Figure 8:
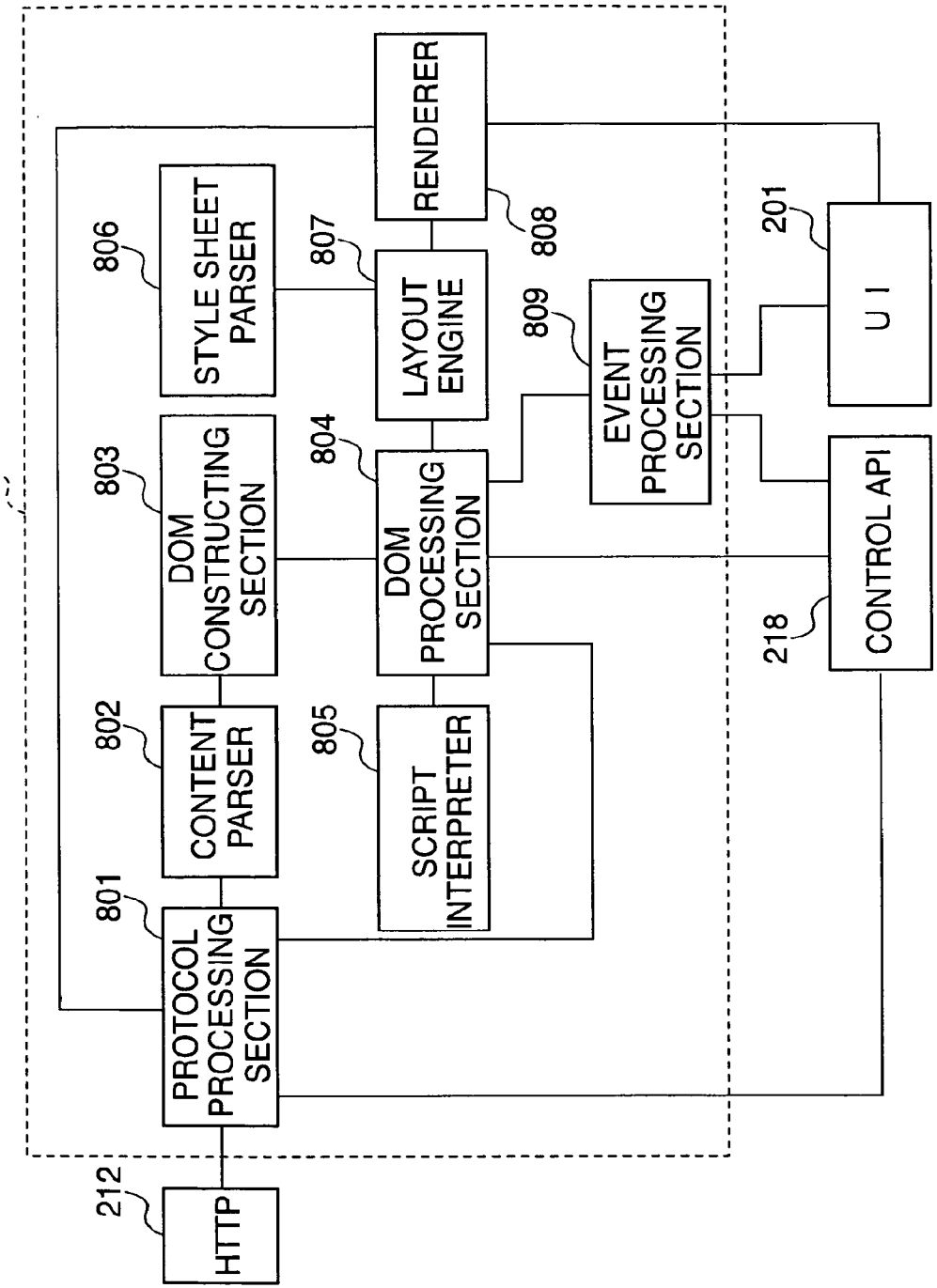
FIG. 8 is a block diagram showing the software configuration of a Web browser module appearing in FIG. 2.

FIG. 8 is a block diagram showing the software configuration of the Web browser module 211.

A protocol processing section 801 establishes connection to an external network node via the HTTP module 212 for communication. More specifically, the protocol processing section 801 issues a HTTP request to a resource described by a URL, and obtains a response to the request. In this process, encoding/decoding of communication data is also performed according to selected one or more of various coding formats. When text data having a structure described in a markup language, such as HTML, and data to be embedded in the structure, such as images, a script, and a style, are acquired, the protocol processing section 801 passes these data to a content parser 802. On the other hand, when a content in text data format, in which an entire page does not have an image data format or a structure, has been acquired, the protocol processing section 801 passes the data to a renderer 808. In response to this, the renderer 808 performs rendering and causes the UI module 201 to display the result of the rendering.

Further, when data in a format that cannot be processed by the Web browser module 211 has been acquired, the protocol processing section 801 determines that the data is to be subjected to alternative processing, described hereinafter, and passes the data to the control API module 218.

The content parser 802 receives content data expressed in an expression format, such as HTML, XML (Extensible Markup Language), or XHML (Extensible Hypertext Markup Language), performs word/phrase analysis and syntax analysis, and generates a parse tree.

A DOM constructing section 803 receives the parse tree and constructs a DOM corresponding to the structure of the content data. The conventional HTML allows various grammatical omissions and diverse variations. Moreover, contents presented in the actual world are often not properly formatted. To solve the problems, the DOM constructing section 803 infers a proper logical structure which grammatically improper content data should have, and attempts to construct a proper DOM.

A DOM processing section 804 holds and manages the DOM constructed by the DOM constructing section 803, in a memory, as a tree structure expressing the nested relationship of object groups. The Web browser module 211 carries out various processes based on this DOM.

A layout engine 807 recursively determines a display presentation of each object according to the tree structure of the object group held by the DOM processing section 804, whereby the layout of an entire document is eventually obtained. The display presentation of each object can be explicitly specified in the form of a style sheet, such as a CSS (Cascading Style Sheet), by a description embedded in the document or a description in another file linked to the document.

A style sheet parser 806 analyzes the style sheet related to the content document.

The layout engine 807 determines the layout of the document such that the layout reflects results of the analysis of the style sheet performed by the style sheet parser 806.

The renderer 808 generates GUI (Graphical User Interface) data to be displayed on the LCD display unit 501, in accordance with the document layout determined by the layout engine 807. The generated GUI data is displayed on the LCD display unit 501 by the UI module 201.

An event processing section 809 events inputted by the user's operations on the touch panel 502 or keys of the operating unit 112, and carries out processing in accordance with the events. The event processing section 809 also receives status transition events of apparatuses and jobs from the control API module 218 and carries out processing in accordance with each of the events.

In the tree structure of the DOM managed by the DOM processing section 804, there are registered event handlers that handle the respective events, on an object class-by-object class basis and on an object instance-by-object instance basis.

In accordance with an event that has occurred, the event processing section 809 determines an object which should handle the event, from the object group managed by the DOM processing section 804, and transmits the event to the object. The object having received the event executes various processes according to the algorithm of an event handler corresponding to the event. Processing executed by the event handlers include updating of the DOM held by the DOM processing section 804, issuing of a redrawing command to the layout engine 807, issuing of a HTTP request-issuing command to the protocol processing section 801, and control of the functions of an image processing apparatus by calling the control API module 218.

A script interpreter 805 interprets and executes a script written e.g. in JavaScript or ECMAScript. The script is embedded in a document, or described in another file linked to the document, for manipulation of the DOM or the like. A content provider can use the script to program the dynamic behavior of a document to be provided.

Figure 9:
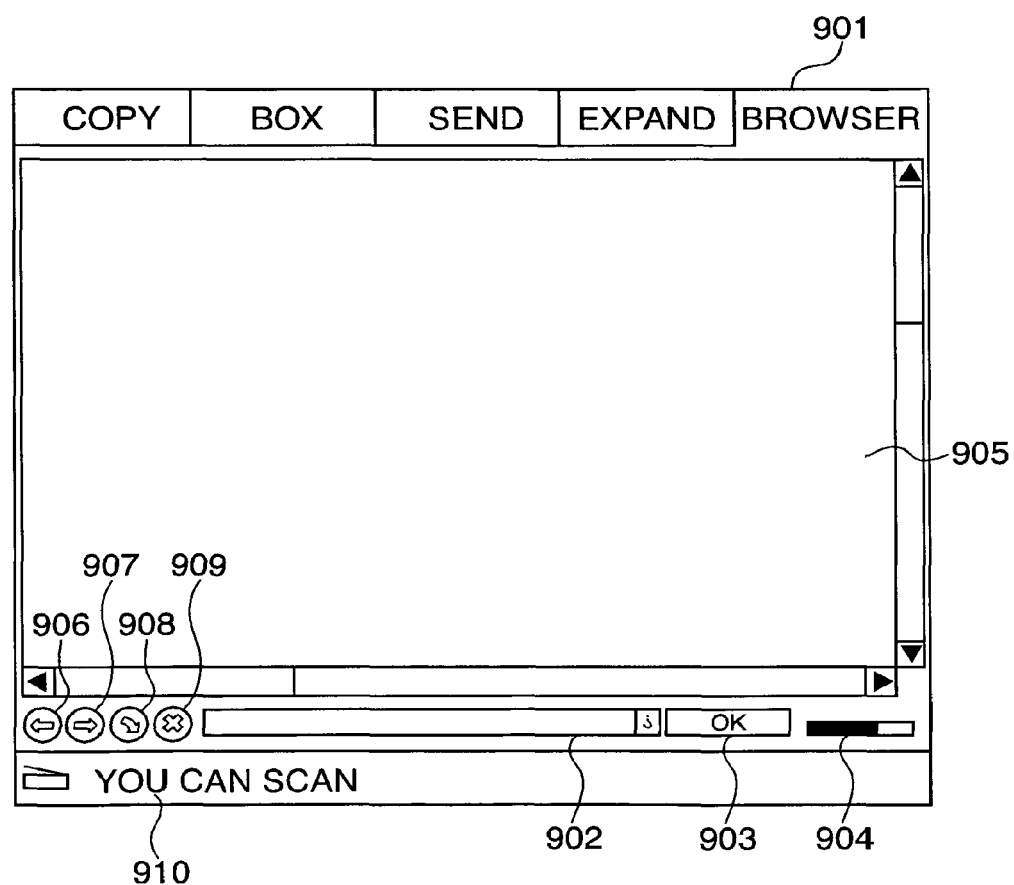
FIG. 9 is a view showing, by way of example, the layout of a screen of a Web browser, which is displayed on a LCD display unit appearing in FIG. 5.

FIG. 9 is a view showing, by way of example, the layout of a screen of a Web browser, which is displayed on the LCD display unit 501.

A tab 901 shown in FIG. 9 is used for screen switching between the Web browser function and the other functions (copying, boxing, transmission, and expansion functions).

A URL entry field 902 is used by the user to enter a URL of a desired resource. When the user designates this field, a virtual full keyboard, not shown, for entering characters is displayed. The user can enter a desired character string using software keys arranged on the virtual full keyboard in a manner imitating key tops.

An OK button 903 is a software key used for determining an entered URL character string. When the URL is determined, the Web browser module 211 issues a HTTP request for acquisition of the resource.

A progress bar 904 indicates the progress of content acquisition processing executed in response to the HTTP request.

A content display area 905 displays the acquired resource.

A return button 906 is a software key for redisplaying a content displayed before the currently displayed one when going back to contents displayed in the past according to the history of display thereof.

An advance button 907 is a software key for advancing the displayed content to a content displayed after the currently displayed one when going back to contents displayed in the past according to the history of display thereof.

A reload button 908 is a software key for reacquiring and redisplaying the currently displayed content.

A stop button 909 is a software key for stopping content acquisition processing being currently executed.

A status area 910 displays messages from the functions of the image processing apparatus 110. Even when a Web browser screen is being currently displayed, a message sent from the reader unit 113, the printer unit 114, or some other function, for attracting the attention of the user can be displayed in the status area 910. Similarly, messages from the Web browser function are displayed in the status area 910. The Web browser function displays a URL character string of a link destination, a title character string associated with a content, or a message designated by a script, in the status area 910.

Figure 10:
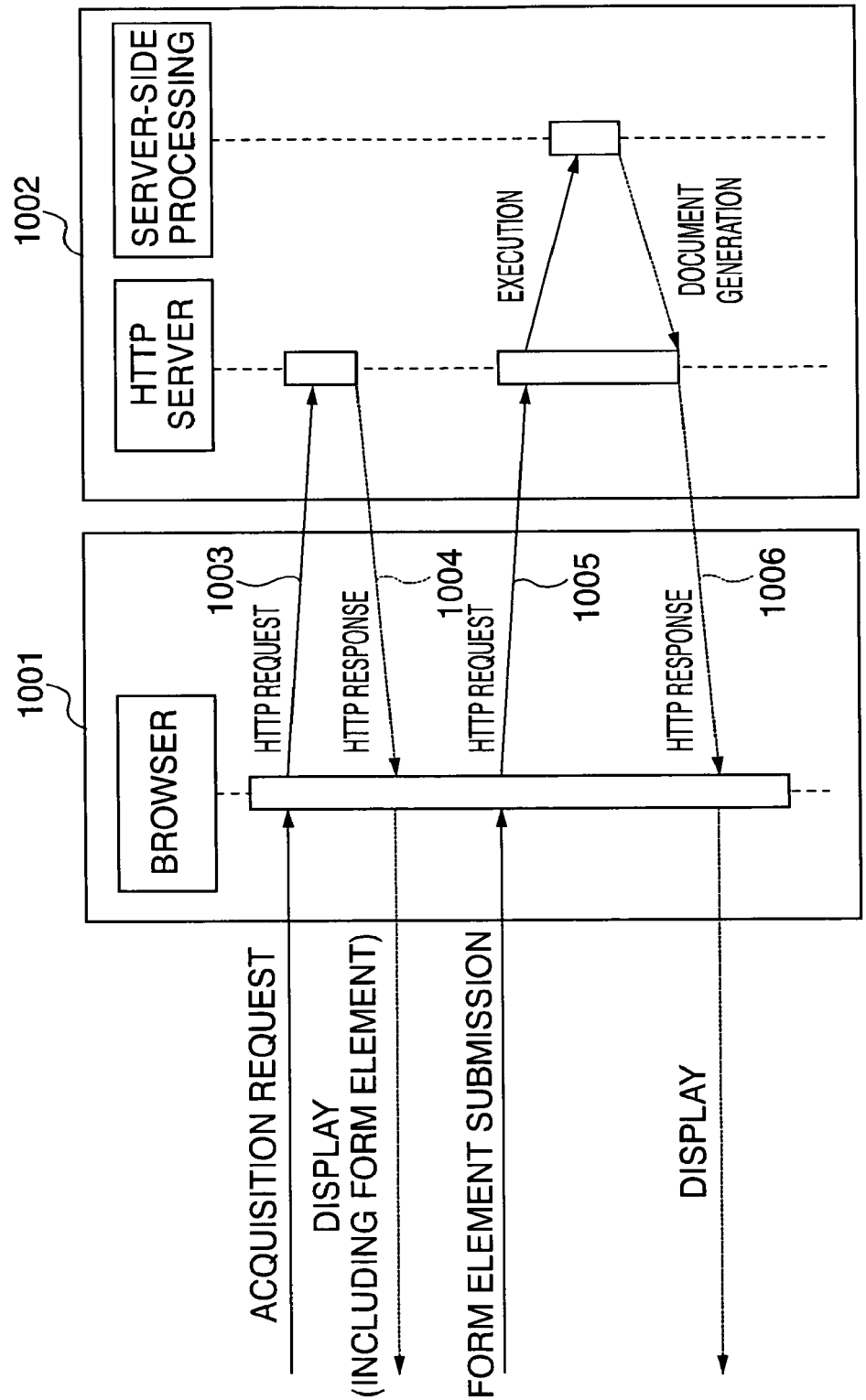
FIG. 10 is a sequence diagram showing, by way of example, a flow of request and response processing using HTTP.

FIG. 10 is a sequence diagram showing, by way of example, a flow of request and response processing using the HTTP.

A client 1001 is software that transmits HTTP requests and receives HTTP responses. The client 1001 corresponds to a Web browser built in the image processing apparatus 110, a general Web browser operating on a PC (Personal Computer), a PDA (Personal Digital Assistant), a cellular phone or the like, or each of various software programs for accessing a Web server by the same method as used by the Web browser, and utilizing or relaying services.

A server 1002 is software that receives a HTTP request, carries out processing in response to the HTTP request, and then sends a HTTP response. The server 1002 corresponds to each of HTTP servers including the software operating on the server 155.

In a HTTP request 1003, the client 1001 transmits a GET request for a desired resource to the server 1002. In general, a resource is designated in URI (Uniform Resource Identifier) (particularly, URL) format. The server 1002 acquires or generates data associated with the resource designated in the GET request, and sends the data as a HTTP response 1004. When the designated resource is associated with a static file, the server 1002 reads the file from a file system of the server 155, to acquire data thereof. On the other hand, when the designated resource is associated with processing executed by a CGI program or a Servlet, the server 1002 performs the processing. That is, server-side processing is executed. The server-side processing is executed to generate a response to a request, and during the execution of the server-side processing, a side effect, such as execution of business logic needed to achieve a predetermined service, or access to a back-end database management system, can be provided. Then, the server 1002 sends data generated through the server-side processing. For example, when a resource for displaying a catalog of consumables used by the image processing apparatus 110 is designated, software for electronic commerce is executed, and pieces of information obtained by referring to records including latest price information and stock status information of sheets, toners, and component parts are formatted in HTML or XML to thereby generate catalog document data.

When the data obtained from the HTTP response 1004 is formatted such that the data can be displayed, the client 1001 displays the content of the data. If the obtained data is a HTML document, for example, with reference information (such as an image, an embedded object, the URI of an acquisition source of the HTML document, and so forth) of other resources embedded therein, the Web browser repeats transmission of a HTTP request a number of times required for acquisition of the other resources for reference. When obtained data is a document formatted e.g. in HTML, the Web browser can repeatedly acquire and display new resources one after another simply by the user selecting an anchor, such as a hypertext in a page displayed on a Web browser, in which link information is embedded.

A HTTP request 1005 is a POST request. If a HTML document contains a form element (FORM), and POST is designated as a method thereof, a POST request for a designated resource is transmitted when the user submits the form element. In the POST request, data is transmitted from the client 1001 to the server 1002 (transmission of data from the server 1002 to the client 1001 is also performed as a response). Information input by the user is encoded in the form element (FORM) displayed on the Web browser, and sent to the server 1002 as a POST request. The designated resource in the server 1002 receives the data sent from the client 1001, and performs processing. Then, the designated resource generates a HTTP response 1006, and sends the same to the client 1001.

The client 1001 can show its own identity to the server 1002 by the User-Agent attribute of the protocol header contained in a message transmitted as a HTTP request from the client 1001 to the server 1002. As the value of the User-Agent header, there is entered a specific character string indicative of implementation of the embedded Web browser.

The data type of data sent from the server 1001 to the client 1002 as a HTTP response is described by the Content-Type attribute of the protocol header of the HTTP response. More specifically, in the Content-Type, a descriptor of the data type is described e.g. when a HTML document is transmitted in the HTTP response, as:

Content-Type: text/html; charset=ShiftJIS, and when a PDF document is transmitted in the HTTP response, as:

Content-Type: application/pdf

Figure 11:
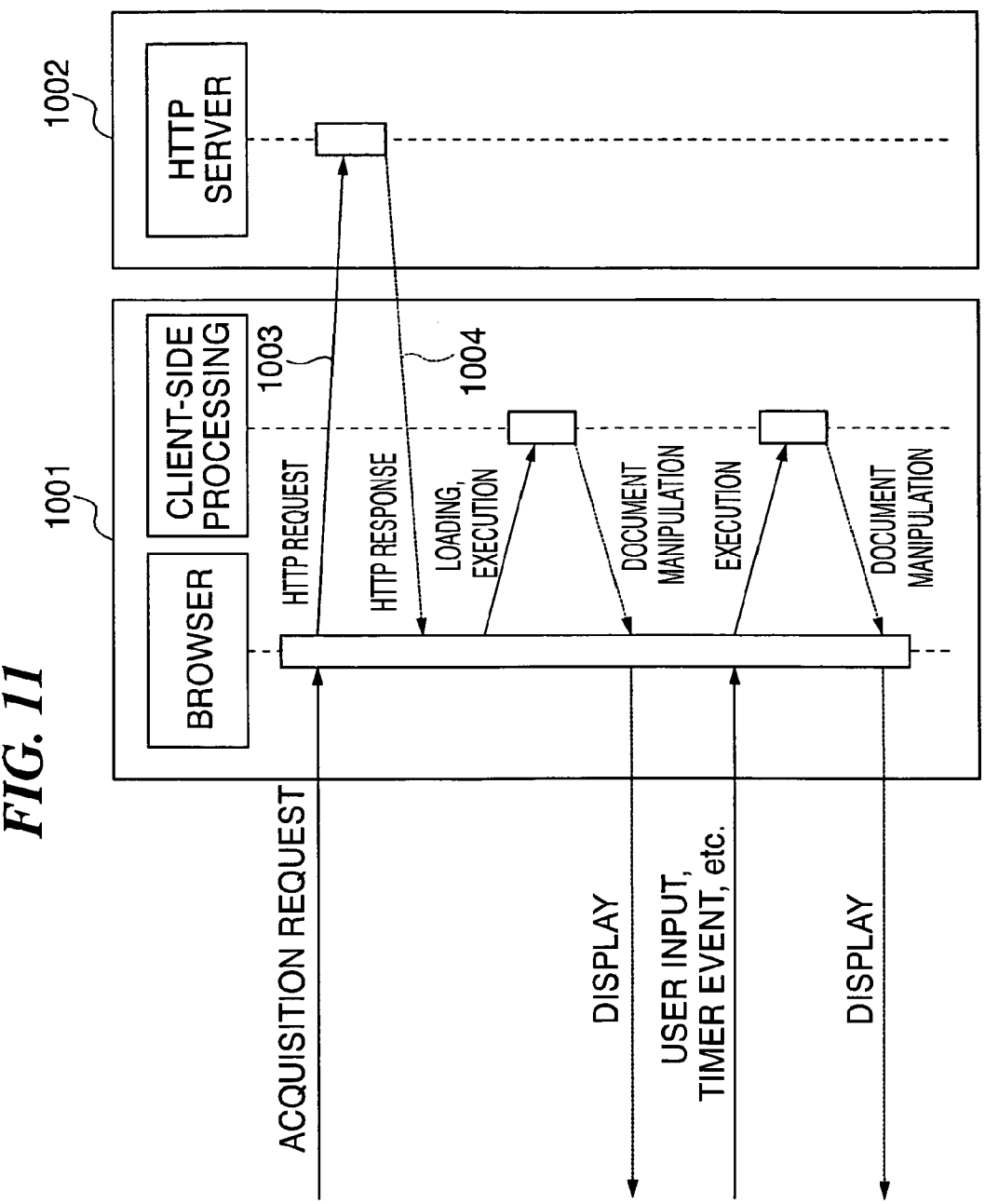
FIG. 11 is a diagram showing, by way of example, a flow of server-side processing and client-side processing.

FIG. 11 is a diagram showing, by way of example, the flow of the server-side processing and client-side processing.

In the HTTP request 1003, the client 1001 transmits a GET request for a desired resource to the server 1002. In general, a resource is designated in URI (particularly, URL) format. The server 1002 acquires or generates data corresponding to the resource designated in the GET request, and sends the data as a HTTP response 1004. When the data obtained from the HTTP response 1004 is in a displayable format, the client 1001 displays the content of the data. If the obtained data is a HTML document or the like, the Web browser constructs a DOM by the DOM constructing section 803 while interpreting the document. When a script written e.g. in JavaScript is embedded in the document, the embedded script is loaded into an associated script interpreter, and then the client-side processing is executed. In the client-side processing, it is possible to carry out different processing depending on the content of the embedded script. For example, it is possible to perform dynamic document manipulation, such as insertion of data generated by the script into a document being analyzed. When an event handler corresponding to an onload event in a document is loaded and registered in a script interpreter, a code of the event handler is executed in timing in which all resources constituting the document are acquired and analyzed. The execution of the code also makes it possible to manipulate the document.

Further, when a user input means, such as the touch panel, is operated to generate an event in a document or a document element, or when an event, such as the time-up of a timer monitored by a script interpreter, has occurred, if the script interpreter contains a code of a script loaded and registered as an event handler, the script code is executed.

In the client-side processing which is executed by the script interpreter on the client 1001, it is not necessarily required to transmit user input to the server 1002, as is distinct from the server-side processing. If processing that can be achieved by simple computing is executed on the client side, communication time for transmitting a request to and receiving a response from the server 1002 can be saved, which makes it possible to reduce turnaround time. Further, since processing is shared by the clients 1001, it is possible to avoid concentration of load on the computing resource of the server 1002. In particular, since it is possible to dispense with interactive communication with the server 1002 for realizing the processing, information the privacy of which the user of an apparatus wants to maintain can be processed while being saved in the apparatus without being delivered to the server 1002.

Actually, the client-side processing and the server-side processing are often combined appropriately to implement services.

FIG. 12 is a diagram showing, by way of example, the structure of data for managing the user account of each user using the image processing apparatus 110. In the user account information table, each row corresponds to an individual user who is allowed to use the apparatus.

In FIG. 12, each of user names "system" and "guest" indicates a virtual user's name internally used in the image processing apparatus 110, and the other user names correspond to respective real individual users that actually use the image processing apparatus 110.

The user name "system" is used for identifying a resource whose owner is an apparatus system. The user name "guest" is used for representing an unauthenticated user when the image processing apparatus 110 is operated such that some resources are available without user authentication. Each column is defined as follows:

A user name column contains identifiers for identifying respective users. In FIG. 12, each user name is represented by a character string, but internally, it may be represented e.g. by a numerical value corresponding to an associated individual user.

A primary group column contains identifiers for identifying respective default groups to which the users belong. Each user is allowed to belong not only to a default group, but also to other groups. The groups will be described hereinafter.

A password column contains passwords for use in authenticating the respective users by what-you-know type user authentication. When the function of a smart card is used for user authentication, it is not necessary to use information in this column. Further, the present column may be used for containing PINs (Personal Identification Numbers) to be used together with respective smart cards.

An e-mail address column contains e-mail addresses of the respective users.

An extension number column contains extension telephone numbers of the respective users.

A variety of columns other than the above-mentioned columns may be added for registering user-by-user information. For example, by additionally providing columns for registering user full names, default functions, default in-box folders, optional settings, and so forth, such pieces of information can be stored as specific information on a user-by-user basis.

FIG. 13 is a diagram showing, by way of example, the structure of data for managing user groups that use the image processing apparatus 110. In FIG. 13, each row corresponds to a group to which a user or users can belong.

A group is an object representative of a set of users. Various sets, such as departments, posts, roles, and so forth of an organization, can be defined as respective groups. An individual user can belong to a plurality of groups simultaneously.

A group name column contains identifiers for identifying respective groups. In FIG. 13, each group name is represented by a character string, but internally, it may be represented e.g. by a numerical value associated with the group.

A member list column contains a list defining users belonging to the associated groups. In the present embodiment, the group name "system" represents a virtual group used as a primary group of the user system. A group name "guest" corresponds to a guest user allowed to use the apparatus without user authentication. A group name "admin" represents an administrator group that administers the apparatus. A group name "user" represents a group of all users having user accounts for the apparatus. Group names "rd" and "sales" represent respective groups associated with departments of the organization. A group name "manager" represents a group associated with posts of the organization. A group name "operator" represents a group corresponding to a role for executing expert operations, such as data backup in the apparatus, which is second to that of the administer.

Figure 14:
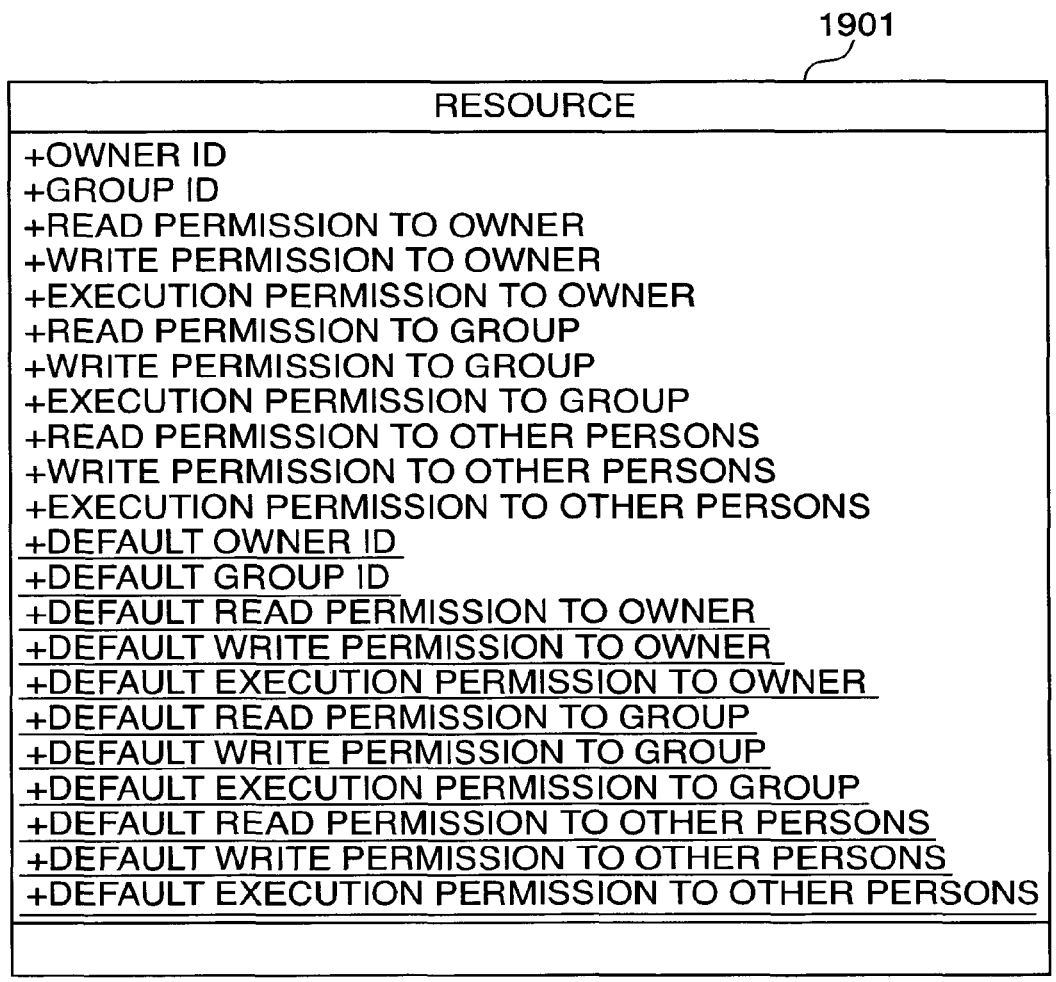
FIG. 14 is a schematic diagram showing, by way of example, the structure of data of a resource class, in which various resources constituting the image processing apparatus in FIG. 1 are expressed in an abstracted manner.

FIG. 14 is a schematic diagram showing, by way of example, the structure of data of a resource class, in which various resources constituting the image processing apparatus 110 are expressed in an abstracted manner.

The resource class is one of classes corresponding to designs for respective objects constituting a device object model. Each of the objects (and object classes as designs for the respective objects) of the device object has several internal features. The features include attributes (also referred to as properties, data members, or variables) holding data and references to other objects, and operations (also referred to as methods or member functions).

The objects and object classes of the device object model are bound to script languages supported by the script interpreter, such that the objects and object classes can be used based on the syntax and semantics of each of the script languages. In JavaScript, the objects of the device object model are associated with an object type of JavaScript. The object classes of the device object model are associated with classes defined by JavaScript. Similarly to many other script languages, JavaScript is not a "strongly typed" language, and hence it has no concept of a class defined by Java or C++. In JavaScript, however, each object corresponding to a class is defined, and a constructor of an object and the prototype object are used to substantially realize numerous concepts of the class.

The resource class 1901 is a superclass of classes corresponding to all the resources to be handled by the image processing apparatus 110. The resource class 1901 can hold a plurality of instance attributes and class attributes.

Owner ID is an instance attribute which holds an identifier of a user that owns the resource.

Group ID is an instance attribute which holds an identifier of a group that owns the resource.

Read Permission to Owner is an instance attribute, which indicates whether or not the user identified by Owner ID is authorized to read from the resource. The present attribute can assume one of values "permitted", "not permitted", and "not set".

Write Permission to Owner is an instance attribute, which indicates whether or not the user identified by Owner ID is authorized to write in the resource. The present attribute can assume one of values "permitted", "not permitted", and "not set".

Execution Permission to Owner is an instance attribute which indicates whether or not the user identified by Owner ID is authorized to execute the resource. The present attribute can assume one of values "permitted", "not permitted", and "not set".

Read Permission to Group is an instance attribute which indicates whether or not a group identified by Group ID is authorized to read from the resource. The present attribute can assume one of values "permitted", "not permitted", and "not set".

Write Permission to Group is an instance attribute, which indicates whether or not the group identified by Group ID is authorized to write in the resource. The present attribute can assume one of values "permitted", "not permitted", and "not set".

Execution Permission to Group is an instance attribute which indicates whether or not the group identified by Group ID is authorized to execute the resource. The present attribute can assume one of values "permitted", "not permitted", and "not set".

Read Permission to Another Person is an instance attribute, which indicates whether or not a user who is neither identified by User ID nor belongs to a group identified by Group ID is authorized to read from the resource. The present attribute can assume one of values "permitted", "not permitted", and "not set".

Write Permission to Other Person is an instance attribute which indicates whether or not the user who is neither identified by User ID nor belongs to the group identified by Group ID is authorized to write in the resource. The present attribute can assume one of values "permitted", "not permitted", and "not set".

Execution Permission to Another Person is an instance attribute which indicates whether or not the user who is neither identified by User ID nor belongs to the group identified by Group ID is authorized to execute the resource. The present attribute can assume one of values "permitted", "not permitted", and "not set".

Default Owner ID is a class attribute which holds an identifier of a default user that owns the resource.

Default Group ID is a class attribute which holds an identifier of a default group that owns the resource.

Default Read Permission to Owner is a class attribute which indicates whether or not the user identified by Owner ID is authorized to read from the resource. The present attribute can assume one of values "permitted", "not permitted", and "not set".

Default Write Permission to Owner is a class attribute, which indicates whether or not the user identified by Owner ID is authorized to write in the resource. The present attribute can assume one of values "permitted", "not permitted", and "not set".

Default Execution Permission to Owner is a class attribute which indicates whether or not the user identified by Owner ID is authorized to execute the resource. The present attribute can assume one of values "permitted", "not permitted", and "not set".

Default Read Permission to Group is a class attribute which indicates whether or not a user belonging to a group identified by Group ID is authorized to read from the resource. The present attribute can assume one of values "permitted", "not permitted", and "not set".

Default Write Permission to Group is a class attribute which indicates whether or not the user belonging to the group identified by Group ID is authorized to write in the resource. The present attribute can assume one of values "permitted", "not permitted", and "not set".

Default Execution Permission to Group is a class attribute which indicates whether or not the user belonging to the group identified by Group ID is authorized to execute operation of the resource. The present attribute can assume one of values "permitted", "not permitted", and "not set".

Default Read Permission to Another Person is a class attribute which indicates whether or not a user who is neither identified by User ID nor belongs to a group identified by Group ID is authorized to read from the resource. The present attribute can assume one of values "permitted", "not permitted", and "not set".

Default Write Permission to Another Person is a class attribute which indicates whether or not the user who is neither identified by User ID nor belongs to the group identified by Group ID is authorized to write in the resource. The present attribute can assume one of values "permitted", "not permitted", and "not set".

Default Execution Permission to Another Person is a class attribute which indicates whether or not the user who is neither identified by User ID nor belongs to the group identified by Group ID is authorized to execute the resource. The present attribute can assume one of values "permitted", "not permitted", and "not set".

When a script, such as JavaScript, is used to handle an object constituting a device object model, the script is assumed to be given the same authority as that of an actual user operating the Web browser is. Only when the script is authorized to read the object, reading of an attribute from the script is allowed. Only when the script is authorized to write the object, changing of an attribute of the object from the script is allowed, and only when the script is authorized to execute the object, calling of an operation on the object from the script is allowed. Further, in the above described attributes of permission and default permission, "read", "write", and "execute" sometimes have respective meanings determined by adding definitions of semantics specific to each of resources represented by respective subclasses succeeding the present resource class.

The instance attributes of permission and the class attributes of default permission, described above, are in corresponding relationship. In generation of an instance from the class of a resource, an instance attribute of permission associated with the instance generated using a class attribute of default permission of the class is initialized. Alternatively, when an instance attribute of permission is not set yet to an instance of a resource, a class attribute of default permission held in the class of the instance may be used instead.

Although in the present embodiment, a resource access authority is represented by the above described permission attribute group, a known access control list (ACL) may be held for each class corresponding to a resource to thereby express the resource access authority.

Figure 15A:
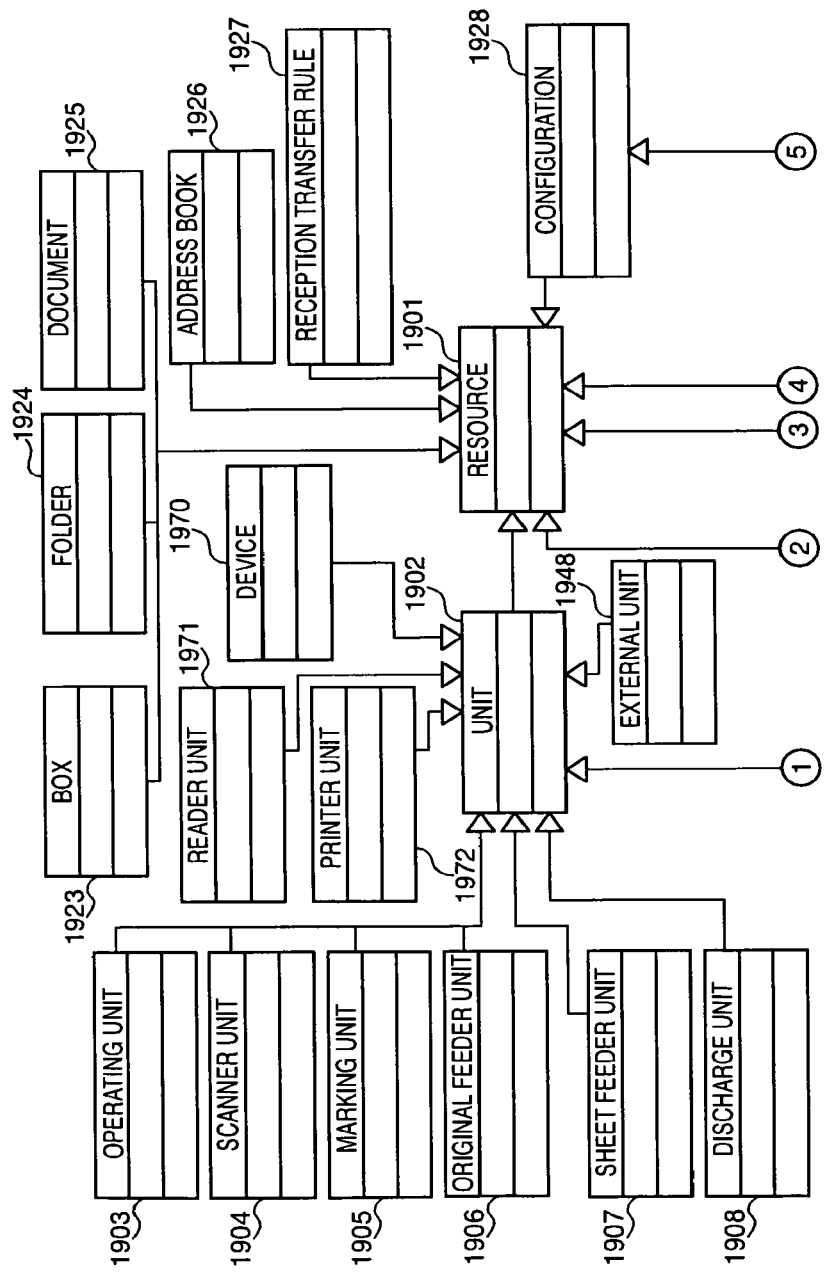
FIGS. 15A to 15C are class diagrams showing, by way of example, the structure of data illustrating the inheritance relationship between resources constituting the image processing apparatus in FIG. 1.
Figure 15B:
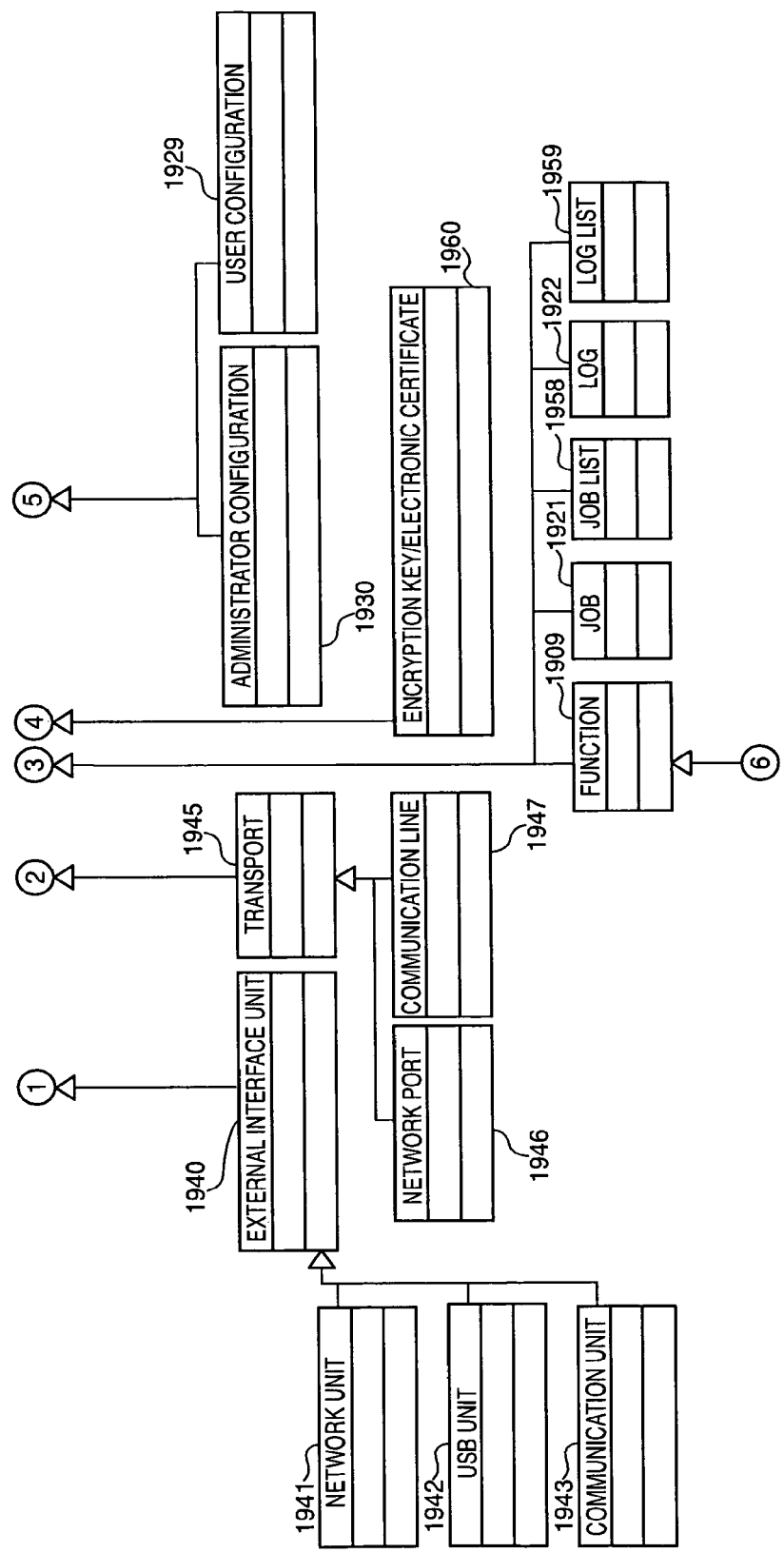
Figure 15C:
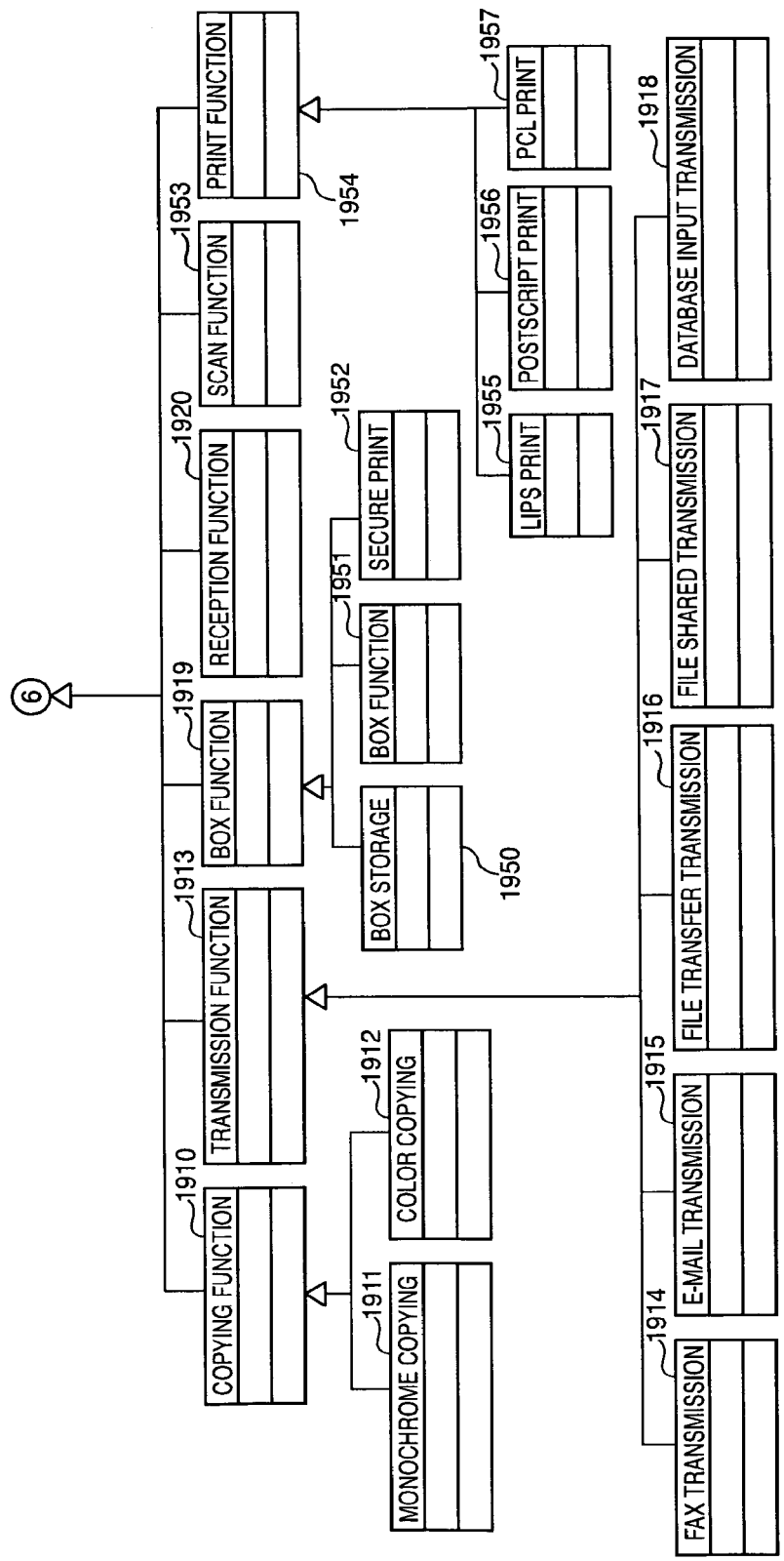

FIGS. 15A to 15C are class diagrams showing, by way of example, the structure of data illustrating the inheritance relationship between the resources constituting the image processing apparatus 110.

Each class in FIGS. 15A to 15C are used to generate (instantiate) an object. Object groups generated by the classes are held in the DOM processing section 804 to form the device object model to be accessed by the script interpreter 805.

Relations between classes are serialized into a byte string and permanently stored as a file in the HDD 304 even when the image processing apparatus 110 is inoperative. Upon the start of the image processing apparatus 110 and during operation of the same, the file is read by the CPU 301 of the controller unit 111, and class groups and object groups as instances thereof, which are shown in the present glass diagram, are dynamically generated and maintained/managed in the RAM 302, as data structures in each of which the relationship between classes or objects is maintained.

The resource class 1901 is an abstraction of system resources. This class is used for controlling access to the multi-user image processing apparatus 110. The resource class has at least the attributes described with reference to FIG. 14, and the attributes are inherited by all subclasses described below, as characteristics common to all the subclasses.

A unit class 1902 is a subclass of the resource class 1901. The unit class 1902 is an abstraction of physical units constituting the image processing apparatus 110.

An operating unit class 1903, a scanner unit class 1904, a marking unit class 1905, an original feeder unit class 1906, a sheet feeder unit class 1907, and a discharge unit class 1902 are all subclasses of the unit class 1902.

An external interface unit class 1940 is a subclass of the unit class 1902. The external interface unit class 1940 is an abstraction of external connection interface units.

An image processing system network unit class 1941, a USB unit class 1942, and a communication unit class 1943 are all subclasses of the external interface unit class 1940.

A reader unit class 1971 is a subclass of the unit class 1902, and corresponds to the reader unit 113.

A printer unit class 1972 is a subclass of the unit class 1902, and corresponds to the printer unit 114.

A device class 1970 is a subclass of the unit class 1902, and corresponds to the image processing apparatus 110.

An external unit class 1948 is a subclass of the unit class 1902. The external unit class 1948 is an abstraction of external units connected to the apparatus via external interface units and the like.

A transport class 1945 is a subclass of the resource class 1901. The transport class 1945 is an abstraction of various communication paths allowing the image processing apparatus 110 to communicate with other nodes via networks and communication lines.

A network port class 1946 is a subclass of transport class 1945. The network port class 1946 is an abstraction of communication paths for communication with processes of the other nodes by network interfacing. An instance of the network port class 1946 is characterized by a protocol, such as TCP (Transmission Control Protocol) or UDP (User Datagram Protocol), and a port number associated with the protocol.

A communication line class 1947 is an abstraction of communication paths for communication with other apparatuses through communication lines used by a facsimile and the like. An instance of the communication line class 1947 is characterized e.g. by a line number assigned to a line in a telephone exchange line network.

A function class 1909 is a subclass of the resource class 1901. The function class 1909 is an abstraction of functions provided by the image processing system.

A copying function class 1910 is a subclass of the function class 1909. The copying function class 1910 is indicative of a function of copying an original printed on a sheet. Further, a monochrome copying class 1911 and a color copying class 1912 are subclasses of the copying function class 1910.

A transmission function class 1913 is a subclass of the function class 1909. The transmission function class 1913 is indicative of a function of transmitting digital document data using various protocols. Further, a fax transmission class 1914, an e-mail transmission class 1915, a file transfer/transmission class 1916, a file shared transmission class 1917, and a database input/transmission class 1918 are subclasses of the transmission function class 1913. Each of the classes 1914 to 1918 is indicative of a function of sending digital document data using an associated protocol.

A box function class 1919 is a subclass of the function class 1909. The box function class 1919 is indicative of functions of storing image data read from originals and document data obtained by PDL development, in a storage within the system, and further browsing, printing, transmitting, and managing the stored document data.

A box storage class 1950 is a subclass of the box function class 1919. The box storage class 1950 corresponds particularly to a part of the box function, i.e. a function of storing document data and the like in the storage.

A box output class 1951 is a subclass of the box function class 1919. The box output class 1951 corresponds particularly to printing and transmission functions performed as a part of the box function by reading document data stored in the storage.

A secure print class 1952 is a subclass of the box function class 1919. The secure print class 1952 corresponds particularly to a reserved printing function performed as a part of the box function to temporarily store print data received from a client PC in the storage, without carrying out printing immediately, and print the print data when a user executes an explicit printing operation via the operating unit 112.

A reception function class 1922 is a subclass of the function class 1909. The reception function class 1922 is indicative of functions of receiving digital document data using the same protocols as used by the transmission function class 1913, and storing, transferring, and printing the received digital document data.

A scanning function class 1953 is a subclass of the function class 1909. The scanning function class 1953 is indicative of functions of reading an original image using the reader unit 113, and converting the original image into electronic document data.

A printing function class 1954 is a subclass of the function class 1909. The printing function class 1954 is indicative of a function of printing out print data received from a client PC or the like, by the printer unit 114.

A LIPS print class 1955 is a subclass of the printing function class 1954. The LIPS print class 1955 is indicative of functions of interpreting, expanding, and printing out PDL data written in the known LIPS language and received from a client PC or the like.

A PostScript print class 1956 is a subclass of the printing function class 1954. The PostScript print class 1956 is indicative of functions of interpreting, expanding, and printing out PDL data written in the known PostScript language and received from a client PC or the like.

A PCL print class 1957 is a subclass of the printing function class 1954. The PCL print class 1957 is indicative of functions of interpreting, expanding, and printing out PDL data written in the known PCL language and received from a client PC or the like.

A job class 1921 is a subclass of the resource class 1901. The job class 1921 is an abstraction of actual jobs corresponding to various services of the function class 1909.

A job list class 1958 is a container that can store a plurality of job instances. The job list class 1958 is an abstraction of specific kinds of job sets, such as a list of jobs which are currently being executed and a list of currently suspended jobs.

A log class 1922 is a subclass of the resource class 1901. The log class 1922 is an abstraction of log information records including information on execution and termination of objects in the job class 1921 and information on various events that occur in accordance with system operations.

A log list class 1959 is a container that can store a plurality of log instances. The log list class 1959 is an abstraction of sets of specific types of histories, such as a job log and a system log.

A box class 1923 is a subclass of the resource class 1901. The box class 1923 is an abstraction of management units of a file system handled by the function class 1909.

A folder class 1924 is a subclass of the resource class 1901. The folder class 1924 is an abstraction of a management structure for grouping a plurality of files in the file system handled by the function class 1909.

A document class 1925 is a subclass of the resource class 1901. The document class 1925 is an abstraction of files, i.e. various kinds of digital documents in the file system handled by the function class 1909.

An address book class 1926 is a subclass of the resource class 1901. The address book class 1926 is an abstraction of an address list for use in registering system users and user groups and used by function classes including the transmission function class 1913 and the reception function class 1920, for handling address information.

A reception transfer rule class 1927 is an abstraction of a group of rules for setting transfer conditions, designating transfer destinations, describing behaviors, and so forth in transfer of received documents by the reception function class 1920.

A configuration class 1928 is a subclass of the resource class 1901. The configuration class 1928 is an abstraction of configurations of operation parameters for controlling various operations of the system. A user configuration class 1929 and an administrator configuration class 1930 are subclasses of the configuration class 1928. The user configuration class 1929 is indicative of configurations for end users, and the administrator configuration class 1930 indicative of configurations for administrators.

An encryption key/electronic certificate class 1960 is a subclass of the resource class 1901. The encryption key/electronic certificate class 1960 is indicative of data of various electronic keys, signatures, certificates, etc. held and managed by the image processing apparatus 110 and used for encryption processing, user authentication, client authentication, server authentication, and so forth. In general, instances of the encryption key/electronic certificate class 1960 are very important for security and include information to be owned on a user-by-user basis, and therefore, access to the instances must be strictly controlled.

Figure 16:
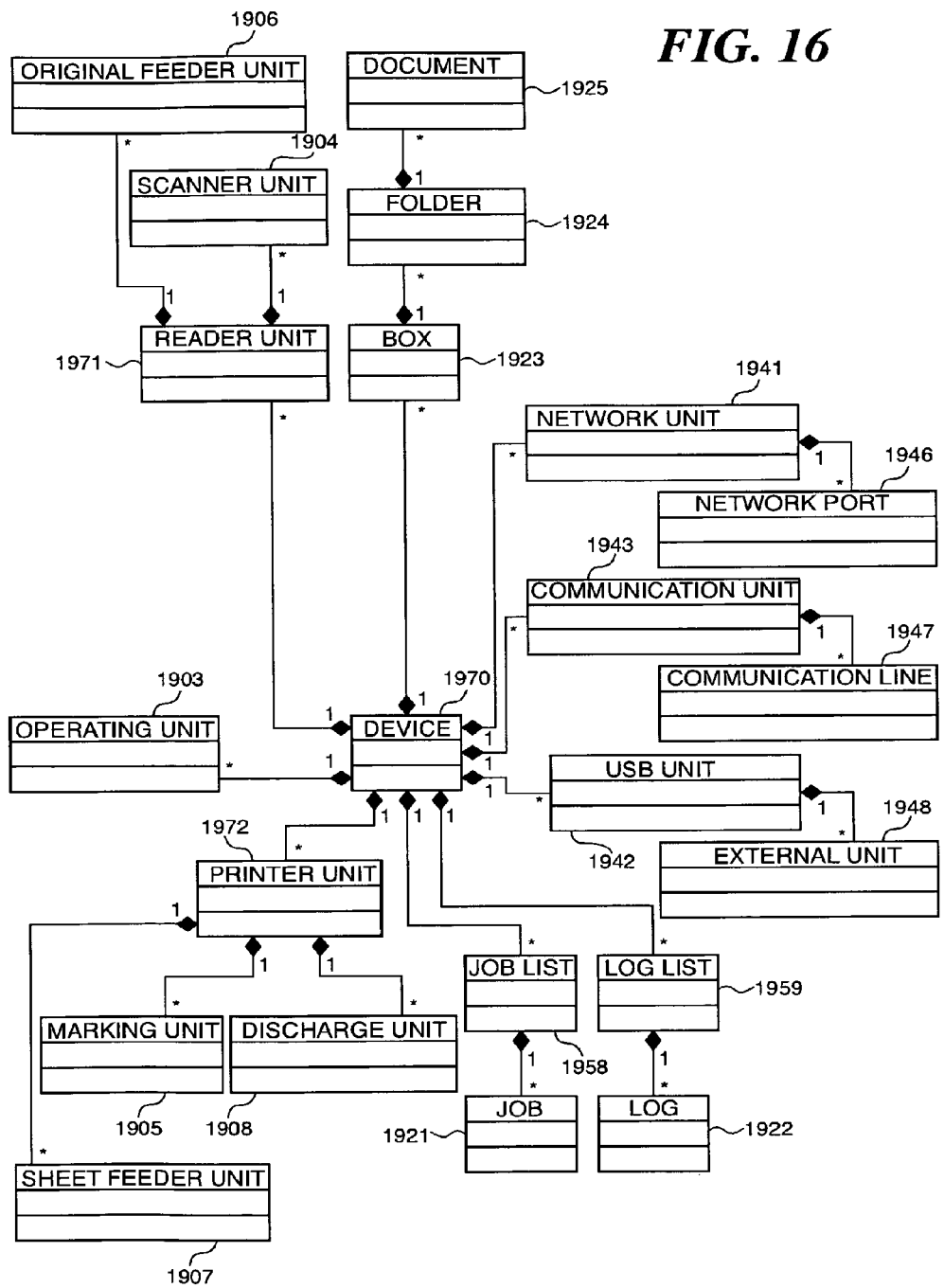
FIG. 16 is a class diagram showing, by way of example, the structure of data illustrating the aggregation relationship between resources handled by the image processing apparatus in FIG. 1.

FIG. 16 is a class diagram showing, by way of example, the structure of data illustrating the aggregation relationship between resources handled by the image processing apparatus 110.

Each class in FIG. 16 is used to generate (instantiate) an object. Object groups generated by the classes are held in the DOM processing section 804 to form the device object model to be accessed by the script interpreter 805.

Relations between classes are serialized into a byte string and permanently stored as a file in the HDD 304 even when the image processing apparatus 110 is inoperative. Upon the start of the image processing apparatus 110 and during operation of the same, the file is read by the CPU 301 of the controller unit 111, and class groups and object groups as instances thereof, which are shown in the present glass diagram, are dynamically generated and maintained/managed in the RAM 302, as data structures in each of which the relationship between classes and objects is maintained. The data structure expresses the parent-child aggregation relationship between the resources. In the present embodiment, the aggregation relationship between the resources is defined to reduce load for managing the various resource groups related to the image processing apparatus 110. When any physically and conceptually inclusive relationship is recognized between a unit and a subunit (partial unit) or between a container and a content and is available for resource management, the inclusive relationship is introduced into the definitions.

The classes in FIG. 16 are the same as the corresponding ones of the classes in FIGS. 15A to 15C. Therefore, detailed description thereof is omitted, with the same reference numerals designating the same classes.

The device class 1970 represents the entire image processing apparatus 110 for convenience of description. The reader unit class 1971 is a part of the device class 1970. The original feeder unit class 1906 and the scanner unit class 1904 are parts of the reader unit class 1971.

The operating unit class 1903 is a part of the device class 1970.

The printer unit class 1972 is a part of the device class 1970. The sheet feeder unit class 1907, the marking unit class 1905, and the discharge unit class 1908 are parts of the device class 1970.

The network unit class 1941 is a part of the device class 1970. The network port class 1946 is a part of the network unit class 1941.

The communication unit class 1943 is a part of the device class 1970. The communication line class 1947 is a part of the communication unit class 1943.

The USB unit class 1942 is a part of the device class 1970. The external unit class 1948 is a part of the USB unit class 1942.

The box class 1923 is a part of the device class 1970. The folder class 1924 is a part of the box class 1923. The document class 1925 is a part of the folder class 1924.

The job list class 1958 is a part of the device class 1970. The job class 1921 is a part of the job list class 1958.

The log list class 1959 is a part of the device class 1970. The log class 1922 is a part of the log list class 1959.

Figure 17:
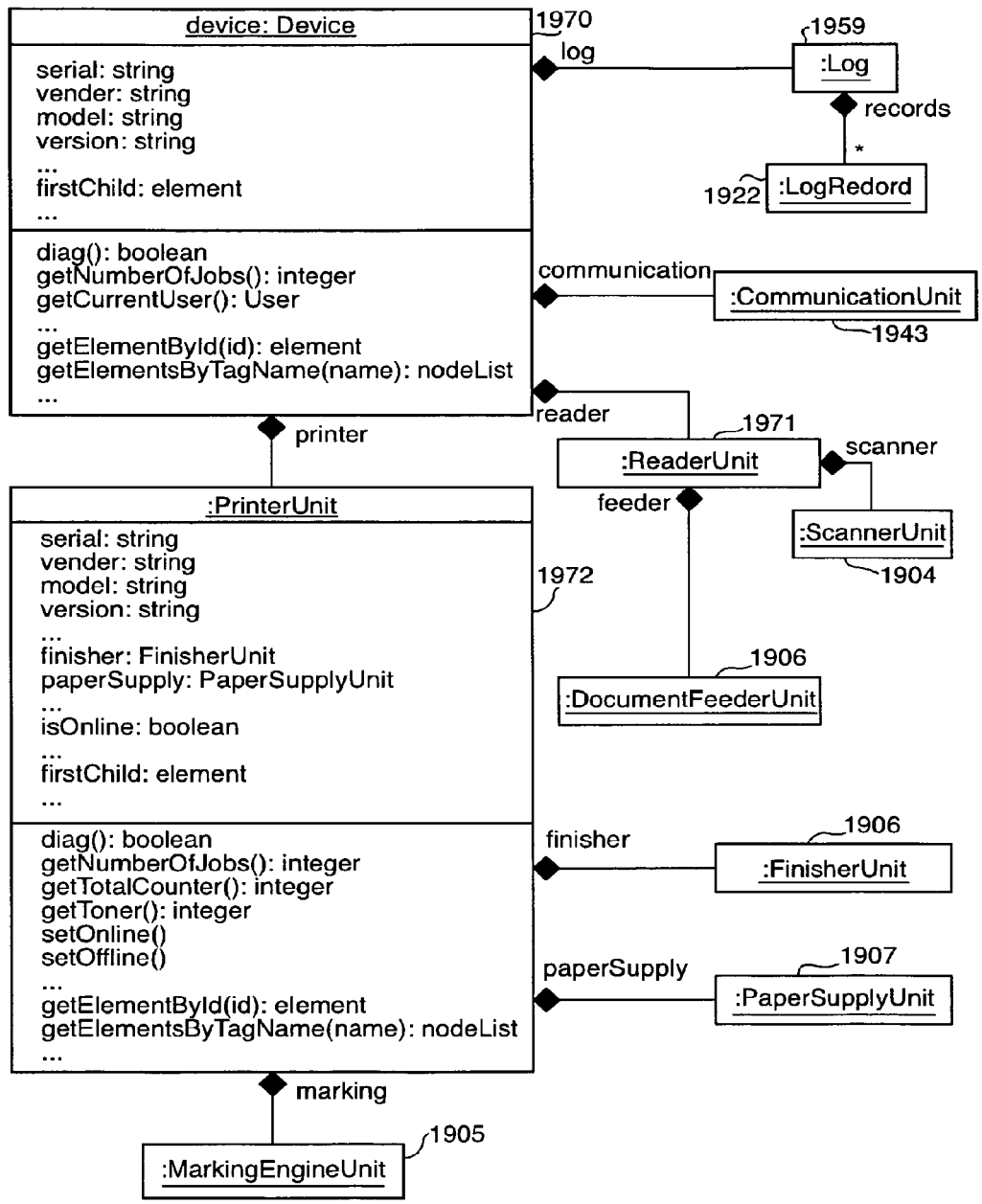
FIG. 17 is a diagram showing a part of objects forming respective instances of a device object model.

FIG. 17 is a diagram showing part of objects forming respective instances of the device object model.

In FIG. 17, each block represents an object, i.e. an instance of each class. Number attached to each object represents a reference numeral depending on the associated class.

Each of the objects constituting the device object model has characteristics of the associated class, i.e. attributes and operations to be executed. In addition to the characteristics defined by the class of the object, characteristics of a parent class in an abstract-concrete relationship are inherited. For example, an object "device" of a Device class has not only characteristics defined by the device class 1970, but also characteristics of the unit class 1902 as an abstract class of the device class 1970 and characteristics of the source class 1901 as an abstract class of the unit class 1902. Further, characteristics are inherited from an Element class, not shown, and a Node class, not shown, as abstract classes of the resource class 1901, and an Object class, not shown, at the highest level in hierarchy of the inheritance relationship defined by JavaScript. Each object refers to a child object thereof by its attribute. For example, the object "device" has an attribute "printer", and the attribute "printer" refers to instances of the printer unit class 1972.

The object "device" is an instance of the device class 1970, and has the following attributes:

An attribute "serial" represents a serial number. An attribute "vender" represents a vender. An attribute "model" represents a model. These attributes are a part of attributes inherited from the unit class 1902.

An attribute "firstChild" refers to a first object as a child in a parent-child relationship. This attribute is one of attributes inherited from the Node class of the DOM.

The attribute "printer" refers to the instances of the printer unit class 1972 as a child of the object "device" in the parent-child relationship. An attribute "reader" refers to instances of the reader unit class 1971 as a child of the object "device" in the parent-child relationship. An attribute "communication" refers to instances of the communication unit class 1943 as a child of the object "device" in the parent-child relationship. An attribute "log" refers to instances of the log list class 1959 as a child of the object "device" in the parent-child relationship. The above described attributes are a part of the attributes defined by the device class 1970.

An operation "diag" performs self-diagnosis of the image processing apparatus 110. This operation "diag" is one of operations inherited from the unit class 1902.

An operation "getNumberOfJobs" returns the number of jobs currently being executed in the entire image processing apparatus 110. An operation "getCurrentUser" returns an object indicative of a user currently using the apparatus. These are a part of operations defined by the device class 1970.

An operation "getElementById" retrieves an object having an ID designated by "id" from an object group of children of the object "device" in the parent-child relationship, and returns a reference of the retrieved object. An operation "getElementByTagName" retrieves an object group having a name designated by "name" from the object group of children of the object "device" in the parent-child relationship, and returns a list of references of the retrieved objects. These are a part of operations inherited from the Node class of the DOM.

An object created as an instance of the printer unit class 1972 has the following characteristics:

Attributes "serial", "vender", "version", and "firstChild" are the same as those of the object "device". An attribute "isOnline" is a predicate that assumes a true value when the printer unit 114 is online. An attribute "finisher" refers to instances of the discharge unit class 1908 as a child of the unit class in the parent-child relationship. An attribute "paperSupply" refers to instances of the sheet feeder unit class 1907 as a child of this unit class in the parent-child relationship. An attribute "marking" refers to instances of the marking class 1905 as a child of this unit class in the parent-child relationship. These are a part of attributes defined by the printer unit class 1972.

Operations "diag", "getElementById", and "getElementByTagName" are the same as those of the object "device". An operation "getNumberOfJobs" returns the number of jobs being currently executed by printer unit 114. An operation "getTotalCounter" returns the total or accumulated number of copies printed by the printer unit 114. An operation "getToner" returns the remaining amount of toner held in the printer unit 114. An operation "setOnline" brings the printer unit 114 into an online state. An operation "setOffline" brings the printer unit 114 into an offline state.

Figure 18:
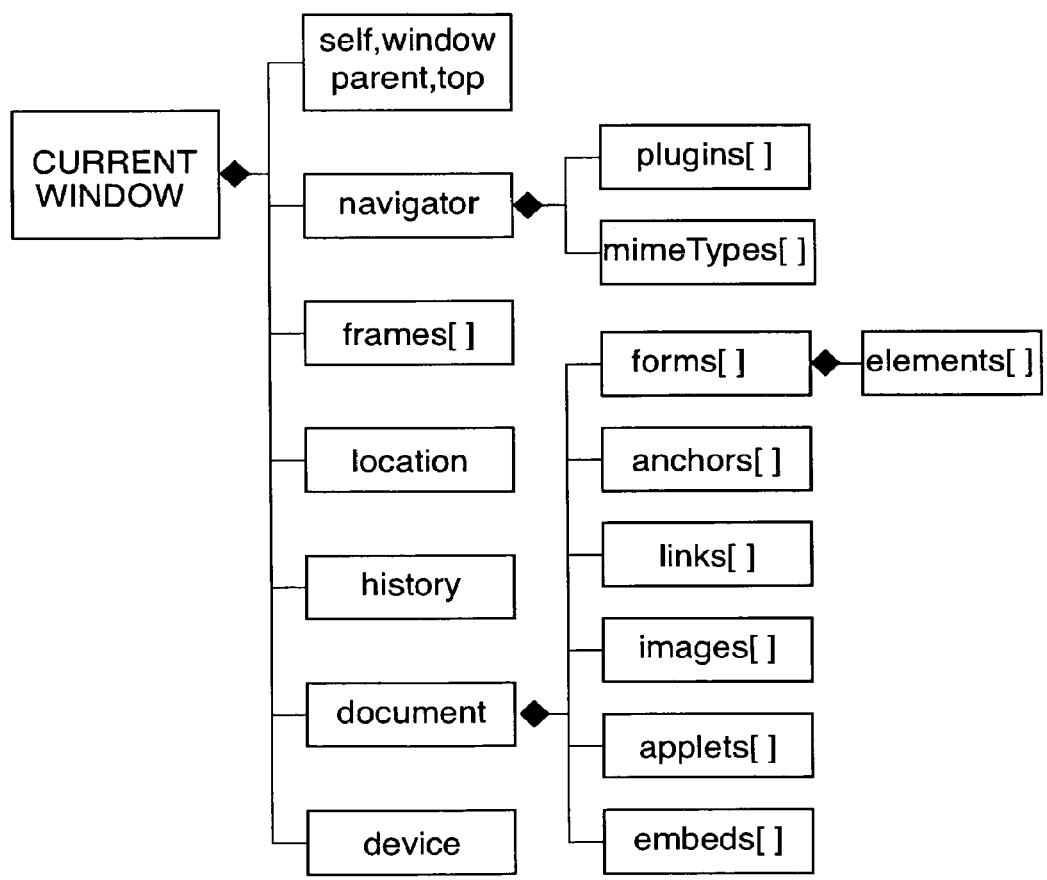
FIG. 18 is a diagram showing, by way of example, parent-child hierarchical structure of client-side objects provided as an operational environment of a script by a JavaScript interpreter incorporated in an embedded Web browser.

FIG. 18 is a diagram showing, by way of example, a parent-child hierarchical structure of client-side objects provided as an operational environment of a script by a JavaScript interpreter incorporated in an embedded Web browser.

A Window object is at the highest level in the parent-child hierarchical structure of client-side JavaScript objects. The Window object corresponds to a window (frame) for displaying a browser document. Client-side objects are all referred to through the Window object. The Window object is a global object linked to the head of a scope chain in a language processing system. The Window object has an attribute "document" and an attribute "location". The attribute "document" refers to a Document object associated with the corresponding window. The attribute "location" refers to a Location object associated with the corresponding window. The Window object also has an attribute "frames [ ]". Use of the attribute "frames [ ]" makes it possible to refer to Window objects associated with respective frames constituting an original window. For example, the attribute "document" refers to a Document object associated with the current window, and "frames [1].document" refers to a Document as a second child frame of the current window. An object referred to through the current window or one of the other Window objects can refer to an object other than itself. For example, by utilizing a "frames [ ]" array of the Document object, it is possible to refer to Form objects corresponding to a plurality of HTML forms to be displayed in a document. To refer to one of these forms, a description "self.document.forms[0]" is used.

In the Web browser in the present embodiment, the device object model is positioned in the above described object hierarchy. An attribute "device" of the Window object refers to the instance of the device object model (i.e. the object "device" in FIG. 17).

Now, a description will be given of a control operation executed by the image processing apparatus 110 configured as above.

FIGS. 19 and 20 are views showing, by way of example, a document acquired from a server by the Web browser.

FIGS. 19 and 20 show a HTML document having the JavaScript code embedded therein. The script embedded in the document is loaded into the script interpreter and executed for interpretation of the document by the Web browser, and as a consequence, a document dynamically adapted to a specific embedded device incorporating the Web browser is generated and displayed by the client-side processing. FIGS. 21 and 22 illustrates examples of a dynamically adapted document displayed on the Web browser. A description will be given of details of the document in FIGS. 19 and 20 mainly based on script portions embedded in the document, in association with the examples in FIGS. 21 and 22.

In Line 7 in FIG. 19, a user object using the current apparatus is acquired by the operation "getCurrentUser" of the object "device", and the attribute "name" of the user object is read out. As a consequence, the name ("Taro Yamada" in the illustrated examples in FIGS. 21 and 22) of the user using the apparatus is inserted into the document.

In Line 9, the model name of the apparatus is read out by the attribute "model" of the object "device", and the model name ("MFP3200" in the illustrated examples in FIGS. 21 and 22) is inserted into the document.

In Lines 12 to 33, pieces of information useful to the specific apparatus are selectively inserted according to the actual mounting state of each of subunits constituting the apparatus.

In Line 13, the object "device" refers to an object "reader", and an attribute "model" of the object "reader" is read out, whereby it is determined whether or not the model of the reader unit constituting the apparatus is equal to "S500". If the model of the reader unit is equal to "S500", the object "reader" refers to an object "feeder" in Line 14, and an attribute "model" of the object "feeder" is read out, whereby it is determined whether or not the model of an original feeder unit mounted in the reader unit 113 is equal to "DF03". If the model of the original feeder unit is equal to "DF03", information specifically related to the specific original feeder unit is inserted into the document in Lines 15 to 21. The inserted information contains an embedded link to an information source that provides further detailed information, and in Lines 19 and 20, the URL of this link dynamically generates a most appropriate URL according to the original feeder unit model read out by "device.reader.model", for guiding the Web browser to a most appropriate page. The apparatus in the illustrated examples in FIGS. 21 and 22 includes a reader unit of the present model and has an original feeder unit mounted on the reader unit, and therefore information for guiding the Web browser to a trade-in campaign is inserted in the document.

Lines 24 to 32 describe processing to be executed when the model of the printer unit included in the apparatus is "P9900". The apparatus in the examples in FIGS. 21 and 22 does not include a printer unit of this model, and hence the information of Lines 24 to 32 is not inserted in the document.

In Lines 35 to 56 in FIG. 20, most recently released or latest firmware versions and the versions of firmware incorporated in the actual apparatus, which are grasped on the server side, are compared with each other, and if any old version still remains incorporated in the apparatus, information recommending making a request for upgrading services provided by a customer engineer is selectively inserted into the document.

In Line 35, an array "latests" is generated for storing most recently released firmware versions on a subunit-by-subunit basis.

In Lines 36 to 41, an object storing an attribute "version" representative of a latest version and an attribute "label" representative of a display label is generated for each of the operating unit, the printer unit, the reader unit, the network unit, the communication unit, and the USB unit, and the objects are stored in the array "latests" as an associative array with object names as keys.

Lines 42 to 55 form a loop to be repeated for each of all the elements in the array "latests".

In Line 42, the key of an element in the array "latests" is represented by a variable "unit".

In Line 43, an attribute of the object "device" is accessed using an associative array notation "device[unit]". For example, if the value of "unit" is a character string 'operationPanel', "device[unit]" represents "device["operationPanel"]". In JavaScript, this represents the same as "device.operationPanel" in dot notation, and therefore "device ["operationPanel"]" means access to an attribute (property) "operationPanel" of the object "device". The attribute "operationPanel" is an operating unit object as a component of the device object. In the present line, it is determined whether "device[unit]", i.e. an object of a unit is neither undefined or null, and "device[unit].version" i.e. the version of the object of the unit assumes a smaller value than the latest version of firmware for the unit, which is stored in the array "latests" in Lines 36 to 41, in the actual device object model of the system. If these conditions are satisfied, it means that the operating firmware of the unit is older than the most recently released version. In this case, in Lines 44 to 54, the information recommending making a request for firmware version-up (e.g. ROM replacement) services provided by a customer engineer is inserted into the document. The inserted information contains an embedded anchor "mailto" which refers to URLs based on a pseudo protocol. In FIG. 21, this anchor is displayed as hypertext "send a request to the support center by e-mail". When the user points at this hypertext and clicks, an e-mail client function is invoked from the Web browser. The URL contains not only a destination address "support@canon.jp", but also encoded "subject" and "body", so that the destination address and the initial values of the subject and the body are passed to the e-mail client function.

Figure 23:
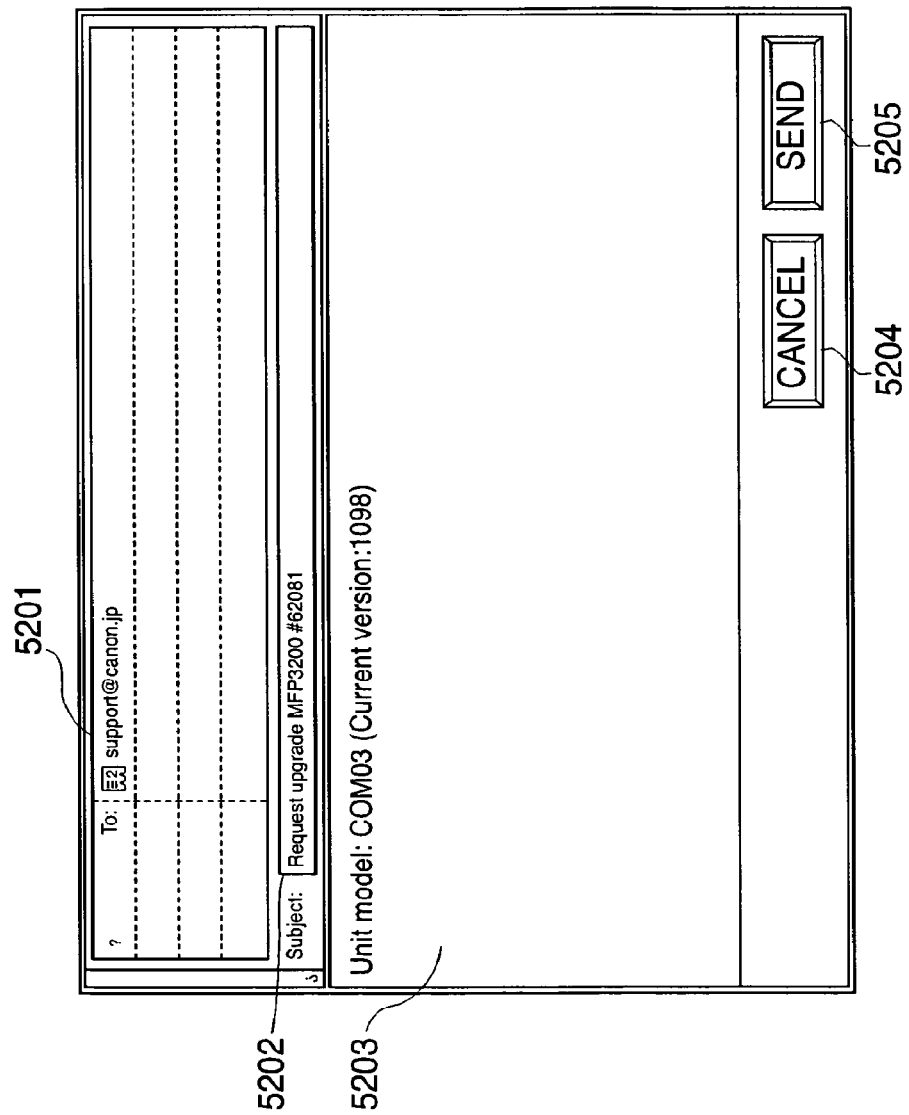
FIG. 23 is a view showing, by way of example, a screen for an e-mail transmission function started based on a URL dynamically generated by script processing.

FIG. 23 shows, by way of example, a screen associated with the thus activated e-mail client function. On the illustrated screen is set the destination address designated by the content provider. Further, there is set a subject including a model name and a serial number of a device, which are acquired from an actual device object. Furthermore, in association with a subunit of which firmware of a newer version is available, the model name of the subunit and the version of firmware currently incorporated in the subunit, which were acquired from the actual device object, are set in the body.

Referring again to FIG. 20, in Lines 59 to 67, the amounts of consumables in the operating embedded device remaining at this time are checked, and if the remaining amount of any consumable article is insufficient, data for recommending ordering the consumable article and displaying a link to an online ordering page is inserted into the document.

In Line 59, a method "getToner( )" of the printer unit object as a component of the device object is invoked by an operation "device.printer.getToner( )", whereby the percentage of the remaining amount of toner is obtained.

In Line 60, it is determined whether or not the remaining amount of toner is below 10%, and if it is below 10%, the fact is inserted into the document.

In Line 61, a URL to be inserted into the document is generated. In this line, an attribute "device.printer.model" is read out to be embedded into a URL, whereby an URL directly linked to a page for online sales of a toner suited to a model currently used by the user can be generated.

In Lines 62 and 63, a message warning that the remaining amount of toner is insufficient and including hypertext for guiding to the page for online sales of the suited toner is inserted into the document.

If the remaining amount of toner is not less than 10%, this message is not contained in the document, as is seen in the illustrated exemplary in FIG. 21, whereas if the remaining amount of toner is below 10%, the message is inserted into the document as is seen in the illustrated exemplary in FIG. 22.

In Line 71, a link to a latest manual provided by the server is generated. An attribute "device.manual" is read out, and a URL having this attribute embedded therein is generated for reference, so that the user can trace this link to thereby directly reach the manual suited to the apparatus in use.

FIG. 21 is a view showing, by way of example, a dynamically adapted document displayed on the Web browser. The document is displayed on the content display area 905 of the Web browser.

In the message 5001 written in the content document, there is inserted the name of the user (Taro Yamada) currently using the image processing apparatus 110, which was acquired from the device object model by the script.

In the message 5002 written in the content document, there is also inserted a device model name (MFP3200) acquired from the device object model by the script.

A paragraph 5003 is inserted into the document after it is determined whether or not the model of the reader unit 113 and that of the original feeder unit, which were acquired from the device object model by the script, satisfy the conditions for providing the information and, as a result, it is determined that the conditions are satisfied. The URL of an anchor contained in the paragraph 5003 contains the model name of the original feeder unit, which was acquired from the device object model, and therefore the user can select an underlined link to thereby shift the screen directly to a page for the trade-in campaign for the original feeder unit.

A paragraph 5004 is inserted into the document after comparison is performed by the script between the latest firmware versions of the respective subunits, which are described in the content, and the firmware versions of the respective subunits actually operating, which were acquired from the device object model and as a result, it is determined that upgradable subunits exist. The link contained in the paragraph 5004 contains the URL for mail transmission. The URL contains not only the destination address described in the content, but also encoded information on the apparatus model, the serial number of the apparatus, the names of units to be upgraded, and the firmware versions of the currently used units, so that the user can select an underlined link to thereby automatically generate an e-mail for reporting necessary information to the support center.

A link 5005 is a link to a latest manual page set on the server. This anchor has an URL containing encoded information on a path to the latest manual described in the content and the device model name acquired from the device object model, so that the user can select the underlined link to thereby shift the screen directly to a manual page specific for the embedded device.

FIG. 22 is a view showing, by way of example, another dynamically adapted document displayed on the Web browser. The document is displayed on the content display area 905 of the Web browser. FIG. 22 shows a case where the same embedded device that displayed the document in FIG. 21 acquires and displays the identical content in different timing.

A paragraph 5101 is inserted into the document after it is determined whether or not the current remaining amount of toner acquired by the script by invoking a toner remaining amount acquisition operation of the device object model is below a predetermined value (10%) defined by a script of the content, and as a result, it is determined that the remaining amount of toner is below the predetermined value. In a message in the paragraph 5101 is embedded the currently remaining amount of toner (8%) acquired by the script by invoking the remaining amount of toner acquisition operation of the device object model.

FIG. 23 is a view showing, by way of example, a screen for an e-mail transmission function started based on a URL dynamically generated by script processing. The e-mail transmission screen is displayed on the operating unit 112.

In FIG. 23, in a destination address field 5201 is set the destination address designated by the content provider. In a subject field 5202 is set the subject including the model name and the serial number of the apparatus, which were acquired from the actual device object. In the body field 5203 are set, as to a subunit for which firmware of a newer version is available, the model name of the subunit and the version of the firmware currently incorporated in the subunit, which were acquired from the associated actual device object.

Information required for making a request for a dispatch of a customer engineer is automatically set, so that the user can send an e-mail immediately or after adding a message, if he/she desires.

Reference numeral 5204 designates a cancel button which is used to close the e-mail transmission screen without sending an e-mail.

Reference numeral 5205 designates a send button which is used to send an e-mail.

According to the image processing apparatus of the present embodiment, it is possible to provide the following advantageous effects:

A document that selectively presents appropriate information according to the configuration and status of a system can be provided simply by preparing a single content on a server that provides services. Timely information can be provided by updating the server-side content, and adapting the server-side content to a specific embedded device used by the user can be executed by the client-side processing using JavaScript to generate a piece of HTML data and insert the same into a content. The combination of the server-side processing and the client-side processing makes it possible to provide flexible and fine services. The present image forming apparatus can be used, for example, to personalize a Web page content and provide a most appropriate suggestion according to the configuration and dynamic status of the apparatus. Further, since the configuration and status of the apparatus can be reflected in a dynamically generated URL, the present image forming apparatus can be used for displaying a link allowing direct shift to a page most suited to the apparatus among Web pages for information presentation and online sales (conventionally, only a link to an index-like page containing options that are not necessarily suited to a specific apparatus can be displayed, which takes a user time and labor for selecting the most suitable option from the page). Moreover, the present image forming apparatus can be used for providing a prototype of an e-mail to be sent to the support center, by generating a URL. These are all advantageous e.g. for CRM (Customer Relationship Management) as well.

Next, a description will be given of an image processing apparatus to which is applied an embedded device according to a second embodiment of the present invention.

The image processing apparatus of the present embodiment is distinguished from the image processing apparatus of the first embodiment only in the content of a document acquired from a server. Therefore, the hardware configuration and software configuration of a system including the image processing apparatus of the present embodiment are the same as those of the system including the image processing apparatus of the first embodiment.

FIGS. 24 to 26 are views showing, by way of example, a document acquired from the server by the Web browser.

Figure 27:
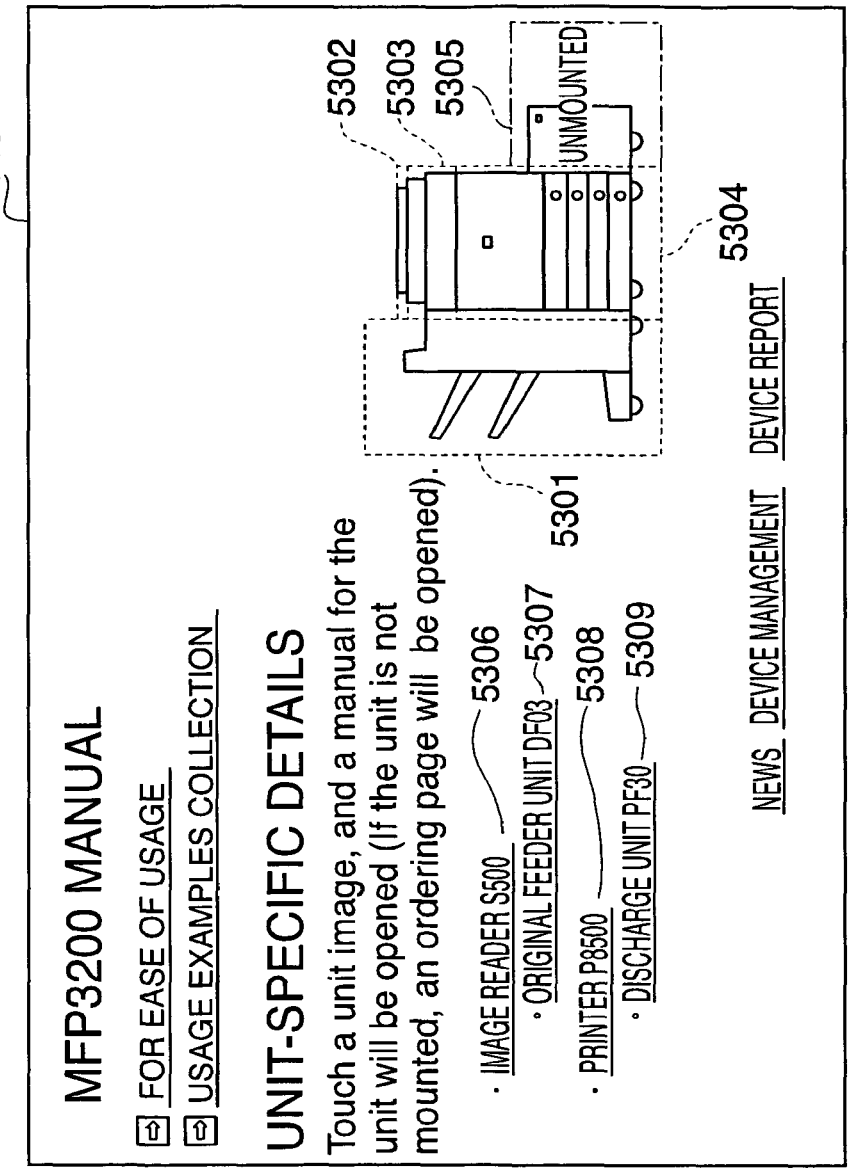
FIG. 27 is a view showing, by way of example, a dynamically adapted manual document displayed on the Web browser.

FIGS. 24 to 26 show a HTML document having the JavaScript code embedded therein. The script embedded in the document is loaded into the script interpreter and executed for interpretation of the document by the Web browser, and as a consequence, a document dynamically adapted to a specific embedded device incorporating the Web browser is generated and displayed by the client-side processing. FIG. 27 shows, by way example, a dynamically adapted document displayed on the Web browser. A description will be given of details of the document in FIGS. 24 to 26 mainly based on script portions embedded in the document, in association with the illustrated example in FIG. 27.

In Lines 18 to 26 in FIG. 24, it is determined whether or not the discharge unit as an option unit is mounted, and if the discharge unit is mounted, a link for directly displaying a manual for the unit is displayed. On the other hand, if the discharge unit is not mounted, a document for displaying a link to a page for ordering the discharge unit is inserted into the document. Whether or not the discharge unit is mounted is determined based on whether or not an attribute "device.printer.finisher" of the device object model is set to a value other than "null" (i.e. by referring to a FinisherUnit class object). The content of an anchor is displayed using an image (IMG element of HTML) of the model of the unit (area 5301 in FIG. 27). When the unit is not mounted, the portion of the apparatus image corresponding to the unit is displayed as a translucent image with a character "unmounted" superposed thereon.

Similarly, in Lines 31 to 38, it is determined whether or not the original feeder unit as an option unit is mounted, and if the original feeder unit is mounted, a link for directly displaying a manual for the unit is displayed. On the other hand, if the original feeder unit is not mounted, a document for displaying a link to a page for ordering the original feeder unit is inserted into the document. Whether or not the original feeder unit is mounted is determined based on whether or not an attribute "device.reader.feeder" of the device object model is set to a value other than "null" (i.e. by referring to a DocumentFeederUnit class object). The content of an anchor is displayed using an image (IMG element of HTML) of the model of the unit (area 5302 in FIG. 27). When the unit is not mounted, the portion of the apparatus image corresponding to the unit is displayed as a translucent image with a character "unmounted" superposed thereon.

In Lines 43 to 52 in FIG. 25, it is determined whether or not the sheet feeder unit as an option unit is mounted, and if the sheet feeder unit is mounted, a link for directly displaying a manual for the unit is displayed. On the other hand, if the sheet feeder unit is not mounted, a document for displaying a link to a page for ordering the sheet feeder unit is inserted into the document. Whether or not the sheet feeder unit is mounted is determined based on whether or not an attribute "device.printer.paperSupply" of the device object model is set to a value other than "null" (i.e. by referring to a paperSupplyUnit class object). The content of an anchor is displayed using an image (IMG element of HTML) of the model of the unit. When the unit is not mounted, the portion of the apparatus image corresponding to the unit is displayed as a translucent image with a character "unmounted" superposed thereon (area 5305 in FIG. 27).

In Lines 59 and 60, a link for directly displaying a manual associated with the model of the reader unit 113 is displayed. The content of an anchor is displayed using an image of the model of the unit (area 5303 in FIG. 27).

In Lines 67 and 68, a link for directly displaying a manual associated with the model of the printer unit 114 is displayed. The content of an anchor is displayed using an image of the model of the unit (area 5304 in FIG. 27).

In Lines 78 and 79 in FIG. 26, a link for directly displaying a manual associated with the model of the reader unit 113 is displayed. The content of an anchor is displayed as itemized text including the model name of the unit (character string 5306 in FIG. 27).

In Lines 83 to 86, it is determined whether or not the original feeder unit as an option unit is mounted, and if the original feeder unit is mounted, a link for directly displaying a manual for the unit is displayed. Whether or not the original feeder unit is mounted is determined based on whether or not the attribute "device.reader.feeder" of the device object model is set to a value other than "null" (i.e. by referring to the DocumentFeederUnit class object). The content of an anchor is displayed as itemized text including the model name of the unit (character string 5307 in FIG. 27).

In Lines 90 and 91, a link for directly displaying a manual associated with the model of the printer unit 114 is displayed. The content of an anchor is displayed as itemized text including the model name of the unit (character string 5308 in FIG. 27).

In Lines 95 to 99, it is determined whether or not the sheet feeder unit as an option unit is mounted, and if the sheet feeder unit is mounted, a link for directly displaying a manual for the unit is displayed. The content of an anchor is displayed as itemized text data including the model name of the unit. In the illustrated example in FIG. 27, the sheet feeder unit is not mounted, and hence the link is not inserted.

In Lines 102 to 106, it is determined whether or not the discharge unit as an option unit is mounted, and if the discharge unit is mounted, the link for directly displaying the manual for the unit is displayed. On the other hand, if the discharge unit is not mounted, the document for displaying the link to the page for ordering the discharge unit is inserted into the document. Whether or not the discharge unit is mounted is determined based on whether or not the attribute "device.printer.finisher" of the device object model is set to a value other than "null" (i.e. by referring to a FinisherUnit class object). The content of an anchor is displayed as itemized text including the model name of the unit (character string 5309 in FIG. 27).

FIG. 27 is a view showing, by way of an example, a dynamically adapted manual document displayed on the Web browser. This manual document is displayed on the content display area 905 of the Web browser. The description of FIGS. 23 to 26 was given by also referring to FIG. 27, and therefore duplicate description referring to FIG. 27 is omitted.

Although in the present embodiment, the content of the document is dynamically changed based on an algorithm of the script according to the model of a unit and whether or not an option unit is mounted, it is also possible to change the content of the document in accordance with a further dynamic state to thereby display a manual explaining the error recovery procedure according to an error occurring in the apparatus. Further, it is possible to analyze the pattern of usage of a specific apparatus by the user, based on statistical information stored in the apparatus according to the algorithm of the script, and display a guide for usage most suitable for the usage pattern.

According to the image processing apparatus of the present embodiment, it is possible to provide the following advantageous effects:

A document for dynamically presenting appropriate information according to the model of a unit as a component of the system and/or whether or not an option unit is mounted can be provided simply by preparing a single content on a server for providing services. The present apparatus can be used, for example, to provide an electronic manual or the like optimized for the status of the very apparatus whose incorporated browser is currently performing browsing.

Next, a description will be given of an image processing apparatus to which is applied an embedded device according to a third embodiment of the present invention.

The image processing apparatus of the present embodiment is distinguished from the image processing apparatus of the first embodiment only in the content of a document acquired from a server. Therefore, the hardware configuration and software configuration of a system including the image processing apparatus of the present embodiment are the same as those of the system including the image processing apparatus of the first embodiment.

FIGS. 28 and 29 are views showing, by way of example, a document acquired from a server by a Web browser.

FIGS. 28 and 29 show a HTML document having the JavaScript code embedded therein. The script embedded in the document is loaded into the script interpreter and executed for interpretation of the document by the Web browser, and as a consequence, a document dynamically adapted to a specific embedded device incorporating the Web browser is generated and displayed by the client-side processing. FIG. 30 is a view showing, by way of example, a dynamically adapted document displayed on the Web browser.

The script loaded into the script interpreter includes event handler scripts that handle a DOM event generated by user input operation for elements of the document displayed on the Web browser, a timer event, and like events. The event handlers are executed according to the respective events after the document is displayed on the Web browser. The event handlers perform control on the apparatus by manipulating the device object model, and also modify the document obtained by interpreting the acquired HTML document and displayed, by manipulating the DOM.

FIGS. 31 and 32 are views of examples of the document dynamically modified again after completion of display immediately after document acquisition and displayed on the Web browser. A description will be given of details of the document in FIGS. 28 and 29 mainly based on script portions embedded in the document, in association with the illustrated examples in FIGS. 31 and 32.

Lines 5 to 29 in FIG. 28 define a function "diag". The function "diag" receives a reference "unit" of each unit object as an argument, and executes a self-diagnosis code for the unit. Then, the function "diag" edits the document already displayed on the Web browser, based on the result of the execution of the self-diagnosis code.

In Line 6, an operation "diag" as a self-diagnosis method defined in a unit object to which reference has been made is invoked (Note that the operation "diag" is different from "diag(unit)" defined in Line 5). Then, an integer value "digResult" returned as a diagnostic result is obtained. If the value "digResult" is equal to "0", the unit is normal, and the other values represent an error code.

In Line 7, a DIV element of the HTML document, to which is assigned an ID "diagDiv", is retrieved by manipulating the DOM to obtain a reference "diagDiv" thereof.

In Line 8, a firstP element contained in the obtained reference "diagDiv" is retrieved to obtain a reference "oldP" thereof.

In Line 9, a newPelement is generated, and a reference "p" thereof is obtained.

In Line 10, it is determined whether or not the result "diagResult" of the diagnosis executed in Line 6 is normal. If the diagnostic result "diagResult" is normal, Lines 11 and 12 are executed, whereas if the diagnostic result "diagResult" is abnormal, Lines 15 to 26 are executed.

When the diagnostic code is terminated normally, a DOM text node formed by a character string "Diagnosis: Normal" is generated in Line 11.

In Line 12, the generated text node is added as a first child of the P element generated in Line 9. As a result, the character string "Diagnosis: Normal" is set in text of "p". Then, the process proceeds to Line 28.

On the other hand, if it is determined that the diagnostic code is abnormal, the URL of a trouble-shooting support site, which has an error code of the diagnostic result "diagResult" embedded therein, is constructed in Line 15.

In Line 16, a DOM text node formed by a character string of a message containing the error code of the diagnostic result "diagResult" and warning of abnormality is generated. If the error code is "199", a character string "Diagnosis: Abnormality is detected. Error code is #199. For detailed information," is generated.

In Line 19, the generated text node is added as a first child of the P element generated in Line 9.

In Line 20, an A element is generated anew, and a reference "a" thereof is obtained.

In Line 21, a HREF attribute is set to the generated A element "a". The value of the HREF attribute is equal to the URL of the trouble-shooting support site, which was constructed in Line 15.

In Line 22, a DOM text node formed by the same character string of the same URL is generated.

In Line 23, the generated text node is added as a first child of the A element "a" generated in Line 20. As a result, a character string, which is visible to the user, of a link displayed on the Web browser is set to the URL of the trouble-shooting support site.

In Line 24, the A element "a" having the HREF attribute and the text node already set thereto is added as a second child of the P element.

In Line 25, a DOM text node formed by a character string "Please, refer to" is generated.

In Line 26, the generated text node is added as a third child of the P element.

In Line 28, "oldP" so far displayed as a reference of the first P element of "diagDiv" is replaced by the newly generated and constructed reference "p".

The function "diag" is used in the script written in Lines 59 to 76 in FIG. 29.

In Line 59, it is checked whether or not "device.printer.dia" is neither undefined nor "null", i.e. whether the self-diagnostic code of the printer unit has been registered. If the self-diagnostic code of the printer unit has been registered, a form element (FORM) button having a label "PRINTER" thereon and in which is registered calling of the function "diag" with the printer unit object as an argument is inserted into the HTML document. Thus, the button for calling the self-diagnosis of the printer unit object is displayed.

Similarly, in Lines 62 to 65, if a self-diagnostic code is provided, a button for calling the self-diagnosis of the discharge unit object is displayed.

Similarly, in Lines 66 to 69, if a self-diagnostic code is provided, a button for calling the self-diagnosis of the sheet feeder unit object is displayed.

Similarly, in Lines 70 and 71, if a self-diagnostic code is provided, a button for calling the self-diagnosis of the reader unit object is displayed.

Similarly, in Lines 73 to 76, if a self-diagnostic code is provided, a button for calling the self-diagnosis of the original feeder unit object is displayed.

This script is executed for interpretation immediately after acquisition of a HTML document, and hence the buttons are displayed on the Web browser first. If a specific embedded device is provided with a self-diagnostic code for the printer unit and one for the reader unit, buttons 5401 and 5402 for the printer and the reader are displayed as shown in the example in FIG. 30.

A self-diagnostic code is executed by the function "diag" registered as an event handler, when the user clicks (or touches via the touch panel) the associated button displayed on the Web browser. For example, when the user touches the button 5401 labeled "PRINTER" and diagnosis is completed, and if an abnormality is detected, a message warning the user of the abnormality is generated by partially modifying the currently displayed document (not by reading another document) and displayed in a field 5501 in FIG. 31.

Lines 32 to 41 in FIG. 28 define a function "showPrinterStatus".

In Lines 33 and 34, the present document is searched for a DIV element which is assigned an ID "statusDiv" to obtain a reference "p" of a first P element contained in the DIV element.

In Line 35, an element "isOnline" of the printer unit object is read out. If the value of the element "isOnline" is "true", a character string "Online" is set to an attribute "data" of the first child (i.e. the text node) of the P element in Line 36, whereas if the value of the element "isOnline" is "false", a character string "Offline" is set to the attribute "data" in Line 39.

The function "showPrinterStatus( )" is used in Lines 52 et seq. in FIG. 29.

In Line 52, a script is registered as an event handler corresponding to an onLoad event of a BODY element. The onLoad event handler is called or invoked in timing synchronous with completion of loading (expanding and displaying) of all data constituting a document. In the onLoad event handler, the function "setInterval" registers a timer event handler that becomes active at predetermined time intervals. When this registration is executed, the function "showPrinterStatus" is invoked at time intervals of 10,000 msec.

Immediately after the Web browser displays the document, a character string "acquiring a status . . . " 5403 as described in "statusDiv" (Line 81) in the original HTML document is displayed as in the illustrated example in FIG. 30.

After the lapse of approximately 10 seconds, a status acquired from the device object model is presented to the user, for example, as a character string 5601 in the illustrated example in FIG. 32, whereafter the status display is continually updated at time intervals of 10 seconds as long as the document is displayed by the Web browser.

Lines 44 to 48 in FIG. 28 define a function "errorHandler". The function "errorHandler" receives an argument "event".

In Lines 45 and 46, the present document is searched for the DIV element which is assigned the ID "statusDiv" to obtain the reference "p" of the first P element contained in the DIV element.

In Line 47, a character string formed by coupling attributes "unit" and ":" of the object "event" received as an argument and an attribute "message" of the object "event" is set to the attribute "data" of the first child (i.e. the text node) of the P element.

The function "errorHandler" is used in Lines 49 et seq. For processing an error event of the device object, it is only required to register the function "errorHandler" as an attribute "onerror" of the device object "device". The device object model interfaces with apparatus control, and invokes the function registered in "device.onerror" when some error occurs in apparatus control. At this time, the object "event" passed as an argument has a reference "unit" of a unit object related to the error and attributes including a character string "message" for explaining the error.

FIG. 30 is a view showing, by way of an example, a dynamically adapted device management document displayed on the Web browser. This device management document is displayed on the content display area 905 of the Web browser.

FIG. 31 is a view showing an example of the device management document dynamically modified again after completion of display immediately after document acquisition and displayed on the Web browser. This device management document is displayed on the content display area 905 of the Web browser.

FIG. 32 is a view showing another example of the device management document dynamically modified again after completion of display immediately after document acquisition and displayed on the Web browser. This device management document is displayed on the content display area 905 of the Web browser.

According to the image processing apparatus of the present embodiment, it is possible to provide the following advantageous effects:

Since the script manipulates the DOM, it is possible to perform not only insertion for document analysis, but also dynamic editing of a document.

The apparatus and jobs can be controlled from the script via the interface of the device object model.

An event handler for manipulating the device object model can be registered in accordance with a DOM event. This makes it possible to access apparatus control according to an event, such as a user input event or a timer event.

Further, an event from the device object model can be handled in the same manner as in processing of a DOM event.

The combination of manipulation of the DOM and that of the device object model by a script embedded in a HTML document makes it possible to describe a user interface for use in apparatus control using HTML and the script. Therefore, a function of HTML as a user interface description language can be used not only for providing a user interface for a Web application operating on a server side, but also for providing a user interface for a service provided for a device on a client side. A user interface description is prepared as a content on the server side, and acquired in response to an acquisition request from the browser of the apparatus (the embedded device), so that a latest content can be provided from a service provider side.

This is advantageous for supporting maintenance of the embedded device by a customer engineer or the user.

Next, a description will be given of an image processing apparatus to which is applied an embedded device according to a fourth embodiment of the present invention.

The image processing apparatus of the present embodiment is distinguished from the image processing apparatus of the first embodiment only in the content of a document acquired from a server. Therefore, the hardware configuration and software configuration of a system including the image processing apparatus of the present embodiment are the same as those of the system including the image processing apparatus of the first embodiment.

FIGS. 33 and 34 are views showing, by way of example, a document acquired from a server by a Web browser.

FIGS. 33 and 34 show a HTML document having the JavaScript code embedded therein. A script embedded in the document is loaded into the script interpreter and executed for interpretation of the document by the Web browser, and as a consequence, a document dynamically adapted to the specific embedded device incorporating the Web browser is generated and displayed by the client-side processing.

The script loaded into the script interpreter includes event handler scripts that handle DOM events, timer events, and the like events generated by user input operation to elements of the document displayed on the Web browser. The event handlers are executed according to the respective events after the document is displayed on the Web browser. The event handlers perform control of the apparatus by manipulating the device object model, and also modify the document obtained by interpreting the acquired HTML document and displayed, by manipulating the DOM.

Figure 35:
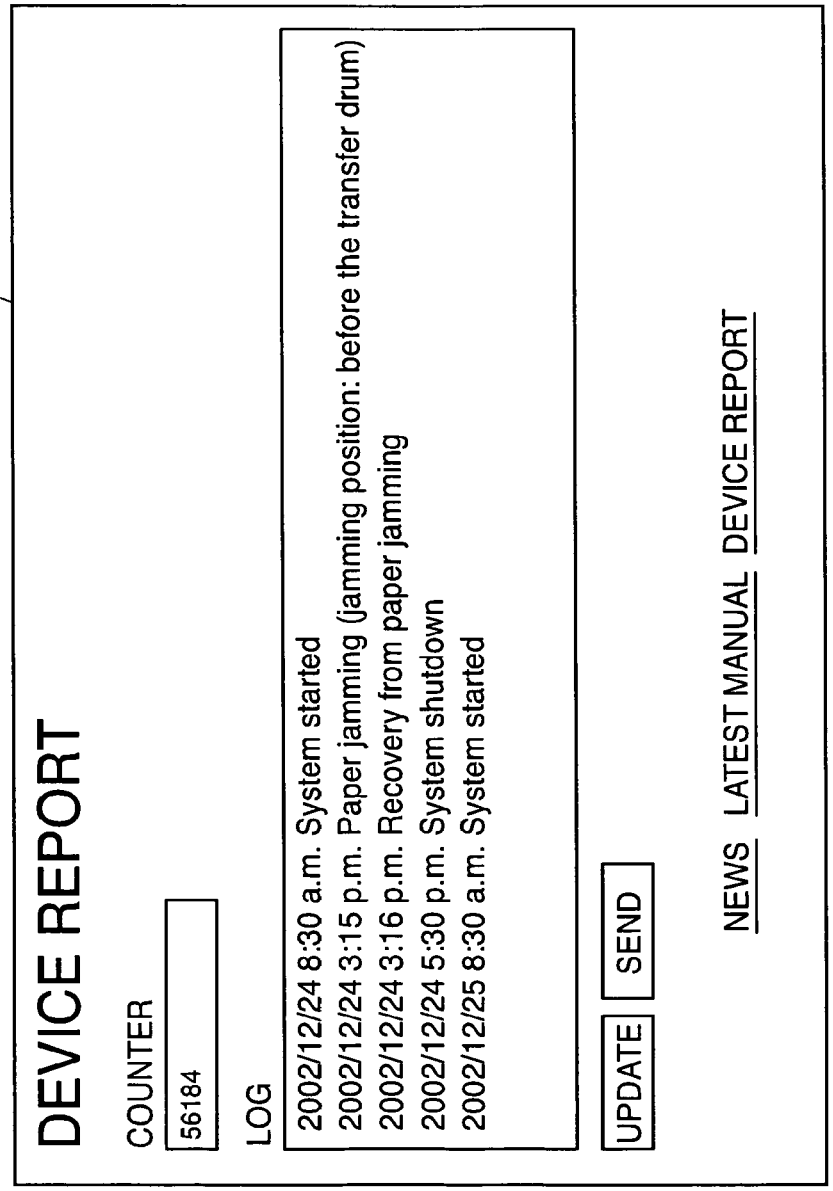
FIG. 35 is a view showing, by way of example, a dynamic device report document displayed on the Web browser.

FIG. 35 illustrates an example of the document displayed on the Web browser. A description will be given of details of the document in FIGS. 33 and 34 mainly based on script portions embedded in the document, in association with the illustrated example.

Lines 5 to 7 in FIG. 33 define a function "createCounterReport( )".

In Line 6, "device.printer.getTotalCounter( )" is called to obtain the current value of a print total counter cumulatively calculated by the printer unit 114, and the value is written into a text input element "counter" in a form element (FORM) contained in the present document. The text input element "counter" is described in Line 31 in FIG. 34.

Lines 8 to 10 in FIG. 33 define a function "reportLog( )". This function receives an argument "message".

In Line 9, the argument "message" delivered to the function "reportLog( )" is added to a text area element "log" in the form element (FORM) contained in the present document, and a new line is started. The text area element "log" is described in Line 36 in FIG. 34.

Lines 11 to 19 in FIG. 33 define a function "createLogReport( )".

In Line 12, the content of the text area element "log" is cleared.

In Line 13, an object of the log list class 1959 is retrieved by accessing the device object model using an API similar to that of the DOM. The log list class 1959 can have a plurality of log list objects, but here a reference to a first log list object is obtained as "log".

In Line 14, a group of objects whose tag names are "record" are retrieved from nodes as children of the log list object in the parent-child relationship by accessing the device object model using the API similar to that of the DOM, and a reference to the list is obtained as "records".

Lines 15 to 21 form a loop, wherein the following processing is repeatedly carried out on the objects contained in the "records": In Line 16, one object contained in the "records" is selected, and the selected "record" object is referred to. In Lines 17 and 18, DOM attributes of this "record" object are checked by "record.getAttribute( )" as the API of the DOM. If the value of an attribute "facility" is "system", and at the same time the value of an attribute "level" is "notice", the value of an attribute "date" of the present object record, ":", and the "data" attribute of a first child of the same are combined to construct a character string in Line 19. Then, the constructed character string is passed to the argument to call the function "reportLog( )".

The function "createCounterReport( )" and the function "createLogReport( )" are used in Line 25 and Line 42 of the HTML document in FIG. 34.

In Line 25, a script is registered as an event handler that handles an onLoad event of a BODY element. The onLoad event handler is called in timing synchronous with completion of loading (expanding and displaying) of all data constituting a document. In the handler, first, the function "createCounterReport( )" is called, and then the function "createLogreport ( )" is called. Further, in Line 42, a script is registered as an event handler that handles an onClick event of the button input element labeled "UPDATE". This handler operates in quite the same way as above: first, the function "createCounterReport( )" is called, and then the function "createLogreport ( )" is called.

Figure 36:
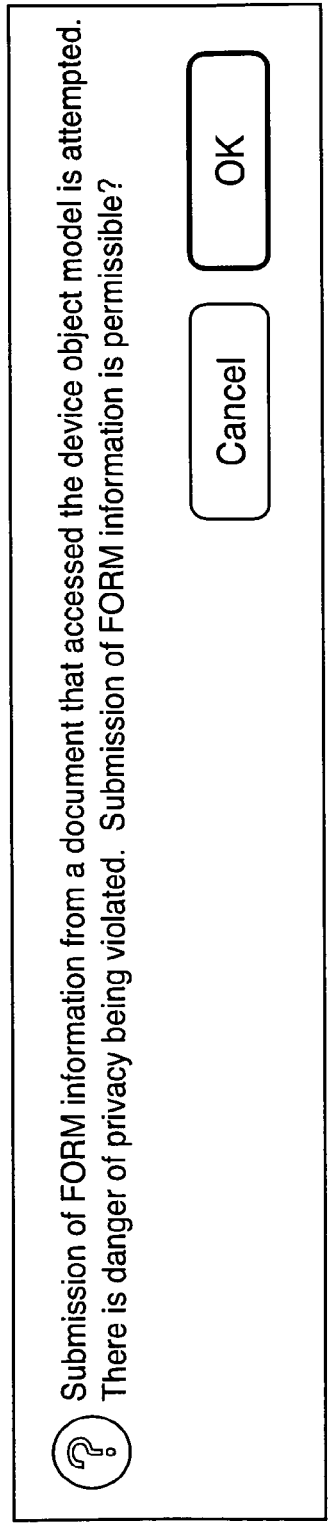
FIG. 36 is a view showing, by way of example, another dynamically adapted document displayed on the Web browser.

Immediately after the Web browser displays the document, a total count value of the printer unit 114 is input to a text input element "counter", and a time stamp of the "system"-related and notice-level log record object and a message are input to the text area element "log". Thus, a displayed image as shown in FIG. 36 can be obtained. Thereafter, whenever the user pushes or touches an "UPDATE" button, contents in a counter field and a log field are updated by an onClick event handler associated with the "UPDATE" button.

Further, in the present example of the HTML document, a submit-type input element for sending a HTML form element (FORM) is described in Line 43. This input element corresponds to a button labeled "SEND" in the example of display in FIG. 35. When the user pushes the "SEND" button, the contents of the counter and the log are submitted to the server. In short, results that the script obtains by accessing the device object model can be passed to the server via the form element (FORM). This makes it possible to link the server-side processing and the client-side processing to each other, and a script combining manipulation of the DOM and that of the device object model can provide an even wider range of solutions to problems.

However, some users sometimes fear that information stored in their embedded devices might easily leak out to an external network. Further, there exists a method of creating the same state as created by pushing of a "SUBMIT" button, even when the user does not push the "SUBMIT" button. This can increase the possibility that a user's privacy might be violated depending on the user environment and the manner of operation of the embedded device.

To eliminate this possibility, when a script accesses any object of the device object model even once, and an instruction for submitting information from a form element (FORM) contained in a document having the script embedded therein is issued, the user is requested to confirm whether or not to actually execute transmission processing. FIG. 36 illustrates a dialog for use in this confirmation. An instruction for submission of information from a form element (FORM) is a DOM event of a HTML document, which can be captured by a DOM management section. Further, the device object model accessed by a script is also incorporated in the DOM management section and managed by the same, so that the DOM management section can monitor access to the device object model from a script contained in a document. When any access is gained from the document, the DOM management section marks the document "dirty". When an instruction for submission of information from the form element (FORM) is captured, the DOM management section determines whether or not a document containing the form element (FORM) is marked "dirty". If the document is marked "dirty", the DOM management section stops execution of processing responsive to the instruction for submission of information from the form element (FORM), or requests the user to confirm permission of the submission of information from the form element (FORM).

FIG. 35 illustrates an example of a dynamic device report document displayed on the Web browser. This device report document represents the document shown in FIGS. 33 and 34, and is displayed on the content display area 905 of the Web browser. The display of the document or the device report document is presented in a dynamically adapted manner while reflecting access to the device object model.

The device report document includes a user interface ("UPDATE" button) for starting manipulation of the device object model, and interfaces ("counter" and "log" fields) for feeding back the results of the manipulation to the Web browser. Further, the result of the access to the device object model is sent by submission of information from the form element (FORM) (i.e. by touching the "SEND" button of the displayed document).

FIG. 36 illustrates an example of a confirmation pop-up window which is displayed when submission of information from a form element (FORM) from a document that gains access to the device object model is attempted, to request the user to confirm permission of the submission from the form element (FORM).

In the present embodiment, when a script accesses any object of the device object model even once, the user is requested to confirm whether or not to permit submission from a form element (FORM) contained in a document having the script embedded therein. However, if this restriction is deemed too strict, it is possible to select only several objects of the device object model for monitoring. Alternatively, specific methods or specific properties may be selected from the characteristics of the objects forming the device object model, so as to monitor calling of the specific methods or access to the specific properties. In this case, submission from the form element (FORM) from the document from which neither the calling nor the access is not performed is permitted (i.e. permission of the submission from the form element (FORM) is not confirmed by the user).

Although in the present embodiment, permission of submission from a form element (FORM) is confirmed whenever an instruction for submission from the form element (FORM) is issued, the permission or inhibition of submission from a form element (FORM) may be configured to be fixedly set in advance. Further, rules based on the URL of a document acquisition destination and/or that of a form element (FORM) transmission destination may be set in advance such that permission or inhibition of submission from the form element (FORM) is automatically determined.

According to the image processing apparatus of the present embodiment, it is possible to provide the following advantageous effects:

The device object model can be handled in the same manner as the DOM is. The device object model and the DOM are both text based, so that a general Web designer, who is familiar with DOM manipulation by a script, can easily produce a content to be linked to the embedded device.

Further, dynamic nodes of the device object model, particularly a set of objects, such as records e.g. of logs and a plurality of mountable option units of the same kind, which require structural flexibility can be searched and manipulated as a dynamic tree structure similar to the DOM.

Next, a description will be given of an image processing apparatus to which is applied an embedded device according to a fifth embodiment of the present invention.

The hardware configuration and software configuration of the system including the image processing apparatus of the present embodiment is only partially distinguished from those of the system including the image processing apparatus of the first embodiment. Therefore, in the following, different points from the first embodiment due to partial modifications or deletions will be described.

Figure 37:
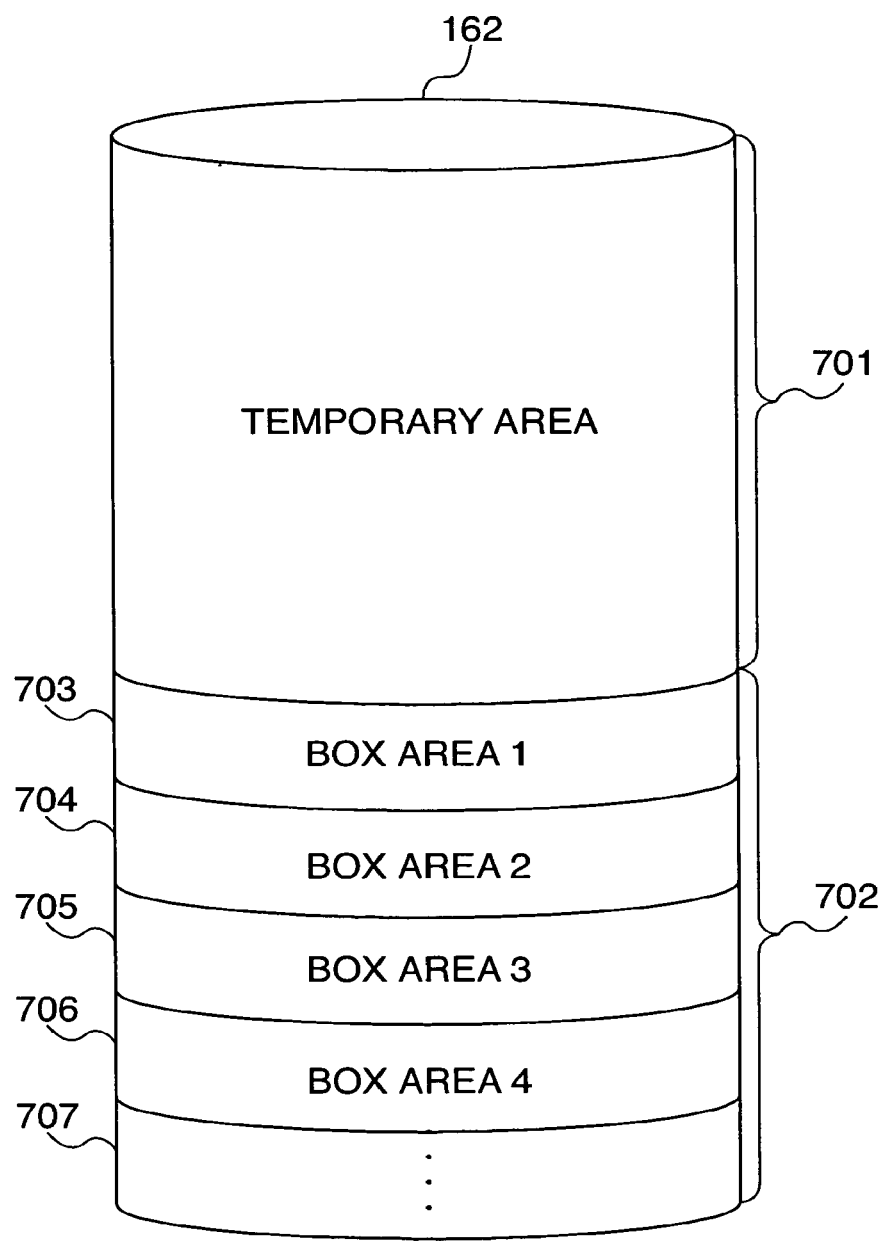
FIG. 37 is a diagram useful in explaining logical usage of a HDD.

FIG. 37 is a diagram useful in explaining logical usage of the HDD 304.

In the present embodiment, the storage area of the HDD 304 is logically divided into a temporary area 701, and a box area 702 according to the uses. The temporary area 701 is a storage area for temporarily storing PDL expanded data or image data from the scanner so that output sequence of image data can be changed, or a plurality of copies can be outputted by one-time scanning. The box area 702 is a storage area for using a box function. The box area 702 is divided into small storage areas, such as areas 703 to 707, corresponding in number to a registered number. Each box can have its own box name. The user can designate a box to thereby store a PDL job or a scan job as a document in the box. Further, it is possible to create a folder for collectively managing a plurality of documents. Furthermore, it is possible to browse documents and folders stored in a box, or print or send a document in the box.

Similarly to the other resources in the apparatus, the boxes 703 to 707 are assigned users or groups having ownership. Further, access rights for permitting reading, writing, and execution can be set for each of three types of users, i.e. users as owners (hereinafter referred to as "the users u"), users belonging to the group having ownership (hereinafter referred to as "the users g"), and other users who belong neither to "the users u" nor to "the users g" (hereinafter referred to as "the users o"). Similarly, each of the folders and the documents is assigned an owner and a group so that the access rights can be set.

FIG. 38 is a view showing, by way of example, a user interface for referring to and setting an access right to a document resource instance as an example of a resource.

When a user designates reference to or setting of resource information, a graphical user interface (GUI) in FIG. 38 is displayed on the LCD display unit 501.

In FIG. 38, an "INSTANCE" field shows an instance of a currently selected resource. "Technical Research Report 0110" is an identifier, i.e. a document name, assigned to the instance of the document resource.

A "CLASS" field shows the class of the currently selected resource. "DOCUMENT" shows that the currently selected resource is an instance of the document class.

A "HIERARCHY DISPLAY" button is used for hierarchically displaying the relationship between the instance of the currently selected resource and the class thereof. This display will be described in detail hereinafter.

An "OWNER INFORMATION" area is used for referring to or setting information of an owner of the currently selected resource. An "OWNER" field shows the identifier of the user owning the currently selected resource. A "GROUP" field shows the identifier of a group owning the currently selected resource.

An "ACCESS RIGHT SETTING" area is used for referring to the setting of the access rights to the currently selected resource or setting the access rights. This area is displayed as a table. In the table, rows correspond to the owner of the resource instance, the group, and another person, respectively, and each of the rows shows the states of read permission, write permission, and execution permission given to the corresponding one of the owner, the group, and the other persons. Columns show the respective states of read permission, write permission, and execution permission. Each field as an intersection of the row and the column shows the value of an associated attribute of the resource.

The above described example applies to all the objects constituting the device object model. More specifically, only when the user is authorized to read, the reading of an attribute from a script is permitted, and only when the user is authorized to write, the modification of the attribute in the script is permitted. Further, only when the user is authorized to execute, the calling an operation from the script is permitted.

Each attribute has a meaning defined according to the associated resource. The read permission associated with the document resource indicates that browsing, printing, and/or transmission of the document are/is allowed. The write permission associated with the document, resource indicates that editing of the document by rewriting and/or deleting elements of the document is allowed. The execution permission associated with the document resource indicates that when processing of the document, such as printing or transmission, is stored as a job script in a job description form in association with the document, execution of the job script is allowed.

A "CANCEL" button is used for canceling a change of a changeable value even when it is changed and closing the present GUI. An "OK" button is used for saving (making effective) a change of a changeable value and closing the present GUI.

A user owning the document can use the present GUI to set a group to own the document from the groups to which the user belongs, as well as to set appropriate permissions to the owner, the group, and the other persons. On the other hand, a user authorized to write related to the administrator configuration (the members of the "admin" group are authorized to write in an attribute of an administrator configuration resource class, not shown) is allowed to change all the attributes, and hence is also allowed to change the setting of the owner of the present document. In the present embodiment, the owner is allowed to perform all the operations on the document, and the members of the group "rd" (a research and development department in an organization) to which the owner belongs are only permitted to perform the reading operation. The other users are not permitted to perform any of the operations including the reading operation.

Resources related to the document resource include a folder class and a box class. A folder is a container which can contain a plurality of documents and a plurality of other folders as contents, and a box is a top-level folder. Read permission associated with the folder and the box indicates permission to display a list of contents contained in the container. Write permission associated with the folder and the box indicates permission to add and delete a content to/from the container. Execution permission indicates permission to execute batch processing on registerable contents on a container-by-container basis.

FIG. 39 is a view showing, by way of example, a user interface for referring to and setting an access right to a color copying function resource instance as another example of the resource. Description of the same configuration of the user interface in FIG. 39 as that of the user interface in FIG. 38 is omitted.

In FIG. 39, the "INSTANCE" field shows an instance of the currently selected resource. "Nameless Instance" is an identifier, i.e. a function name, assigned to the color copying function resource instance. In the present embodiment, the color copying function class has only a single instance automatically generated by the apparatus, and hence the instance is treated as a nameless instance which has no specific name.

The "CLASS" field shows the class of the currently selected resource. "COLOR COPYING" shows that the currently selected resource is the instance of the color copying class.

The "HIERARCHY DISPLAY" button is used for hierarchically displaying the relationship between the instance of the currently selected resource and the class thereof. This display will be described in detail hereinafter.

The "OWNER INFORMATION" area is used for referring to or setting information of an owner of the currently selected resource. The "OWNER" field shows the identifier of the user owning the currently selected resource. The "GROUP" field shows the identifier of a group owning the currently selected resource.

Each attribute shown in the "ACCESS RIGHT SETTING" area has a meaning defined according to the associated resource. The semantics of the color copying function resource is defined by a function resource as a superclass. Read permission associated with the function resource indicates that monitoring of the status of the present function is allowed. Write permission associated with the function resource indicates that a special setting for controlling the operation mode of the function on a system level can be changed. Execution permission associated with the function resource indicates that the job of the function can be started.

In the illustrated example, the user owning the function is the "system". The "system" is not an actual user, but a virtual user. Therefore, only users authorized to perform writing related to the administrator configuration can use the present GUI to change permissions to the color copying function. A group owning the function is the "sales (sales department in the organization)". Only members belonging to this group are permitted to use the color copying function, and the other users are not.

Figure 40:
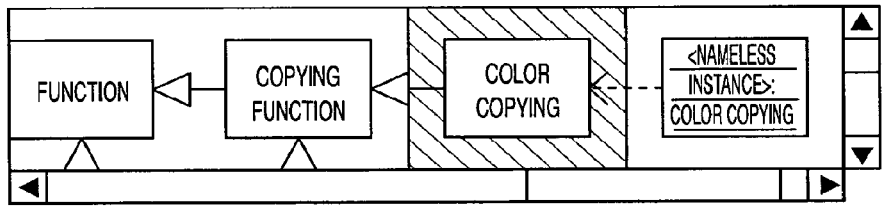
FIG. 40 is a view showing, by way of example, a user interface displaying the inheritance relationship between resources for referring to and setting an access right to a color copying function resource class.

FIG. 40 is a view showing, by way of example, a user interface displaying the inheritance relationship between resources and provided for referring to and setting access rights to the color copying function class.

When the user pushes or touches the "HIERARCHY DISPLAY" button in the user interface shown in FIG. 39, the GUI in FIG. 40 is displayed on the LCD display unit 501. Description of the same configuration thereof as that of the user interface in FIG. 39 is omitted.

In FIG. 40, the uppermost area is a hierarchy display area. In the hierarchy display area, an abstract-concrete inheritance relationship is displayed in the same hierarchical representation as in FIGS. 15A to 15C. In the representation of the inheritance relationship, each box represents a resource class or a resource instance. By touching one of the box areas on the operating unit 112, the user can select a resource class or instance associated with the box area. A class or instance enclosed by a rectangle having a diagonally shaded background represents the currently selected resource class or instance. When the selection is changed, the representation in areas of the GUI below the hierarchy display area is switched to a representation associated with the selected class or instance. In the present example, the color copying function class is selected.

The "OWNER INFORMATION" area is used for referring to or setting information of an owner of the currently selected resource. The "OWNER" field shows the identifier of the user owning the currently selected resource. The "GROUP" field shows the identifier of a group owning the currently selected resource.

Each attribute shown in the "ACCESS RIGHT SETTING" area has a meaning defined according to the associated resource. The semantics of the color copying function resource is defined by a function resource as a superclass. Read permission associated with the function resource indicates that monitoring of the status of the present function is allowed. Write permission associated with the function resource indicates that a special setting for controlling the operation mode of the function on the system level can be changed. Execution permission associated with the function resource indicates that the job of the function can be started.

In the illustrated example, the user owning the function is the "system". The "system" is not an actual user, but a virtual user. Therefore, only users authorized to perform writing related to the administrator configuration can use the present GUI to change permissions to the color copying function. A group owning the function is the "sales (sales department in the organization)". Only members belonging to this group are permitted to used the color copying function, and the other users are not.

Figure 41:
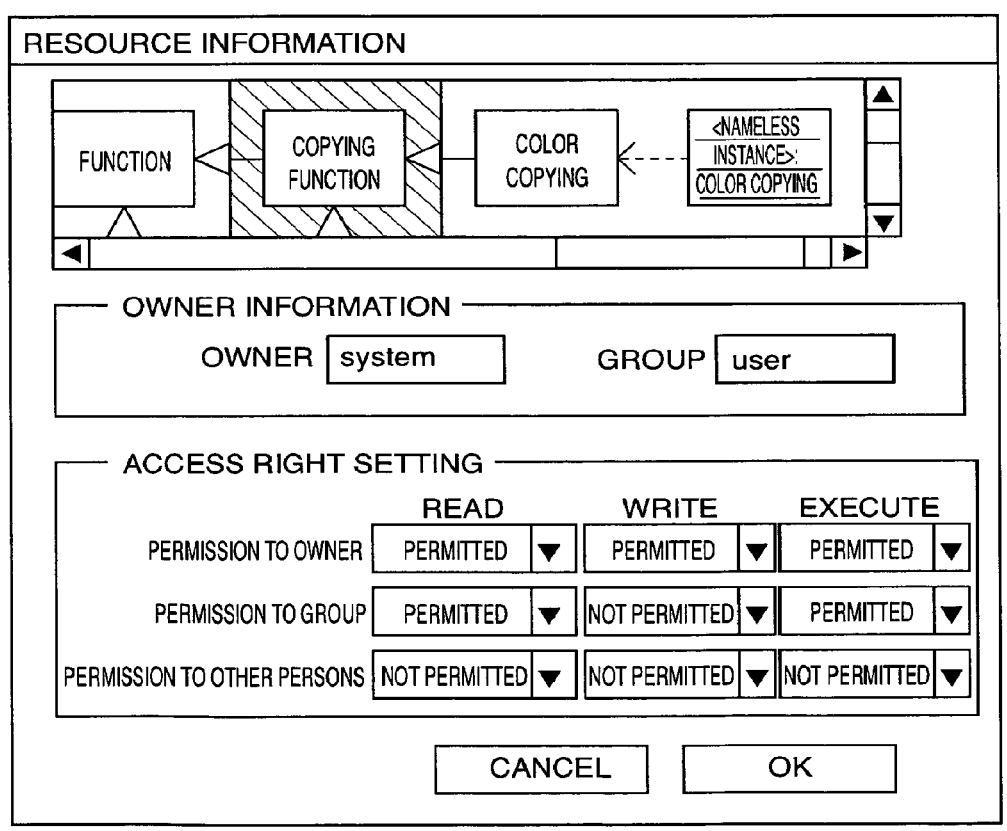
FIG. 41 is a view showing, by way of example, a user interface displaying the inheritance relationship between resources for referring to and setting an access right to a copying function resource class.

FIG. 41 is a view showing, by way of example, a user interface displaying the inheritance relationship between resources and provided for referring to and setting access rights to the copying function class.

When the user pushes or touches a box representative of the copying function class in the hierarchy display area in FIG. 40, the GUI in FIG. 41 is displayed on the LCD display unit 501. Description of the same configuration thereof as that of the user interface in FIG. 40 is omitted.

In FIG. 41, the uppermost area is the hierarchy display area. In the illustrated example, the copying function class is selected. The copying function class is a superclass obtained by abstracting the color copying function and the monochrome copying function. The superclass is used for inheritance of default attribute values common to subclasses.

In the illustrated example, the user owning the function is the "system". The "system" is not an actual user, but a virtual user. Therefore, only users authorized to perform writing related to the administrator configuration can use the present GUI to change permissions to the copying function. A group owning the function is the "user" (all users). All users having a user account for the apparatus are permitted to used the copying function, and the other users, i.e. the guest users are not.

Figure 42:
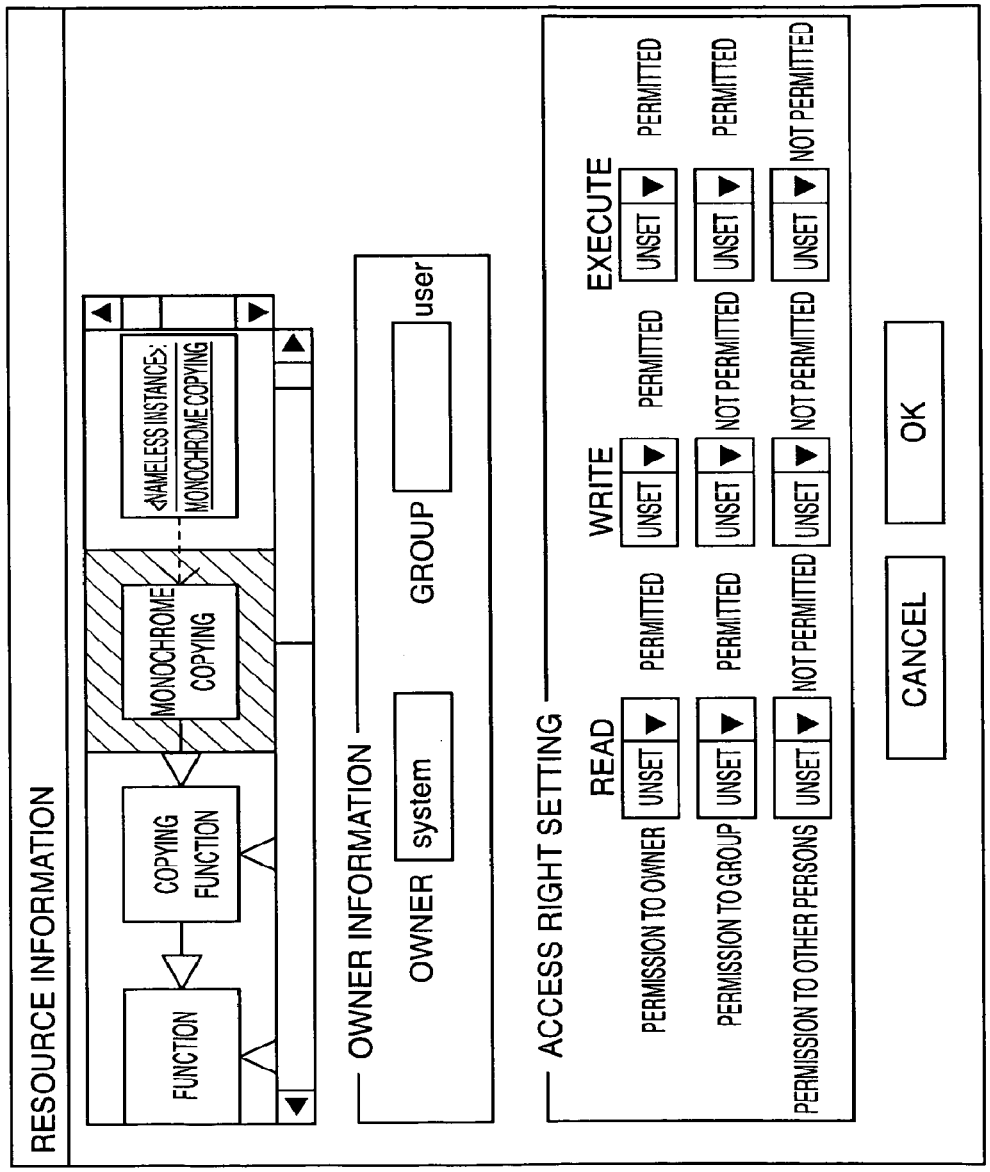
FIG. 42 is a view showing, by way of example, a user interface displaying the inheritance relationship between resources for referring to and setting an access right to a monochrome copying function resource class.

FIG. 42 is a view showing, by way of example, a user interface displaying the inheritance relationship between resources and provided for referring to and setting access rights to the monochrome copying function class.

When the user pushes or touches a box representative of the monochrome copying function class in the hierarchy display area in FIG. 41, the graphical user interface (GUI) in FIG. 42 is displayed on the LCD display unit 501. Description of the same configuration of the user interface in FIG. 42 as that of the user interface in FIG. 41 is omitted.

In FIG. 42, the uppermost area is the hierarchy display area. In the illustrated example, the monochrome copying function class is selected. The monochrome copying function class is a subclass obtained by specializing the copying function class. The monochrome copying function class inherits default values from the copying function class as a superclass.

In the illustrated example, the user owning the function is the "system". The "system" is not an actual user, but a virtual user. Therefore, only users authorized to perform writing related to the administrator configuration can use the present GUI to change permissions to the monochrome copying function. A group owning the function is not set, and hence "user" (all users) is inherited from the copying function class as a superclass.

In the "ACCESS RIGHT SETTING" area, none of the permission attributes are set. Therefore, each of the corresponding permission attributes is inherited from the copying function class as a superclass.

FIG. 43 is a view showing, by way of example, a user interface displaying the aggregation relationship between resources and provided for referring to and setting access rights to the printer unit class.

The GUI in FIG. 43 is displayed on the LCD display unit 501. Description of the same configuration thereof as that of the user interface e.g. in FIG. 40 is omitted.

In FIG. 43, the uppermost area is the hierarchy display area. In the hierarchy display area, a parent-child aggregation relationship is displayed in the same hierarchical representation as in FIG. 16. In the representation of the aggregation relationship, each box represents a resource class or a resource instance. By pushing or touching one of the box areas on the operating unit 112, the user can select a resource class or instance associated with the box area. A class or instance enclosed by a rectangle having a diagonally shaded background represents the currently selected resource class or instance. When the selection is changed, the representation in areas of the GUI below the hierarchy display area is switched to a representation associated with the selected class or instance. In the present example, the printer unit class is selected.

The "OWNER INFORMATION" area is used for referring to or setting information of an owner of the currently selected resource. The "OWNER" field shows the identifier of the user owning the currently selected resource. The "GROUP" field shows the identifier of a group owning the currently selected resource.

Each attribute shown in the "ACCESS RIGHT SETTING" area has a meaning defined according to the associated resource. The printer unit class 1972 in the present embodiment only integrates the sheet feeder unit class 1907, the marking unit class 1905, and the discharge unit class 1908, as child unit classes thereof, for collectively handling them. Therefore, actually, the printer unit class 1972 receives none of a read access, a write access, and an execution access. However, the printer unit resource holds access right setting attributes such that they can be referred to and set. In the present embodiment, the attribute values of the printer unit class 1972 are directly used as default attribute values of the child unit classes of the printer unit class 1972. Therefore, insofar as the attribute values of the child unit classes as children in the parent-child relationship are left unset, as the value of an attribute of the whole unit class is changed, a corresponding one of the unset attributes of the child unit classes is changed to assume the same value.

Figure 44:
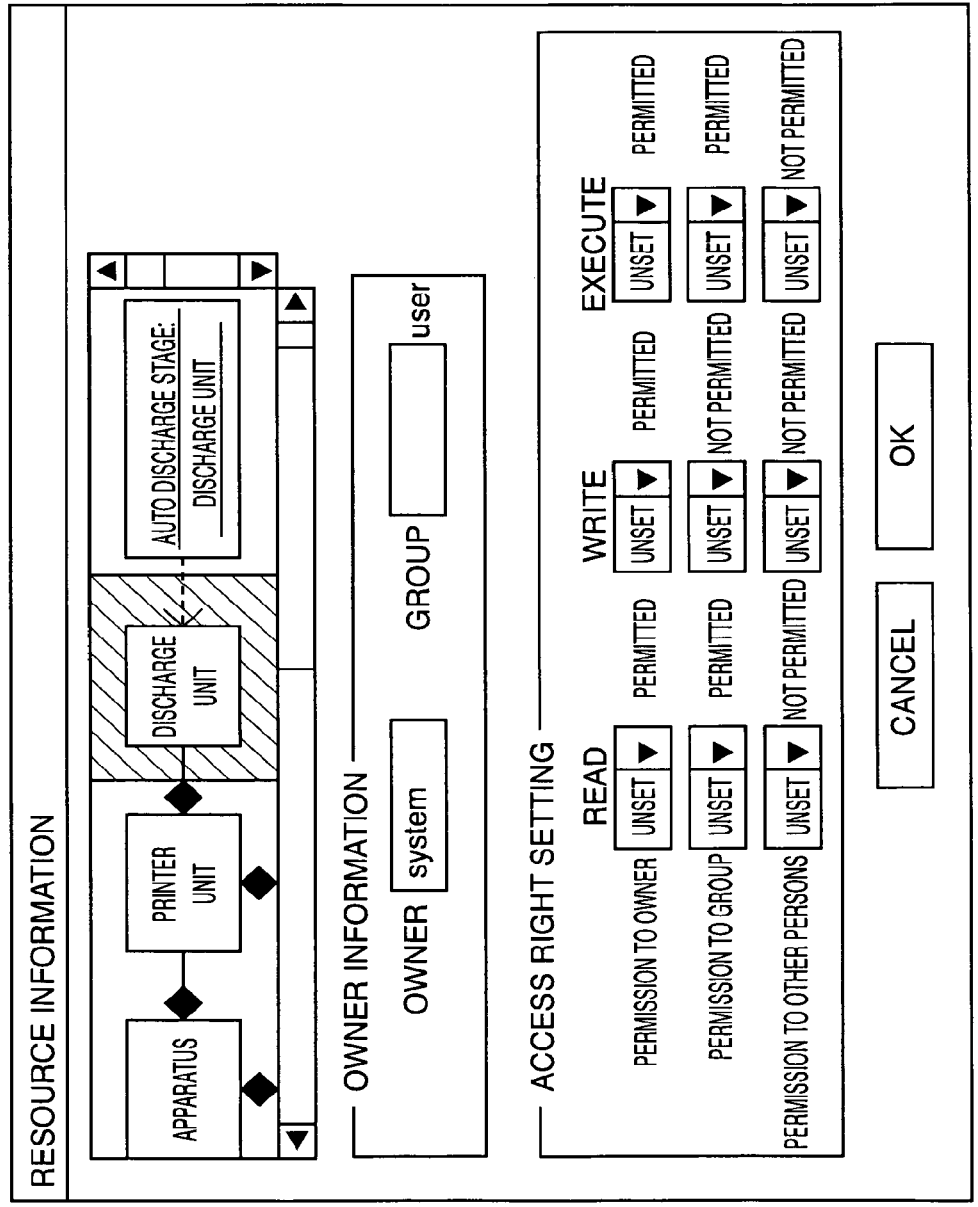
FIG. 44 is a view showing, by way of example, a user interface displaying the aggregation relationship between resources for referring to and setting an access right to a discharge unit resource class.

FIG. 44 is a view showing, by way of example, a user interface displaying the aggregation relationship between resources and provided for referring to and setting access rights to a discharge unit resource class. Description of the same configuration thereof as that of the user interface in FIG. 43 is omitted.

In FIG. 44, the discharge unit class is selected. The discharge unit class 1908 is a child unit class of the printer unit class 1972.

In FIG. 44, the attributes of the group and the access rights are left unset, and therefore the values of the corresponding attributes of the printer unit resource are assumed to be set thereto.

Figure 45:
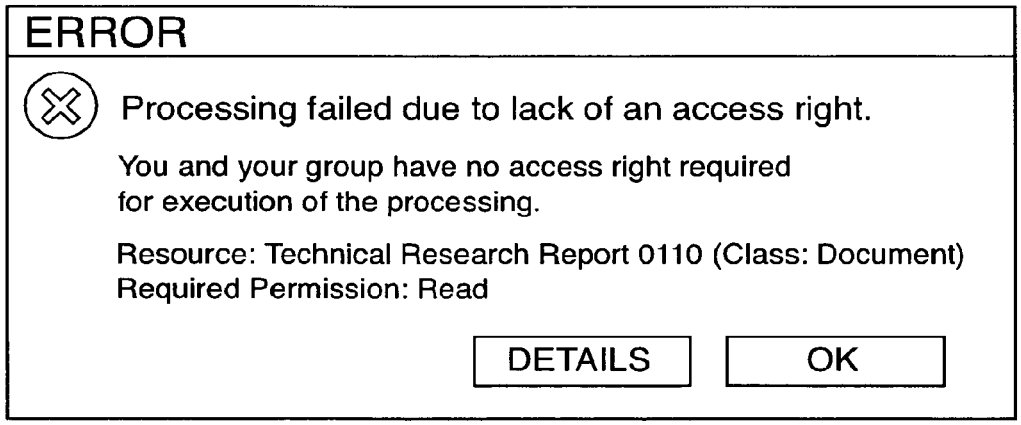
FIG. 45 is a view showing, by way of example, a screen displaying an access right violation error.

FIG. 45 is a view showing, by way of example, a screen displaying an access right violation error.

When processing executed by a user has failed due to lack of an access right, the GUI in FIG. 45 is displayed on the LCD display unit 501. A message on the GUI is provided to notify the user of lack of the access right necessary for the processing. Further, the message shows a resource that caused the failure and a permission necessary for accessing the resource. When the user pushes or touches a "DETAIL" button, information concerning the error is displayed in more detail. Information (e.g. FIG. 39) on the resource that caused the failure can also be displayed as detailed information. When the user touches an "OK" button, the present GUI is closed.

In the present embodiment, the hierarchical structure representative of the aggregation relationship between the parent classes and the child classes is held, and insofar as the attributes indicative of access rights to the resources are concerned, the values of the respective attributes of a parent class are used as default values of the corresponding attributes of an associated child class. Therefore, when the attribute values are unset in a child class, the corresponding attribute values can be supplied from an associated parent class, so that insofar as a resource group having a plurality of child classes is concerned, simply by setting the attribute values once in a class including the child classes, it is possible to easily set default access rights common to the partial resources. Further, special access rights different from the common defaults can be set, as required, for a more partial resource (and its child classes if any).

Further, there are provided a GUI hierarchically displaying the parent-child aggregation relationship between the resource classes, and a GUI for use in referring to and setting access right information on each class and each instance with reference to the aggregation relationship between the classes. Therefore, the user can clearly grasp the aggregation relationship between the resources and easily set the access rights properly based on the grasped aggregation relationship.

Although in each of the above described embodiments, only the DOM of a HTML document is used, the present invention can also be applied to general documents described in other markup languages including XHTML. For example, by manipulating the SVG DOM from the script, it is possible to combine a user interface graphically richer than that provided by a document formed only by HTML, and manipulation of the device object model.

Further, although in the above described embodiments, HTTP is used between the browser and the server, HTTPS (Hypertext Transfer Protocol Security) as a matter of course and any other protocol which is and will be generally used in the Web technique may be employed.

Furthermore, although in the above described embodiments, the authority to carry out processing in accordance with execution of a script is determined based on the user currently using the Web browser, this is not limitative, but the access rights to a script may be uniquely determined, or alternatively the access rights may be determined based on a script provider identified by a signature or the like added to a script.

Although in the above described embodiments, the access rights are set on an object-by-object basis, they may be set according to each of the operations included in the classes.

The present invention is not limited to the above described embodiments, but can be modified in various manners based on the subject matter of the present invention, which should not be excluded from within the scope of the present invention insofar as functions as recited in the appended claims or the functions performed by the construction of either of the above described embodiments can be achieved. Further, the present invention may either be applied to a system composed of a plurality of apparatuses or to a single apparatus.

Further, it is to be understood that the object of the present invention may also be accomplished by supplying a computer or a CPU with a program code of software, which realizes the functions of any of the above described embodiments, and causing the computer or CPU to read out and execute the program code.

The above program has only to realize the functions of any of the above described embodiments on a computer, and the form of the program may be an object code, a program code executed by an interpreter, or script data supplied to an OS.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-268483 filed Sep. 15, 2004, which is hereby incorporated by reference herein.

What is claimed is:

1. An image processing apparatus adapted to communicate with an external server via a network, the image processing apparatus comprising:
    a display;
    a Web browser unit configured to load Web content data containing document data described by a markup language and embedding a JavaScript or information for identifying a JavaScript and to generate screen information to be displayed by the display based on the loaded Web content data, wherein the embedded JavaScript or the JavaScript identified by the embedded information is linked to a document object model, wherein the Web content data is transmitted from the external server, and wherein the Web browser unit comprises a script interpreter configured to interpret the document data contained in the Web content data to perform script processing based on the embedded JavaScript or the JavaScript identified by the embedded information; and
    an executing unit configured to execute at least one of a plurality of functions of the image processing apparatus based on a command instructing execution of the one of the plurality of functions, wherein the command is included in the embedded JavaScript or the JavaScript identified by the embedded information based on which script processing is performed by the script interpreter,
    wherein the at least one of the plurality of functions, executed based on the command included in the embedded JavaScript or the JavaScript identified by the embedded information, is executed by calling a control API (Application Program Interface) from an event processing unit, associated with the document object model, included in the image processing apparatus, and wherein at least another of the plurality of functions of the image processing apparatus, executed based on a user interaction, is executed by calling the control API from one or more applications associated with one of scanning or copying, included in the image processing apparatus.

2. The image processing apparatus as claimed in claim 1 further comprising:
    a storage unit configured to store status information of the image processing apparatus; and
    an acquisition unit configured to acquire a piece of the status information based on the script processing,
    wherein the Web browser unit is configured to insert the piece of the status information acquired by the acquisition unit into the document data contained in the Web content data to renew the Web content data, and generate the screen information based on the renewed Web content data.

3. The image processing apparatus as claimed in claim 2 wherein in a case where an instruction for externally outputting, from the image processing apparatus, the piece of the status information acquired by the acquisition unit is given by a user, the Web browser unit is configured to confirm from the user whether or not an external output in accordance with the instruction should be executed.

4. The image processing apparatus as claimed in claim 2, wherein the acquisition unit is configured to acquire, from the storage unit, information indicating a user name of a user currently utilizing the image processing apparatus as the piece of the status information, and
    the Web browser unit is configured to add the information indicating the user name acquired by the acquisition unit to the screen information.

5. The image processing apparatus as claimed in claim 2, wherein the acquisition unit is configured to acquire, from the storage unit, information indicating a model name of the image processing apparatus as the piece of the status information, and
    the Web browser unit is configured to add the information indicating the model name of the image processing apparatus acquired by the acquisition unit to the screen information.

6. The image processing apparatus as claimed in claim 2, wherein the acquisition unit is configured to acquire, from the storage unit, information indicating a mounting state of a unit mountable to the image processing apparatus as the piece of the status information, and the Web browser unit is configured to add the information indicating the mounting state of the unit acquired by the acquisition unit to the screen information.

7. The image processing apparatus as claimed in claim 2, wherein the acquisition unit is configured to acquire, from the storage unit, information indicating a version of a firmware incorporated in the image processing apparatus as the piece of the status information, and the Web browser unit is configured to add the information indicating the version of the firmware acquired by the acquisition unit to the screen information.

8. The image processing apparatus as claimed in claim 2, wherein the acquisition unit is configured to acquire, from the storage unit, information indicating amounts of consumables in the image processing apparatus as the piece of the status information, and the Web browser unit is configured to add the information indicating the amounts of consumables acquired by the acquisition unit to the screen information.

9. The image processing apparatus as claimed in claim 2, wherein the acquisition unit is configured to acquire, from the storage unit, information indicating a diagnostic result of the image processing apparatus as the piece of the status information, and the Web browser unit is configured to add the information indicating the diagnostic result of the image processing apparatus acquired by the acquisition unit to the screen information.

10. The image processing apparatus as claimed in claim 2, wherein the acquisition unit is configured to acquire, from the storage unit, information indicating a log of the image processing apparatus as the piece of the status information, and the Web browser unit is configured to add the information indicating the log of the image processing apparatus acquired by the acquisition unit to the screen information.

11. The image processing apparatus as claimed in claim 1, wherein the Web browser unit is configured to display an execution result of the one of the plurality of functions executed by the executing unit via the display.

12. The image processing apparatus as claimed in claim 1, wherein the one of the plurality of functions of the image processing apparatus is a function for performing self-diagnosis of the image processing apparatus.

13. The image processing apparatus as claimed in claim 12, wherein the Web browser unit is configured to display a result for the self-diagnosis performed by the image processing apparatus via the display.

14. A method of controlling an image processing apparatus adapted to communicate with an external server via a network, the method comprising:

a loading step of a Web browser unit loading Web content data containing document data described by a markup language and embedding a JavaScript or information for identifying a JavaScript;

a generating step of the Web browser unit generating screen information to be displayed by a display based on the loaded Web content data, wherein the embedded JavaScript or the JavaScript identified by the embedded information is linked to a document object model, and wherein the Web content data is transmitted from the external server;

a script processing step of a script interpreter interpreting the document data contained in the Web content data to perform script processing based on the embedded JavaScript or the JavaScript identified by the embedded information; and an executing step of an executing unit executing at least one of a plurality of functions of the image processing apparatus based on a command instructing execution of the one of the plurality of functions, wherein the command is included in the embedded JavaScript or the JavaScript identified by the embedded information based on which script processing is performed by the script interpreter, wherein the at least one of the plurality of functions, executed based on the command included in the embedded JavaScript or the JavaScript identified by the embedded information, is executed by calling a control API (Application Program Interface) from an event processing unit, associated with the document object model, included in the image processing apparatus, and wherein at least another of the plurality of functions of the image processing apparatus, executed based on a user interaction, is executed by calling the control API from one or more applications associated with one of scanning or copying, included in the image processing apparatus.

15. A non-transitory computer-readable storage medium storing a computer-executable program for executing a method of controlling an image processing adapted to communicate with an external server via a network apparatus, the method comprising:

a loading step of a Web browser unit loading Web content data containing document data described by a markup language and embedding a JavaScript or information for identifying a JavaScript;

a generating step of the Web browser unit generating screen information to be displayed by a display based on the loaded Web content data, wherein the embedded JavaScript or the JavaScript identified by the embedded information is linked to a document object model, and wherein the Web content data is transmitted from the external server;

a script processing step of a script interpreter interpreting the document data contained in the Web content data to perform script processing based on the embedded JavaScript or the JavaScript identified by the embedded information; and an executing step of an executing unit executing at least one of a plurality of functions of the image processing apparatus based on a command instructing execution of the one of the plurality of functions, wherein the command is included in the embedded JavaScript or the JavaScript identified by the embedded information based on which script processing is performed by the script interpreter, wherein the at least one of the plurality of functions, executed based on the command included in the embedded JavaScript or the JavaScript identified by the embedded information, is executed by calling a control API (Application Program Interface) from an event processing unit, associated with the document object model, included in the image processing apparatus, and wherein at least another of the plurality of functions of the image processing apparatus, executed based on a user interaction, is executed by calling the control API from one or more applications associated with one of scanning or copying, included in the image processing apparatus.

16. An image processing apparatus adapted to communicate with an external server via a network, the image processing apparatus comprising:

a display;

one or more memory devices storing a program and one or more applications; and at least one processor coupled to the one or more memory devices and configured at least by the program at least to:

load Web content data via a Web browser, the Web content data containing document data described by a markup language and embedding a JavaScript or information for identifying a JavaScript;

generate, via the Web browser, screen information to be displayed by the display based on the loaded Web content data, wherein the embedded JavaScript or the JavaScript identified by the embedded information is linked to a document object model, wherein the Web content data is transmitted from the external server, and wherein the Web browser comprises a script interpreter;

interpret, via the script interpreter, the document data contained in the Web content data to perform script processing based on the embedded JavaScript or the JavaScript identified by the embedded information; and execute, via a function module, at least one of a plurality of functions of the image processing apparatus based on a command instructing execution of the one of the plurality of functions, wherein the command is included in the embedded JavaScript or the JavaScript identified by the embedded information based on which script processing is performed by the script interpreter, wherein the at least one of the plurality of functions, executed based on the command included in the embedded JavaScript or the JavaScript identified by the embedded information, is executed by calling a control API (Application Program Interface) from an event processing unit, associated with the document object model, included in the image processing apparatus, and wherein at least another of the plurality of functions of the image processing apparatus, executed based on a user interaction, is executed by calling the control API from one or more applications associated with one of scanning or copying, included in the image processing apparatus.

* * * * *